(12) United States Patent
Eroz et al.

(10) Patent No.: US 8,674,758 B2
(45) Date of Patent: Mar. 18, 2014

(54) METHOD AND APPARATUS FOR IMPROVED HIGH ORDER MODULATION

(75) Inventors: Mustafa Eroz, Germantown, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 139 days.

(21) Appl. No.: 13/327,316

(22) Filed: Dec. 15, 2011

(65) Prior Publication Data
US 2013/0154755 A1    Jun. 20, 2013

(51) Int. Cl.
    H04L 27/36    (2006.01)
    H03C 1/00    (2006.01)
    H03C 3/00    (2006.01)
    H03D 1/00    (2006.01)
    H03D 3/00    (2006.01)

(52) U.S. Cl.
    USPC ........... 329/304; 329/348; 332/103; 332/145; 375/298; 375/329

(58) Field of Classification Search
    USPC ......................... 329/304–307, 310, 345–348; 332/103–105, 144–146, 149, 151; 375/261, 298, 329–333
    See application file for complete search history.

(56) References Cited

U.S. PATENT DOCUMENTS

| | | | | |
|---|---|---|---|---|
| 5,805,642 A | * | 9/1998 | Wei et al. | 375/340 |
| 5,838,728 A | * | 11/1998 | Alamouti et al. | 375/265 |
| 5,844,943 A | * | 12/1998 | Kazecki et al. | 375/261 |
| 5,903,609 A | * | 5/1999 | Kool et al. | 375/261 |
| 6,097,764 A | * | 8/2000 | McCallister et al. | 375/298 |
| 6,104,761 A | * | 8/2000 | McCallister et al. | 375/296 |
| 6,674,811 B1 | * | 1/2004 | Desrosiers et al. | 375/298 |
| 6,963,622 B2 | * | 11/2005 | Eroz et al. | 375/298 |
| 7,039,126 B2 | * | 5/2006 | Galins | 375/298 |
| 7,187,728 B2 | * | 3/2007 | Seier et al. | 375/341 |
| 7,324,613 B2 | * | 1/2008 | Fang et al. | 375/330 |
| 8,369,448 B2 | * | 2/2013 | Zhang et al. | 375/298 |
| 2003/0021358 A1 | * | 1/2003 | Galins | 375/297 |

* cited by examiner

Primary Examiner — Levi Gannon
(74) Attorney, Agent, or Firm — Potomac Technology Law, LLC

(57) ABSTRACT

Methods, systems and software are provided for high order signal modulation based on improved signal constellation and bit labeling designs for enhanced performance characteristics, including decreased power consumption. According to the improved signal constellation and bit labeling designs for enhanced performance characteristics, designs for 8-ary, 16-ary, 32-ary and 64-ary signal constellations are provided. According to an 8-ary constellation, improved bit labeling and bit coordinates are provided for a 1+7APSK signal constellation. According to a 16-ary constellation, improved bit labeling and bit coordinates are provided for a 6+10APSK signal constellation. According to three 32-ary constellations, improved bit labeling and bit coordinates are provided for a 16+16APSK signal constellation and two 4+12+16APSK signal constellations. According to two 64-ary constellations, improved bit labeling and bit coordinates are provided for an 8+16+20+20APSK signal constellation and a 12+16+16+20APSK signal constellation.

44 Claims, 25 Drawing Sheets

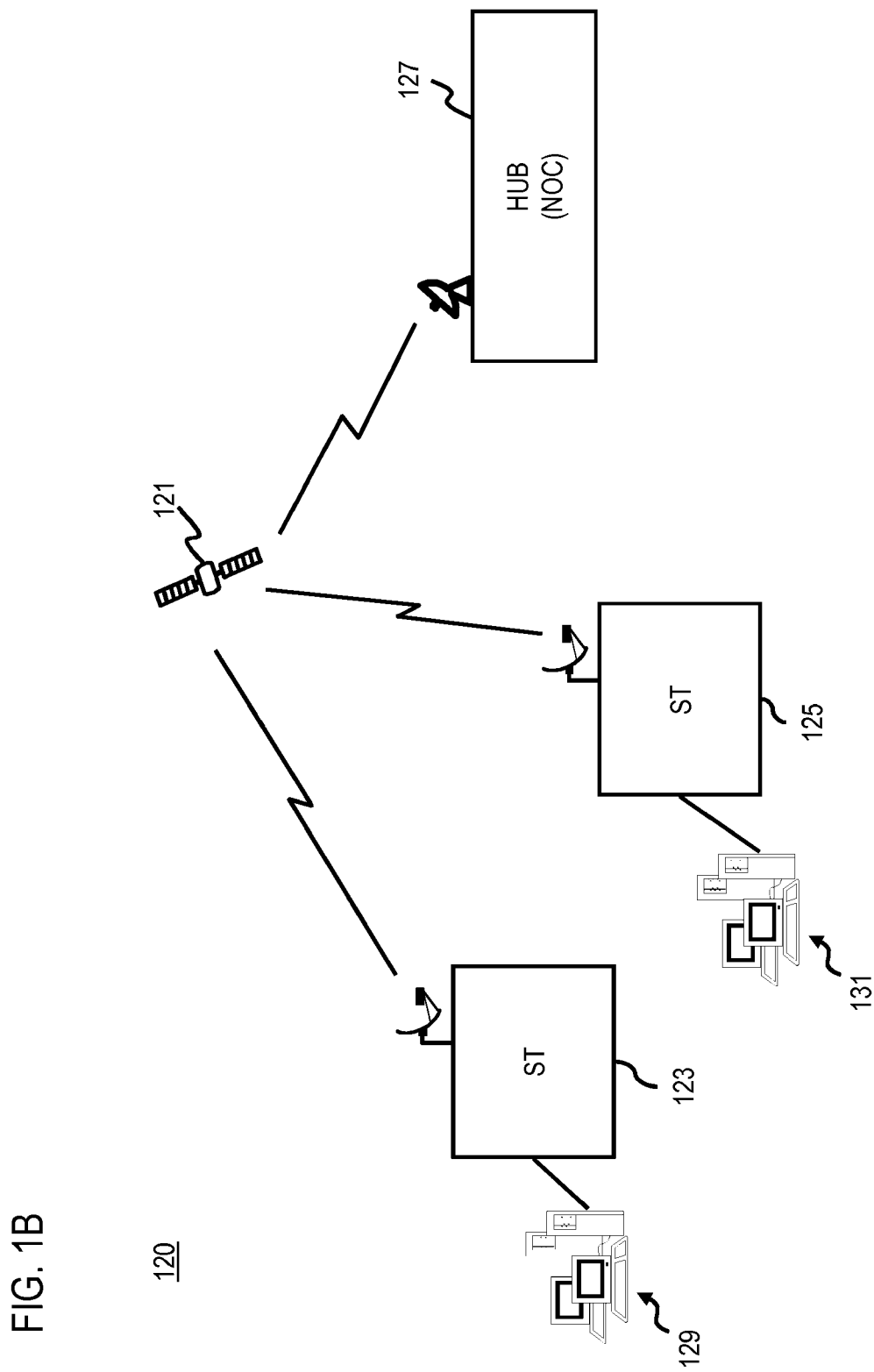

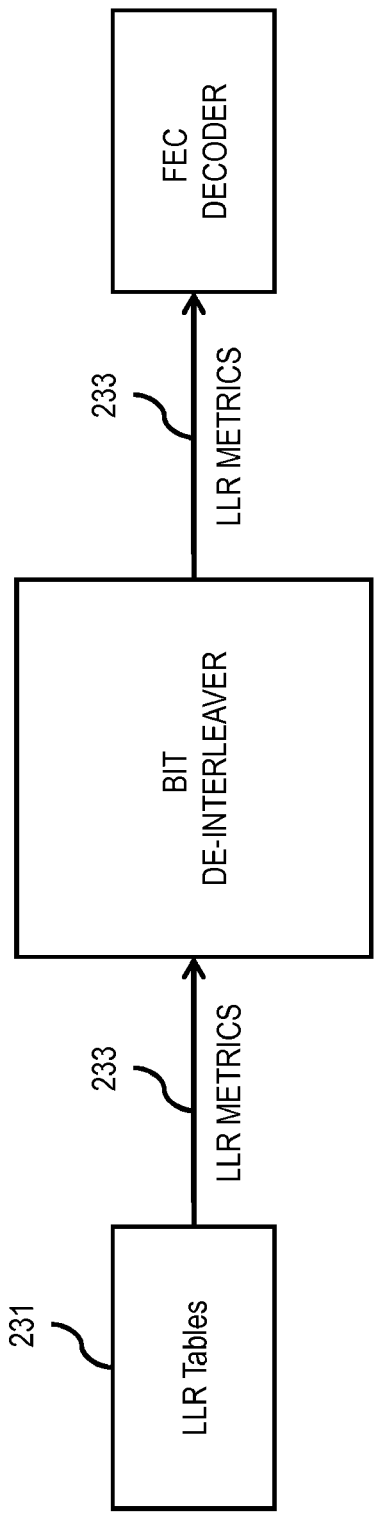

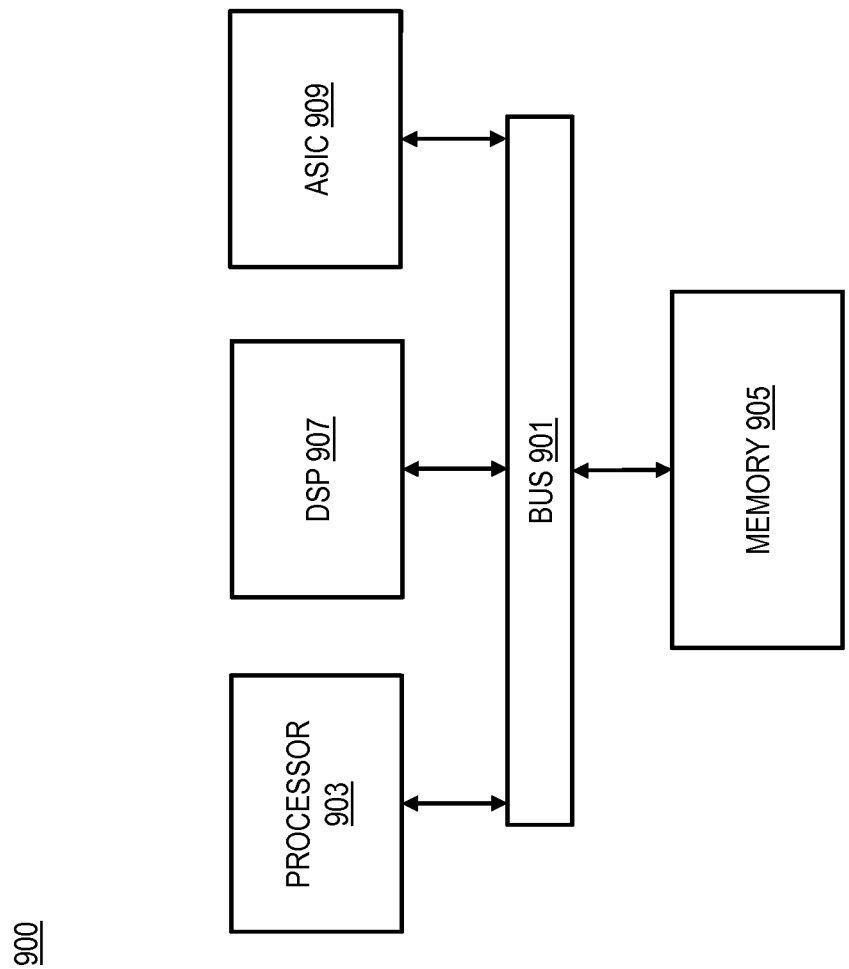

> US 8,674,758 B2

METHOD AND APPARATUS FOR IMPROVED HIGH ORDER MODULATION

BACKGROUND

The present invention relates to transmission schemes for wireless digital communication systems, and more particularly to high order modulation based on improved signal constellation and bit labeling designs for enhanced performance, including decreased power consumption.

In wireless communication systems, higher order modulation enables transmission of more than two bits in a symbol with more signal power, reducing the transmission bandwidth required. Modern communications systems typically use phase shifted keying (PSK)-based modulation and coherent demodulation to reduce transmit power. Higher order modulation generally employs more than 4 possible phases and more than one signal amplitude to send more than 2 bits in a phase/amplitude symbol. A signal constellation diagram is a representation of a signal modulated by a digital modulation scheme, such as quadrature amplitude modulation or phase-shift keying. The signal constellation depicts the signal as a two-dimensional scatter diagram, in the complex plane, at symbol sampling instants. In other words, the signal constellation represents the possible symbols that may be selected by a given modulation scheme as points in the complex plane. Accordingly, a modulated waveform, from a set of data symbols, leads to the concept of a signal constellation. In addition to optimizing modulation, it is well-known that significant power reduction can be achieved by applying forward error correction (FEC) coding to the information.

Well-known classical examples of higher order modulation signals include 8-PSK, 16-QAM, 32-QAM and 64-QAM, which are capable of sending 3, 4, 5 and 6 bits, respectively, per symbol. For satellite transmission, because power is at its premium, the 16-QAM, 32-QAM and 64-QAM signals are often modified by organizing them to several rings of different amplitudes. The Digital Video Broadcast via Satellites standard (DVB-S2) employs 16-APSK and 32-APSK modulation signals, where the 16-APSK employs a signal constellation of two rings, with 4 and 12 possible phase positions, respectively, and the 32-APSK employs a signal constellation of three rings, with 4, 12 and 16 possible phase positions, respectively. As such, they are also called 4+12-APSK and 4+12+16-APSK, respectively.

While current signal constellations, including the signal constellations of the DVB-S2 standard, perform to a reasonably acceptable level, however, improved signal constellations with appropriate bit labeling are possible, resulting in improved performance characteristics, including reduced power consumption.

It is, therefore, desirable to have high order modulation based on improved signal constellation and bit labeling designs for enhanced performance characteristics, including decreased power consumption.

SOME EXEMPLARY EMBODIMENTS

The present invention advantageously addresses the needs above, as well as other needs, by providing methods, systems and software for high order signal modulation based on improved signal constellation and bit labeling designs for enhanced performance characteristics, including decreased power consumption.

According to exemplary embodiments, methods and apparatuses are provided for modulation and demodulation of signals based on an 8-ary, 1+7APSK signal constellation of improved bit labeling and coordinates.

According to further exemplary embodiments, methods and apparatuses are provided for modulation and demodulation of signals based on a 16-ary, 6+10APSK signal constellation of improved bit labeling and coordinates.

According to further exemplary embodiments, methods and apparatuses are provided for modulation and demodulation of signals based on a 32-ary, 16+16APSK signal constellation and two 32-ary, 4+12+16APSK signal constellations of improved bit labeling and coordinates.

According to further exemplary embodiments, methods and apparatuses are provided for modulation and demodulation of signals based on a 64-ary, 8+16+20+20APSK signal constellation of improved bit labeling and coordinates, and a 64-ary 12+16+16+20 signal constellation.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A and 1B illustrate communications systems capable of employing signal constellations in accordance with various exemplary embodiments;

FIGS. 2C and 2D illustrate block diagrams of exemplary decoder systems configured to operate in the systems of FIGS. 1A and 1B, in accordance with exemplary embodiments;

FIG. 9 is a diagram of a chip set that can be used to implement exemplary embodiments.

DETAILED DESCRIPTION

Methods, systems, and software for high order modulation based on improved signal constellation and bit labeling designs for enhanced performance characteristics, including decreased power consumption, are described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
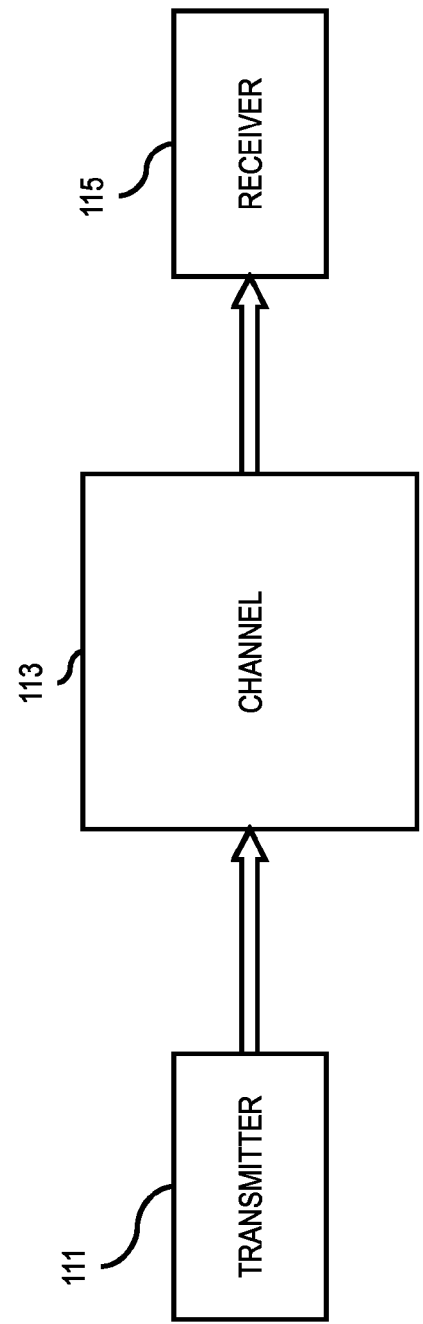

FIGS. 1A and 1B illustrate communications systems capable of utilizing constellation and bit labeling designs according to various exemplary embodiments of the present invention. A digital communications system 110 includes one or more transmitters 111 (of which one is shown) that generate signal waveforms across a communication channel 113 to one or more receivers 115 (of which one is shown). In this discrete communications system 110, the transmitter 111 has a message source that produces a discrete set of possible messages, where each of the possible messages has a corresponding signal waveform. These signal waveforms are attenuated, or otherwise altered, by communications channel 113. To combat the noise channel 113, coding is utilized. For example, forward error correction (FEC) codes can be employed.

FEC is required in terrestrial and satellite systems to provide high quality communication over a radio frequency (RF) propagation channel, which induces signal waveform and spectrum distortions, including signal attenuation (freespace propagation loss), multi-path induced fading and adjacent channel interference. These impairments drive the design of the radio transmission and receiver equipment; exemplary design objectives include selecting modulation formats, error control schemes, demodulation and decoding techniques and hardware components that together provide an efficient balance between system performance and implementation complexity. Differences in propagation channel characteristics, such as between terrestrial and satellite communication channels, naturally result in significantly different system designs. Likewise, existing communications systems continue to evolve in order to satisfy increased system requirements for new higher rate or higher fidelity communication services.

FIG. 1B is a diagram of an exemplary satellite communications system 120 capable of supporting communication among terminals with varied capabilities, according to an embodiment of the present invention.

Satellite communications system 120 includes a satellite 121 that supports communication among multiple satellite terminals (STs) 123, 125 and a hub 127. The HUB 127 may assume the role of a Network Operations Center (NOC), which controls the access of the STs 123, 125 to the system 120 and also provides element management functions and control of the address resolution and resource management functionality. The Satellite communications system 120 may operate as a traditional bent-pipe system, where the satellite essentially operates as a repeater. Alternatively, the system 120 may employ a switching or processing satellite supporting mesh communications (point-to-point communications directly between, for example, the two STs 123 and 125).

In a traditional bent-pipe system of an exemplary embodiment, the satellite operates as a repeater or bent pipe, and communications between the ST's 123 and 125 are transmitted over a double-hop path. For example, in a communication from ST 123 to ST 125, over the first hop, the communication is transmitted, via the satellite, from the ST 123 to the HUB 127. The HUB 127 decodes the communication and determines the destination ST 125. The HUB 127 then appropriately addresses and repackages the communication, encodes and modulates it, and transmits the communication over the second hop, via the satellite, to the destination ST 125. Accordingly, the satellite of such a system acts as a bent pipe or repeater, transmitting communications between the HUB 127 and the STs.

In an alternate embodiment, with a communications system 120 that employs a processing satellite (e.g., including a packet switch operating, for example, at a data link layer), the system may support direct unicast (point-to-point) communications and multicast communications among the STs 123, 125. In the case of a processing satellite, the satellite 121 decodes the received signal and determines the destination ST or STs (as the hub 127 would in a bent-pipe system). The satellite 121 then addresses the data accordingly, encodes and modulates it, and transmits the modulated signal, over the channel 113, to the destination ST or STs (e.g., ST 125) The STs 123, 125 provide connectivity to one or more hosts 129, 131, respectively. According to one embodiment of the present invention, the system 120 has a fully meshed architecture, whereby the STs 123, 125 may directly communicate.

In certain embodiments, for terminals of differing capabilities to communicate with each other, an exchange of information regarding the capabilities among the communicating terminals is needed. Specifically, the common air interface needs to support a discovery of the terminal's capabilities profile (or context information). These capabilities can include encryption scheme, compression scheme, segmentation and reassembly (SAR) scheme, automatic repeat request (ARQ) scheme, Quality-of-Service (QoS) parameters, power levels, modulation and coding schemes, power control algorithms, and link adaptation capabilities.

Under a conventional approach, terminal profile can be readily exchanged over a network with a star topology where no peer-to-peer communication exists. For example, in the General Packet Radio Service (GPRS)/Universal Mobile Telecommunications System (UMTS) family of protocols, such capabilities profiles include a packet data protocol (PDP) context and a mobility management context. In an exemplary embodiment, the concepts of PDP context and mobility management context are combined and the term packet data protocol (PDP) context is used in general to refer to terminal capabilities. It is recognized that these terminals can be mobile as well as non-mobile. According to an exemplary embodiment, this PDP context, for example, which can provide information about the encryption algorithm, compression algorithm, modes of data link layer communication, and physical layer transfer capabilities is combined by the transmit ST with the Quality of Service (QoS) of a pending data flow to determine a packet transfer context to use in transmission of the flow. If a PDP context has been previously established, then the sending ST can autonomously create the packet transfer context, which both satisfies the QoS of the data flow and is compatible with the receive ST capabilities.

According to one embodiment, the exchange of terminal profile can be executed over a meshed network, in a peer-to-peer manner. The STs 123, 125 support the use of a negotiation procedure to determine the optimal configuration for transmission and reception of data. If a protocol implements control procedures or options in newer versions (i.e., flow-control/rate-control), older protocol versions are able to detect the initiation as a new unsupported procedure and report the same to the peer with minimal disruption in the flow of traffic.

The ST-ST protocol advantageously takes into account that even for peers of the same version, some capabilities may not necessarily be always supported due to local temporal processing/memory/congestion-related constraints. Additionally, the ST-ST protocol design provides for rapid developments in data communication technology. For each ST 123, 125, there exist some configuration information, including network configuration, network service provider (NSP) configuration, software configuration, and user configuration, as indicated by the NOC 127. These configurations relate to the features that the ST 123, 125 supports and offers to the user, and have a direct bearing on the transmission and reception capabilities.

To facilitate the flow of data from one peer ST 123 to another ST 125, potentially configured with different capabilities, a packet transfer context is employed. Such a common feature set depends on the PDP contexts of the two STs 123, 125. Further, this common feature set may also depend on the QoS of the flow, as well as the loading and status of the two STs at that point of time. In an exemplary embodiment, the packet transfer context is unidirectional and valid only for the transmit ST to send packets to the specified receive ST; thus, the packet transfer context may be unique to a given pair of STs.

Figure 2A:
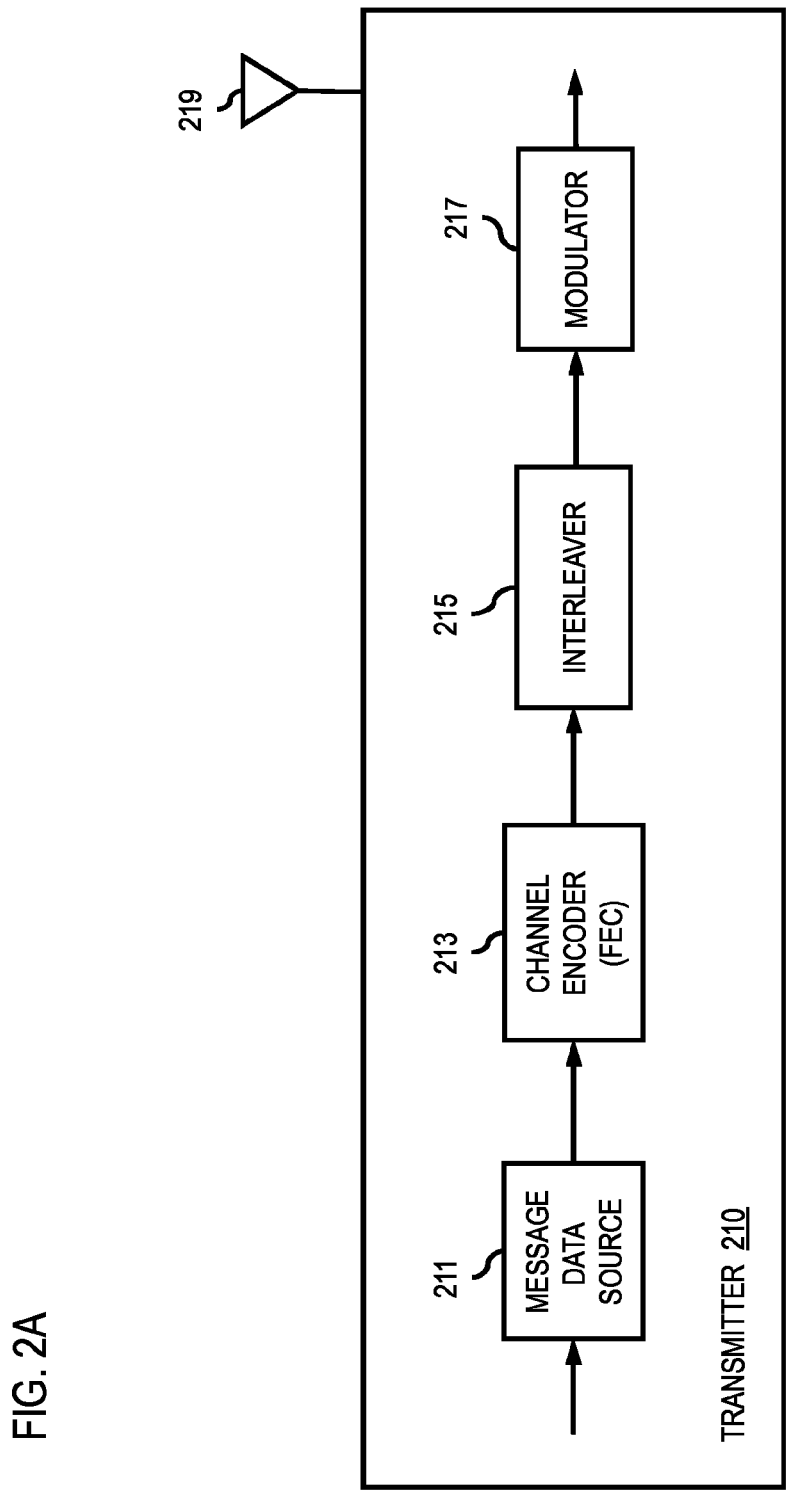
FIG. 2A illustrates a block diagram of an exemplary transmitter configured to operate in the systems of FIGS. 1A and 1B, in accordance with exemplary embodiments.

FIG. 2A illustrates a block diagram of an exemplary transmitter 210 configured to operate in the systems of FIGS. 1A and 1B, in accordance with exemplary embodiments of the present invention. The transmitter 210 is equipped with a channel encoder (FEC encoder) 213 that accepts input from a data source 211 and outputs coded stream of higher redundancy suitable for error correction processing at the receiver (shown in FIG. 2B). Essentially, the encoder 213 generates the coded stream, and passes it to an interleaver 215, which reorders the sequence of symbols or bits from the encoder in a predetermined manner. The interleaved signal is fed to a modulator 217, which maps the encoded messages to signal waveforms, based in part on the signal constellations in accordance with the various exemplary embodiments of the present invention. The signal waveforms are then transmitted, via the transmit antenna 219, over the communication channel 113 to the satellite 121.

Binary FEC codes can effectively be used by the channel encoder 213 with any high order modulation of the modulator 217, which eliminates the need for modulation specific trellis coded modulation (or its derivatives), and hence greatly simplifies implementation. Where low density parity check (LDPC) codes are employed for the FEC coding, the role of the bit interleaver 215 is unique in the context of designing DVB-S2 codes. In that context, the bit interleaver facilitates the assignment of LDPC bit nodes of varying degrees to high order modulation bits of varying vulnerability to channel noise. An appropriately chosen bit interleaver thus achieves significant performance improvement when LDPC codes are used. On the other hand, where LDPC codes are not employed for the FEC code, the bit interleaver 113 would be useful only for reduction of correlation in an iterative receiver. The functionality of the bit interleaver in the context of LDPC coded high order modulation, therefore, differs from that of the bit interleavers used in bit interleaved coded modulation.

Figure 2B:
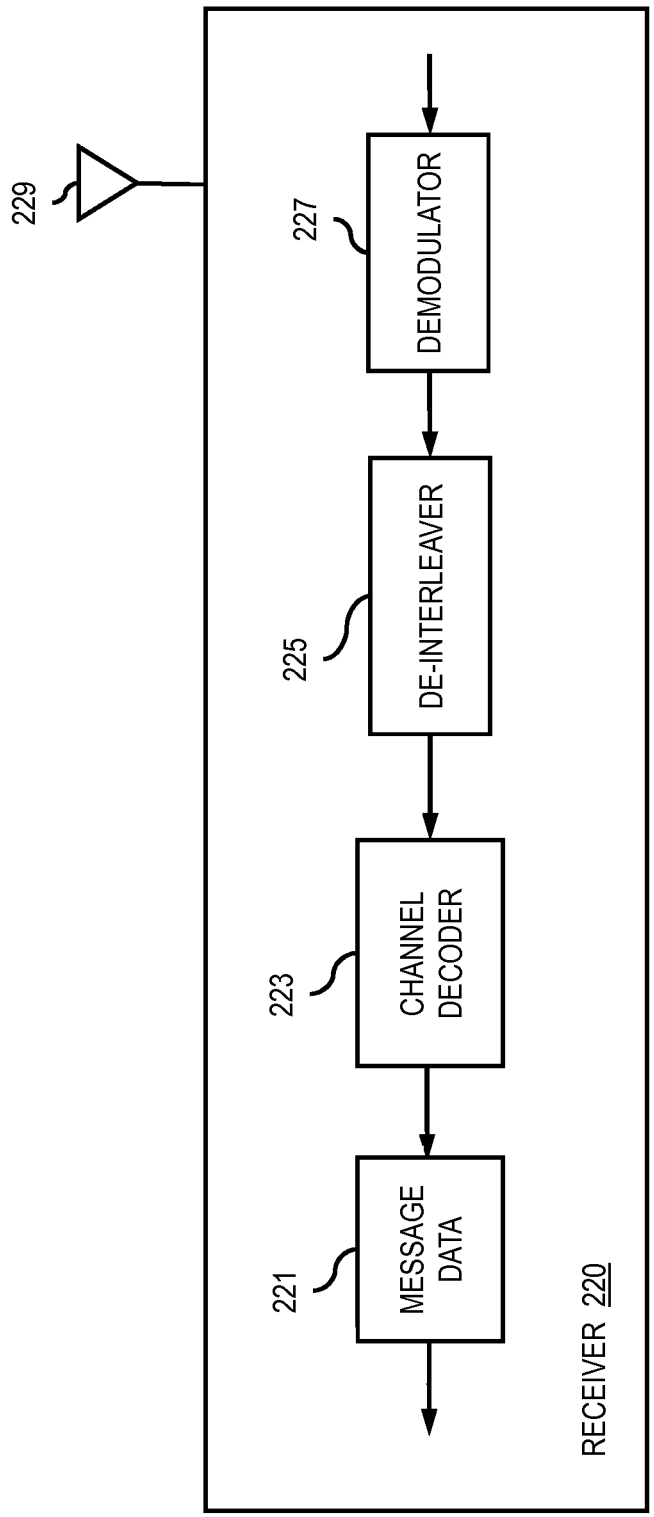
FIG. 2B illustrates a block diagram of an exemplary receiver configured to operate in the systems of FIGS. 1A and 1B, in accordance with exemplary embodiments.

FIG. 2B illustrates a block diagram of an exemplary receiver configured to operate in the systems of FIGS. 1A and 1B, in accordance with exemplary embodiments of the present invention. The receiver comprises receive antenna 229, demodulator 227, de-interleaver 225 and channel decoder 223. The receive antenna 229 receives the signal waveform transmitted over the channel 113 from the satellite 121. The demodulator 227 demodulates the received signal waveforms, based in part on the signal constellation, of the various embodiments of the present invention, employed for the modulation, to obtain the encoded signals. The de-interleaver reorders the sequence of symbols or bits based on the predetermined manner of interleaving at the transmitter 210. The channel decoder then decodes the de-interleaved bit sequence to generate the message data 221.

Figure 2D:
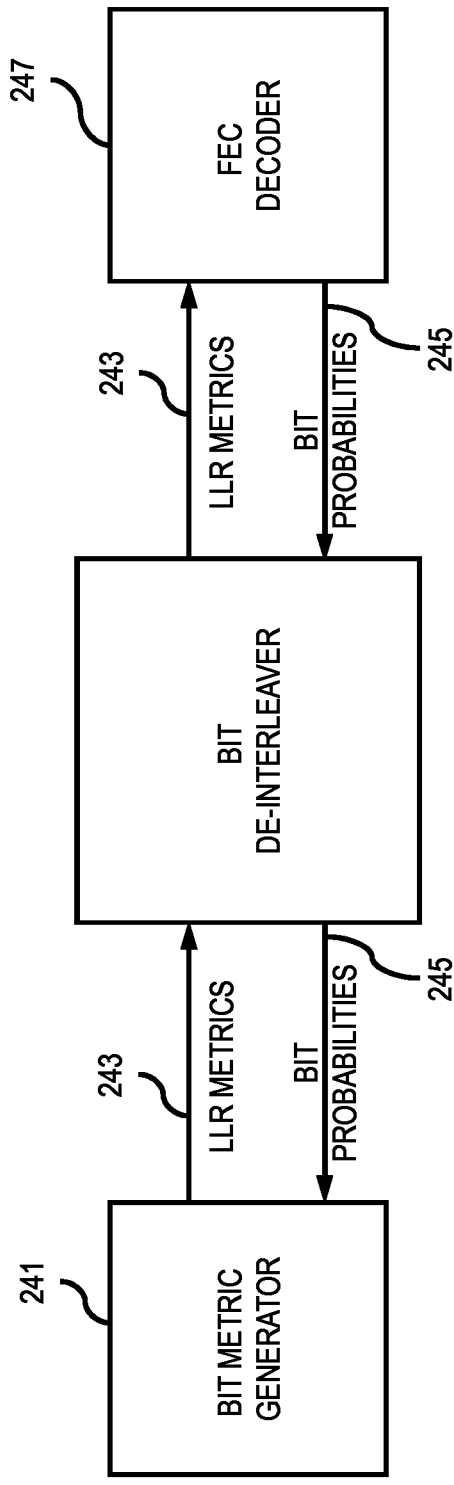

FIG. 2C illustrates a general DVB-S2 type decoder system 230, where the log-likelihood ratio (LLR) metrics 233 have been pre-computed and stored in the LLR tables 231. Alternatively, as depicted in FIG. 2D, the decoder system 240 reflects an iterative decoder, employing a bit metric generator 241, where the LLR metrics 243 are iteratively regenerated based on the bit probability feedback 245 from the FEC decoder 247. The regeneration of input metrics to the decoder generally improves performance at the expense of more complexity.

The modulator 217, of FIG. 2A for example, can generate a modulated waveform from any set of data symbols, leading to the concept of a signal constellation. A signal constellation is a set of M vectors, $\{x_i\}$, where i=0, . . . , M−1. The corresponding set of modulated waveforms $\{x_i(t)\}$, where i=0, . . . , M−1 is a signal set. Each distinct point in the signal constellation corresponds to a different modulated waveform, where all waveforms share the same set of basis functions. The component of the $i^{th}$ vector $x_i$, along the $n^{th}$ basis function $\phi_n(t)$ is denoted $x_{in}$. The occurrence of a particular data symbol in the constellation determines the probability of the $i^{th}$ vector (and thus of the $i^{th}$ waveform), $p_x(i)$. The constellation diagram shows the phases of the symbols and their relationship to each other. The x-axis projection for each symbol represents the I-channel amplitude, and the y-axis projection for each symbol represents the Q-channel amplitude. The constellation diagram depicts the baseband ($f_c$=0), so the signals are reflected as points.

The power available in a communication system limits the average amount of energy required to transmit each successive data symbol. Accordingly, the concept of average energy represents an important concept for a signal constellation. The average energy per symbol of a signal constellation, of M possible waveforms where $\Sigma_{i=0}^{M-1} p_x(i)=1$, can be represented as $\epsilon_x \triangleq E[\|x\|^2] = \Sigma_{i=0}^{M-1} \|x_i\|^2 p_x(i)$, where $\|x_i\|^2$ is the squared-length of the vector $x_i$, $\|x_i\|^2 \triangleq \Sigma_{n=1}^{N} x_{in}^2$, $p_x(i)$ is the probability of sending the $i^{th}$ symbol, and E denotes expected or mean value. Further, the average energy relates to average power, which can be represented as $$P_x = \frac{\epsilon_x}{T},$$

where T is me symbol interval. Minimization of power requirements reduces burdens on the transmitter design (e.g., component costs, size, thermal issues, etc.). Alternatively, at the same power levels, a reduction in power consumption (e.g., energy per symbol) leaves room for increased transmission throughput.

Minimization of the average energy results in signal constellation points placed near the origin. Placing the points near the origin, however, results in a lower probability of being able to correctly detect the symbols. Transmission over the satellite channel distorts the signal by adding both noise and adjacent carrier interference, and the distance between the signal constellation points relates to the probability of correctly detecting the symbols from the distorted signal. Accordingly, the goal of the signal constellation design is to optimally arrange the points in a vector space with minimum average energy, while maintaining at least a minimum distance between each pair of points.

Figure 3A:
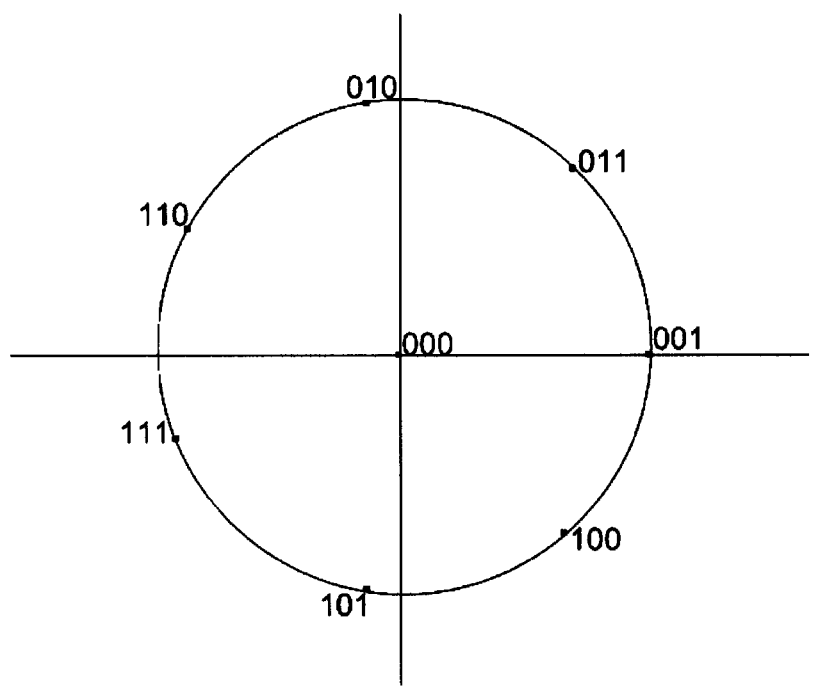
FIG. 3A illustrates an 8-ary, 1+7APSK signal constellation, in accordance with an exemplary embodiment.

According to an exemplary embodiment, an 8-ary, 1+7APSK constellation, with associated bit labeling, is shown in FIG. 3A. With respect to the nomenclature, 1+7APSK, the first number (1) denotes the number of constellation points on the inner ring (in this case the origin), and the second number (7) denotes the number of constellation points on the outer ring. Alternatively, the bit positioning for the signal constellation of FIG. 3A can be expressed as follows (where $\epsilon_x$ represents average energy per symbol):

| Bit Label | [x, y] Coordinates |
| --- | --- |
| 000 | [0.0, 0.0] |
| 001 | [$\sqrt{8.0 * \epsilon_x/7.0}$, 0.0] |
| 010 | [$\sqrt{8.0 * \epsilon_x/7.0} * \cos(4.0 * \pi/7.0)$, $\sqrt{8.0 * \epsilon_x/7.0} * \sin(4.0 * \pi/7.0)$] |
| 011 | [$\sqrt{8.0 * \epsilon_x/7.0} * \cos(2.0 * \pi/7.0)$, $\sqrt{8.0 * \epsilon_x/7.0} * \sin(2.0 * \pi/7.0)$] |
| 100 | [$\sqrt{8.0 * \epsilon_x/7.0} * \cos(12.0 * \pi/7.0)$, $\sqrt{8.0 * \epsilon_x/7.0} * \sin(12.0 * \pi/7.0)$] |
| 101 | [$\sqrt{8.0 * \epsilon_x/7.0} * \cos(10.0 * \pi/7.0)$, $\sqrt{8.0 * \epsilon_x/7.0} * \sin(10.0 * \pi/7.0)$] |
| 110 | [$\sqrt{8.0 * \epsilon_x/7.0} * \cos(6.0 * \pi/7.0)$, $\sqrt{8.0 * \epsilon_x/7.0} * \sin(6.0 * \pi/7.0)$] |
| 111 | [$\sqrt{8.0 * \epsilon_x/7.0} * \cos(8.0 * \pi/7.0)$, $\sqrt{8.0 * \epsilon_x/7.0} * \sin(8.0 * \pi/7.0)$] |

Accordingly, in a system 120, for example, the transmitter 210 of an ST 123, through the modulator 217, may be configured to modulate one or more signals based on the signal constellation of FIG. 3A. The ST 123 would then transmit the modulated signal over the channel 113 to the satellite 121. The satellite 121, as a bent-pipe satellite, may then transmit the signal over the channel 113, through the hub 127, to the destination ST or STs (e.g., ST 125). Alternatively, the satellite 121, as a processing satellite, may decode the signal to determine the destination ST or ST's, address the data accordingly, and re-encode and modulate the data, and transmit the modulated signal directly to the destination ST or STs (e.g., ST 125). Employing the signal constellation of FIG. 3A, the system 120 can achieve enhanced performance, such as decreased power consumption and/or enhanced throughput.

Figure 3B:
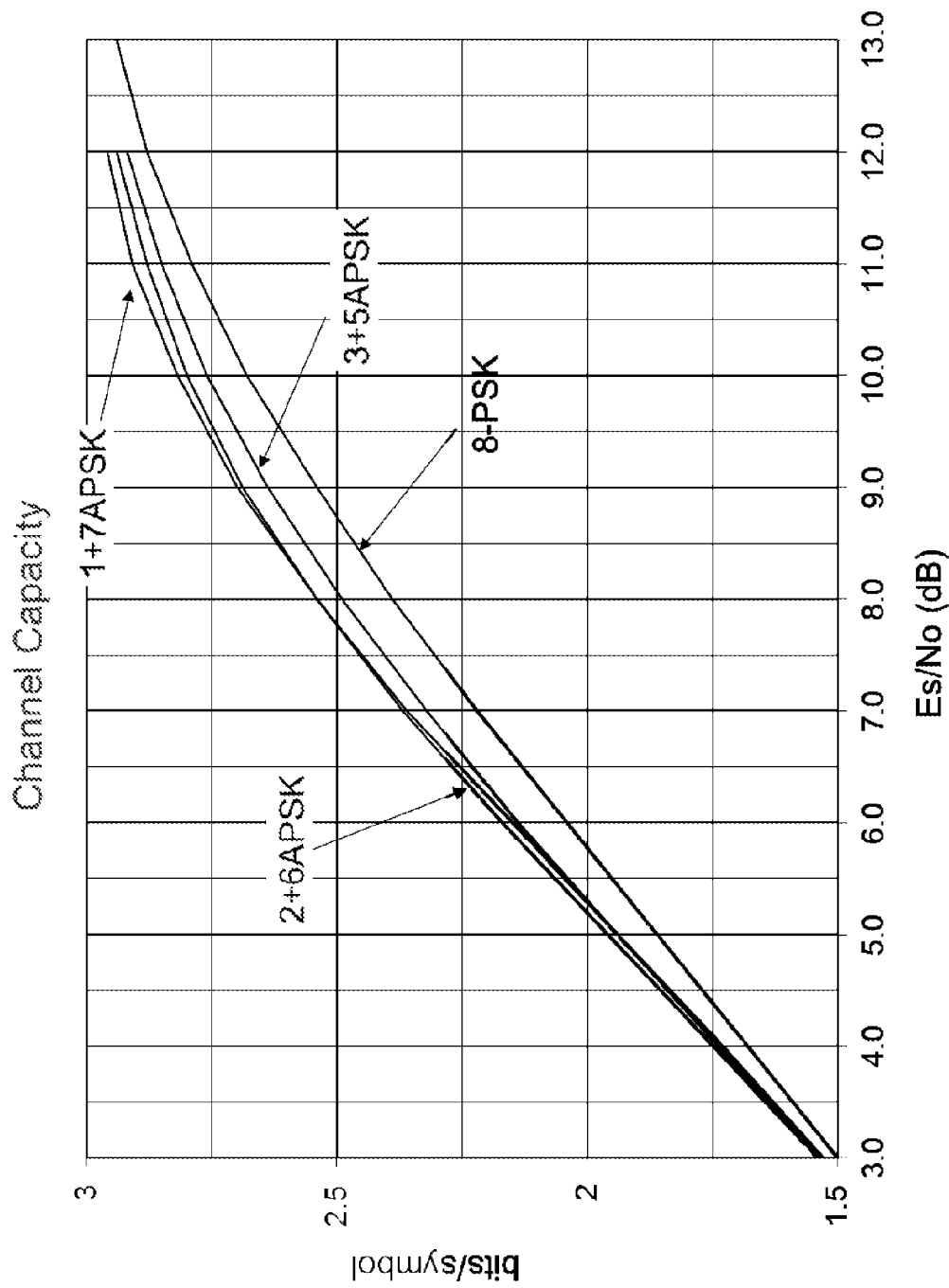
FIG. 3B illustrates a theoretical channel capacity curve for the signal constellation of FIG. 3A compared to theoretical channel capacity curves for other comparable signal constellations.
Figure 3C:
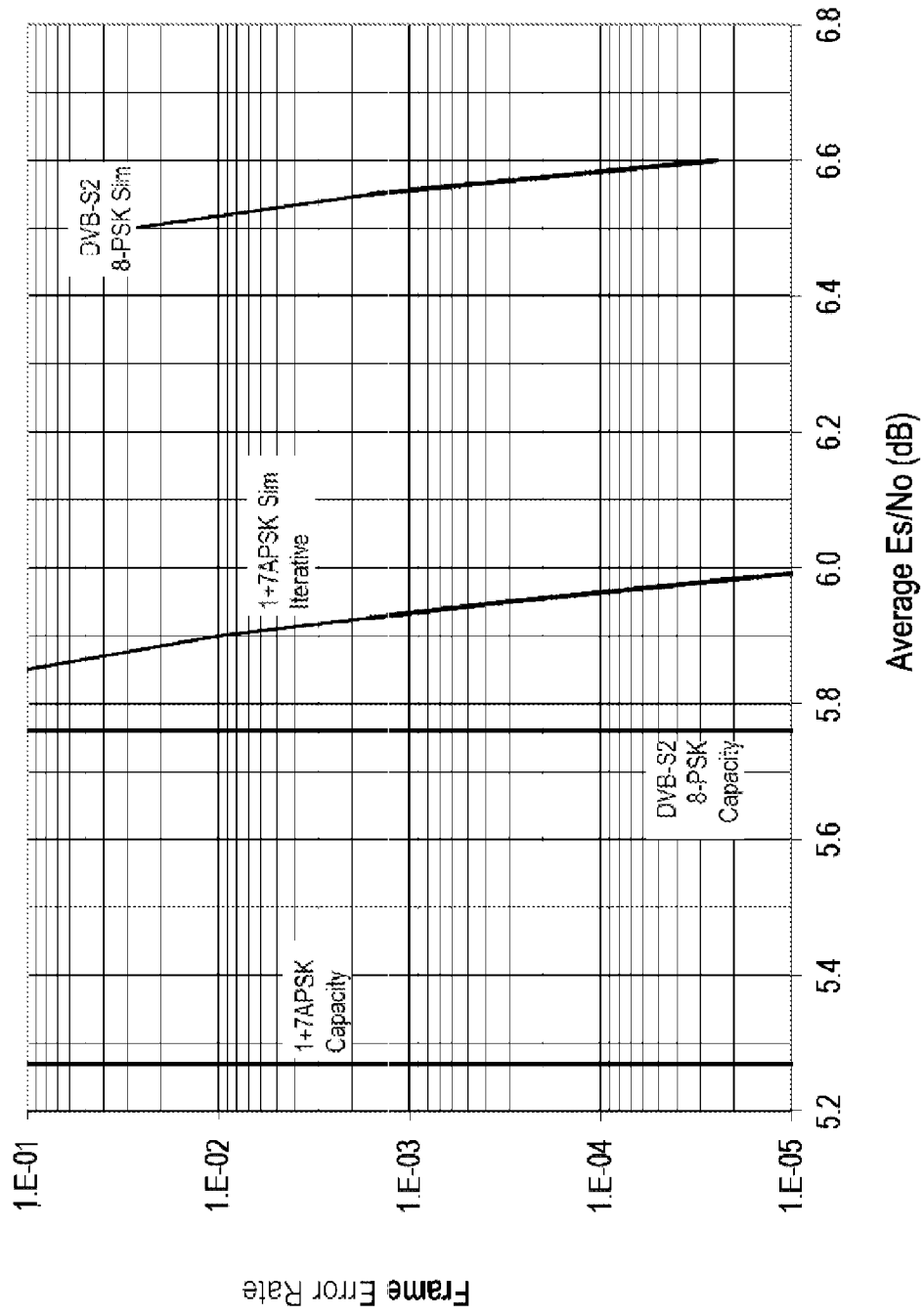
FIGS. 3C and 3D illustrate simulated performance curves for the signal constellation of FIG. 3A compared to simulated performance curves for other comparable signal constellations.
Figure 3D:
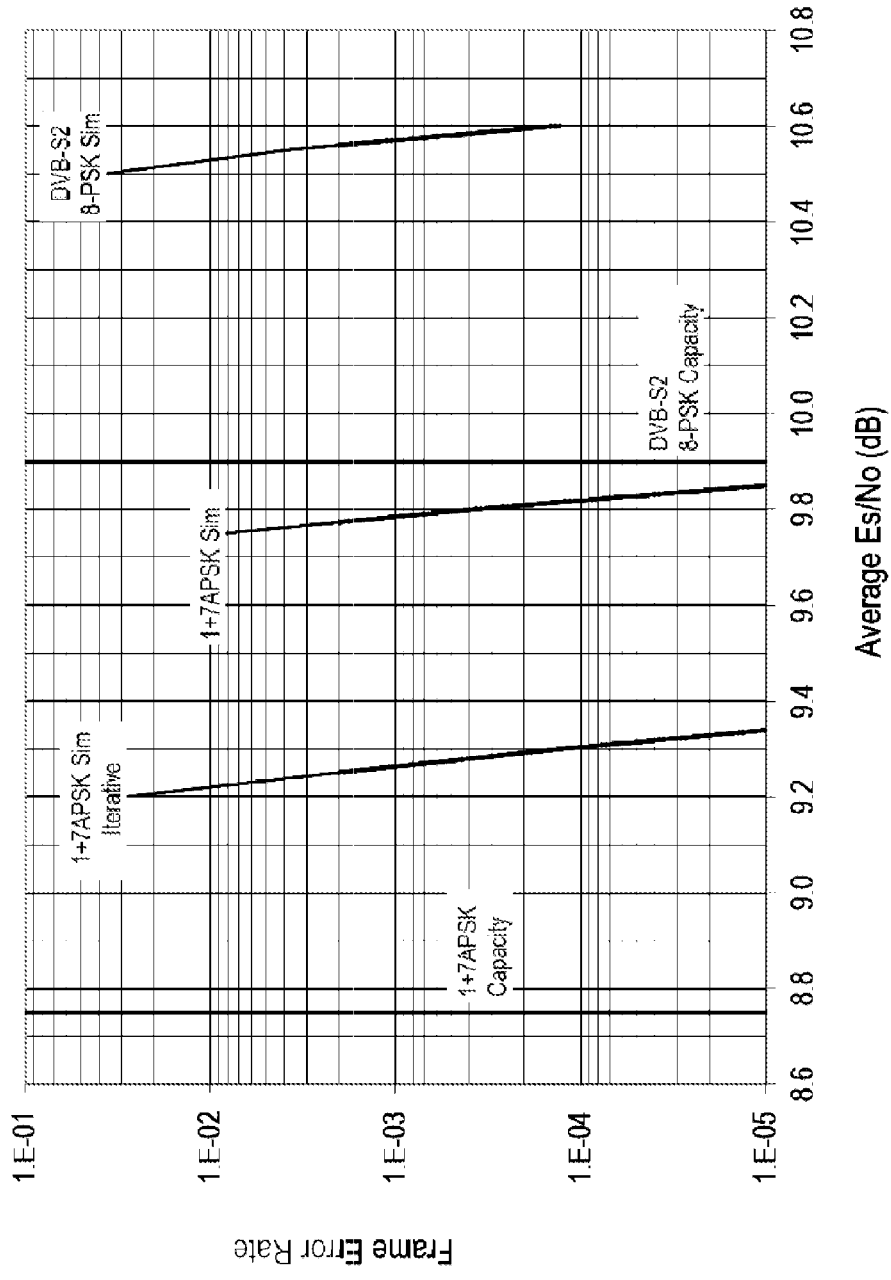

A plot of the theoretical channel capacity curves for several 8-ary constellations is shown in FIG. 3B, where the capacity curves are irrespective or unrelated to any bit labeling. As can be seen from the capacity curves, the 1+7APSK constellation achieves the optimal capacity over the other constellations. From there, through extensive simulation of different bit labeling designs, the optimal bit labeling of FIG. 3A is determined. For further comparison, the performance of the different constellations can be simulated with different FEC codes and iterative versus non-iterative receivers. For example, FIG. 3C depicts the performance (based on an LDPC code of rate 2/3 and N=64,800) for the 1+7APSK constellation of FIG. 3A, with respect to the theoretical capacity, and a simulation using an iterative receiver; as compared with performance curves for the DVB-S2 8-PSK constellation. Further, FIG. 3D depicts the performance (based on an LDPC code of rate 8/9 and N=64,800) for the 1+7APSK constellation of FIG. 3A, with respect to the theoretical capacity, and simulations using iterative and non-iterative receivers; as compared with performance curves for the DVB-S2 8-PSK constellation. As is evident from the performance curves of FIGS. 3C and 3D, the 1+7APSK constellation achieves significant performance improvements over, for example, the DVB-S2 8-PSK constellation (approximately 0.6 dB with a 2/3 rate FEC code, and approximately 0.8 dB with an 8/9 rate code). Further, as is evident from the performance curves of FIG. 3D, the 1+7APSK constellation also achieves significant performance improvements with an iterative receiver as compared to a non-iterative receiver (approximately 0.5 dB).

Moreover, while system performance is generally affected by the particular bit labeling and bit positioning for each constellation, the optimal labeling and bit positions illustrated in FIG. 3A are not unique in that certain specific modifications of bit labeling and bit positioning can achieve equivalent performance. One such modification exists with respect to the bit positions, whereby equivalent performance can be achieved with a 1+7APSK signal constellation as shown in FIG. 3A, but where each of the [x, y] bit positions is rotated by a fixed rotation factor (e.g., each bit position is rotated by the same rotation factor, such as 5 degrees, 7 degrees, 12 degrees, etc.). Other modifications exist with respect to the bit labeling, whereby equivalent performance can be achieved with a 1+7APSK signal constellation as shown in FIG. 3A, but where the bit labeling is modified by interchanging the 0's and 1's (changing each one to a zero and changing each zero to a one in each bit label) and/or by applying a uniform swapping of bit positions within each bit label (uniformly swapping one or more bit positions with one or more corresponding other bit positions in each bit label—e.g., swapping the first and third bit label positions within each bit label). Moreover, any of the foregoing specific modifications can either be applied by itself or in combination with any one or more of the other specific modifications.

Figure 4A:
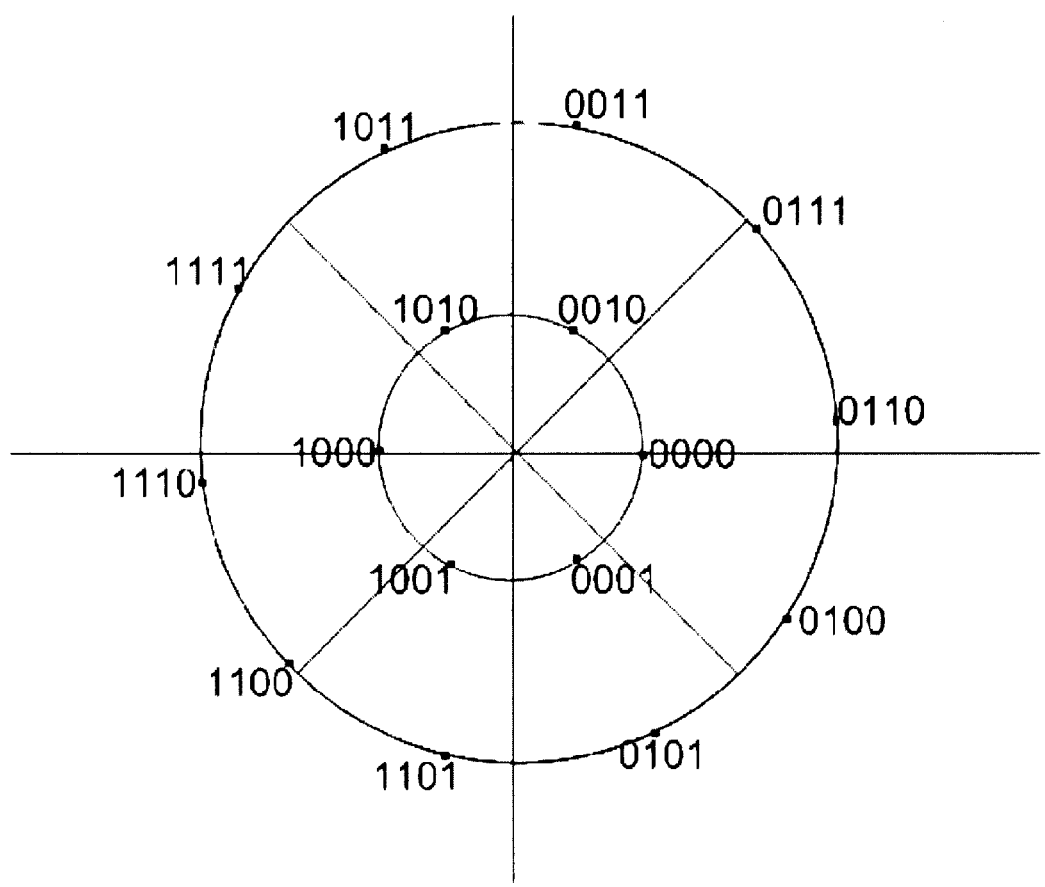
FIG. 4A illustrates a 16-ary, 6+10APSK signal constellation, in accordance with an exemplary embodiment.

According to another exemplary embodiment, a 16-ary, 6+10APSK constellation, with associated bit labeling, is shown in FIG. 4A. With respect to the nomenclature, 6+10APSK, the first number (6) denotes the number of constellation points on the inner ring, and the second number (10) denotes the number of constellation points on the outer ring. Alternatively, the bit positioning for the signal constellation of FIG. 4A can be expressed as follows (where $\epsilon_x$ represents average energy per symbol, $6*R1^2+10*R2^2=16$, and R1 represents the radius of the inner ring and R2 represents the radius of the outer ring):

| Bit Label | [x, y] Coordinates |
|---|---|
| 0000 | [R1 * $\sqrt{\epsilon_x}$, 0.0] |
| 0001 | [R1 * $\sqrt{\epsilon_x}$ * cos (5.0 * π/3.0), R1 * $\sqrt{\epsilon_x}$ * sin (5.0 * π/3.0)] |
| 0010 | [R1 * $\sqrt{\epsilon_x}$ * cos (π/3.0), R1 * $\sqrt{\epsilon_x}$ * sin (π/3.0)] |
| 0011 | [R2 * $\sqrt{\epsilon_x}$ * cos (13.0 * π/30.0), R2 * $\sqrt{\epsilon_x}$ * sin (13.0 * π/30.0)] |
| 0100 | [R2 * $\sqrt{\epsilon_x}$ * cos (55.0 * π/30.0), R2 * $\sqrt{\epsilon_x}$ * sin (55.0 * π/30.0)] |
| 0101 | [R2 * $\sqrt{\epsilon_x}$ * cos (49.0 * π/30.0), R2 * $\sqrt{\epsilon_x}$ * sin (49.0 * π/30.0)] |
| 0110 | [R2 * $\sqrt{\epsilon_x}$ * cos (π/30.0), R2 * $\sqrt{\epsilon_x}$ * sin (π/30.0)] |
| 0111 | [R2 * $\sqrt{\epsilon_x}$ * cos (7.0 * π/30.0), R2 * $\sqrt{\epsilon_x}$ * sin (7.0 * π/30.0)] |
| 1000 | [-R1 * $\sqrt{\epsilon_x}$, 0.0] |
| 1001 | [R1 * $\sqrt{\epsilon_x}$ * cos (4.0 * π/3.0), R1 * $\sqrt{\epsilon_x}$ * sin (4.0 * π/3.0)] |
| 1010 | [R1 * $\sqrt{\epsilon_x}$ * cos (2.0 * π/3.0), R1 * $\sqrt{\epsilon_x}$ * sin (2.0 * π/3.0)] |
| 1011 | [R2 * $\sqrt{\epsilon_x}$ * cos (19.0 * π/30.0), R2 * $\sqrt{\epsilon_x}$ * sin (19.0 * π/30.0)] |
| 1100 | [R2 * $\sqrt{\epsilon_x}$ * cos (37.0 * π/30.0), R2 * $\sqrt{\epsilon_x}$ * sin (37.0 * π/30.0)] |
| 1101 | [R2 * $\sqrt{\epsilon_x}$ * cos (43.0 * π/30.0), R2 * $\sqrt{\epsilon_x}$ * sin (43.0 * π/30.0)] |
| 1110 | [R2 * $\sqrt{\epsilon_x}$ * cos (31.0 * π/30.0), R2 * $\sqrt{\epsilon_x}$ * sin (31.0 * π/30.0)] |
| 1111 | [R2 * $\sqrt{\epsilon_x}$ * cos (25.0 * π/30.0), R2 * $\sqrt{\epsilon_x}$ * sin (25.0 * π/30.0)] |

Figure 4B:
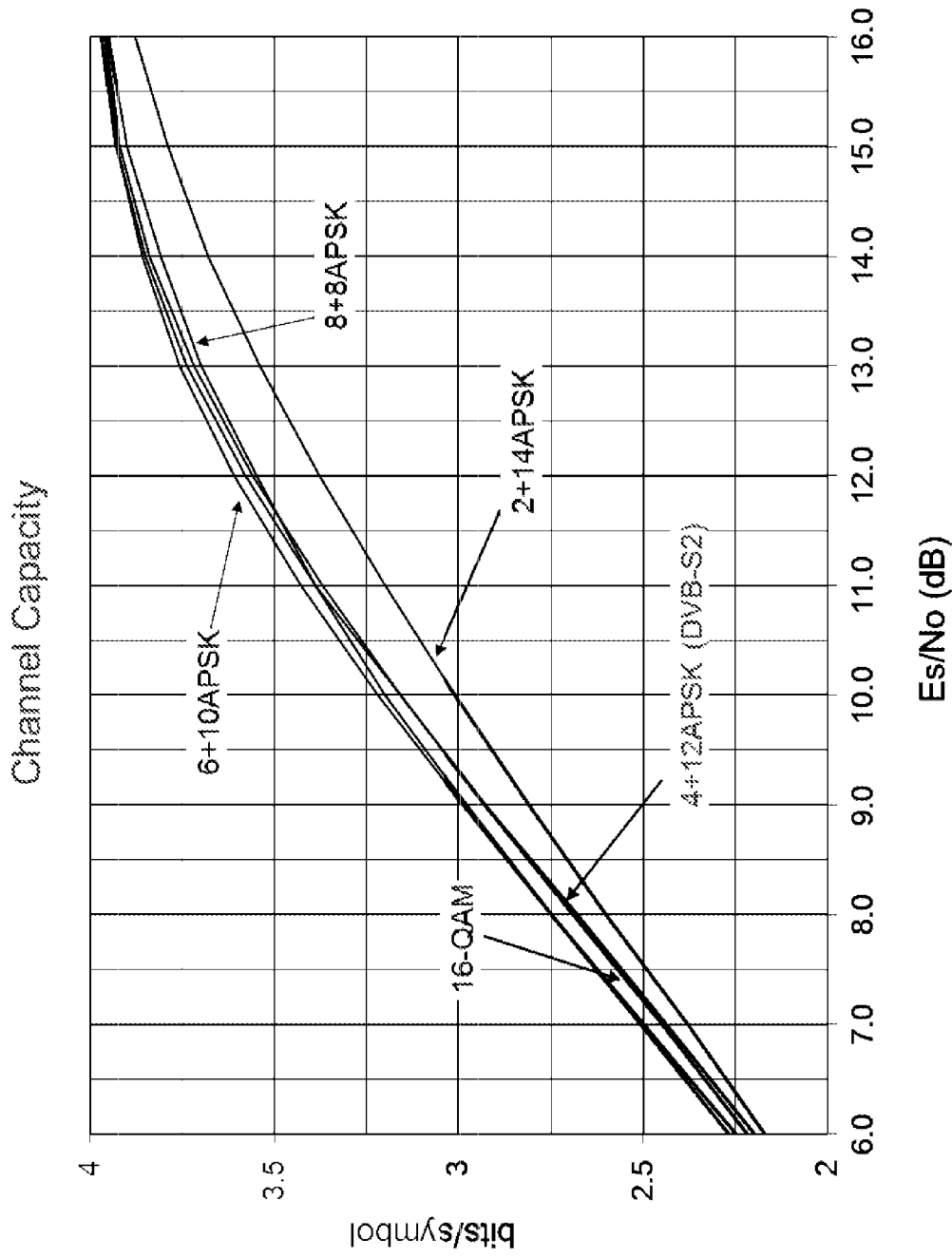
FIG. 4B illustrates a theoretical channel capacity curve for the signal constellation of FIG. 4A compared to theoretical channel capacity curves for other comparable signal constellations.
Figure 4C:
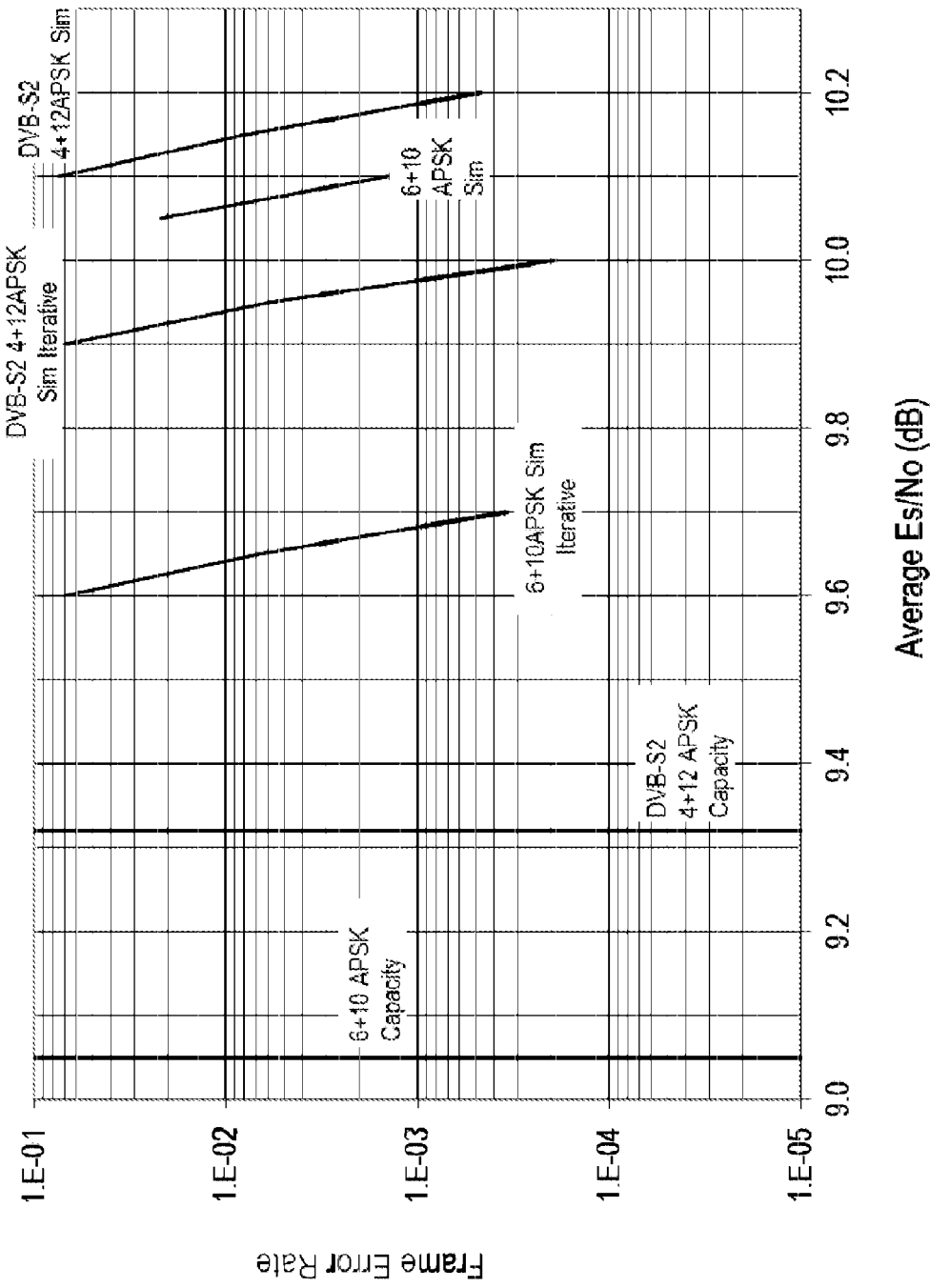
FIGS. 4C and 4D illustrate simulated performance curves for the signal constellation of FIG. 4A compared to simulated performance curves for other comparable signal constellations.
Figure 4D:
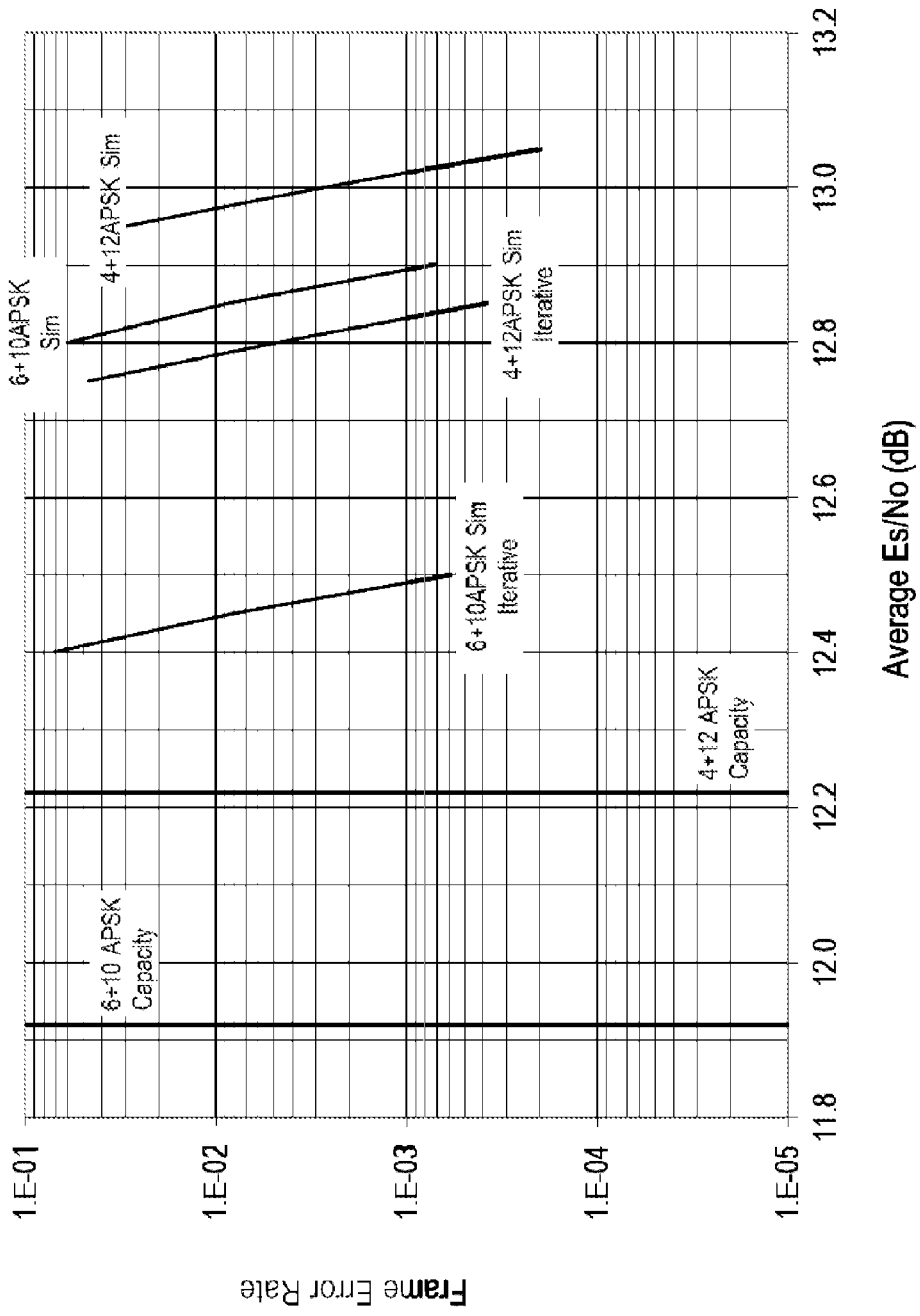

A plot of the theoretical channel capacity curves for several 16-ary constellations is shown in FIG. 4B, where the capacity curves are irrespective or unrelated to any bit labeling. As can be seen from the capacity curves, the 6+10APSK constellation achieves the optimal capacity over the other constellations. From there, through extensive simulation of different bit labeling designs, the optimal bit labeling of FIG. 4A is determined. For further comparison, the performance of the different constellations can be simulated with different FEC codes and iterative versus non-iterative receivers. For example, FIG. 4C depicts the performance (based on an LDPC code of rate 3/4 and N=64,800) for the 6+10APSK constellation of FIG. 4A, with respect to the theoretical capacity, and simulations using iterative and non-iterative receivers; as compared with performance curves for a 4+12APSK constellation. Further, FIG. 4D depicts the performance (based on an LDPC code of rate 9/10 and N=64,800) for the 6+10APSK constellation of FIG. 4A, with respect to the theoretical capacity, and simulations using iterative and non-iterative receivers; as compared with performance curves for the 4+12APSK constellation. As is evident from the performance curves of FIG. 3C, with a 3/4 rate FEC code, the 6+10APSK constellation of FIG. 4A achieves significant performance improvements over, for example, the DVB-S2 4+12APSK constellation (approximately 0.1 dB with a non-iterative receiver, and approximately 0.3 dB with an iterative receiver). Further, as is evident from the performance curves of FIG. 3D, the 6+10APSK constellation of FIG. 4A also achieves significant performance improvements over the DVB-S2 4+12APSK constellation, for example, with a 9/10 rate FEC code (approximately 0.13 dB with a non-iterative receiver, and approximately 0.35 dB with an iterative receiver). Accordingly, here also, in the case of the 6+10APSK constellation, the iterative receiver achieves significant performance improvements with an iterative receiver as compared with a non-iterative receiver.

Accordingly, as described above with respect to the 1+7APSK constellation, by employing the signal constellation of FIG. 4A, a system 120 can achieve enhanced performance, such as decreased power consumption and/or enhanced throughput. Moreover, also as described above with respect to the 1+7APSK constellation, the optimal labeling and bit positions illustrated in FIG. 4A are not unique in that the above-specified modifications of the bit labeling and bit positioning can achieve equivalent performance. With respect to the bit positions, equivalent performance can be achieved with a 6+10APSK signal constellation as shown in FIG. 4A, but where each of the [x, y] bit positions is rotated by a fixed rotation factor (e.g., each bit position is rotated by the same rotation factor). Also, with respect to the bit labeling, equivalent performance can be achieved with a 6+10APSK signal constellation as shown in FIG. 4A, but where the bit labeling is modified by interchanging the 0's and 1's, and/or by applying a uniform swapping of bit positions within each bit label (e.g., swapping the first and third bit label positions within each bit label). Moreover, any of the foregoing specific modifications can either be applied by itself or in combination with any one or more of the other specific modifications.

Figure 5A:
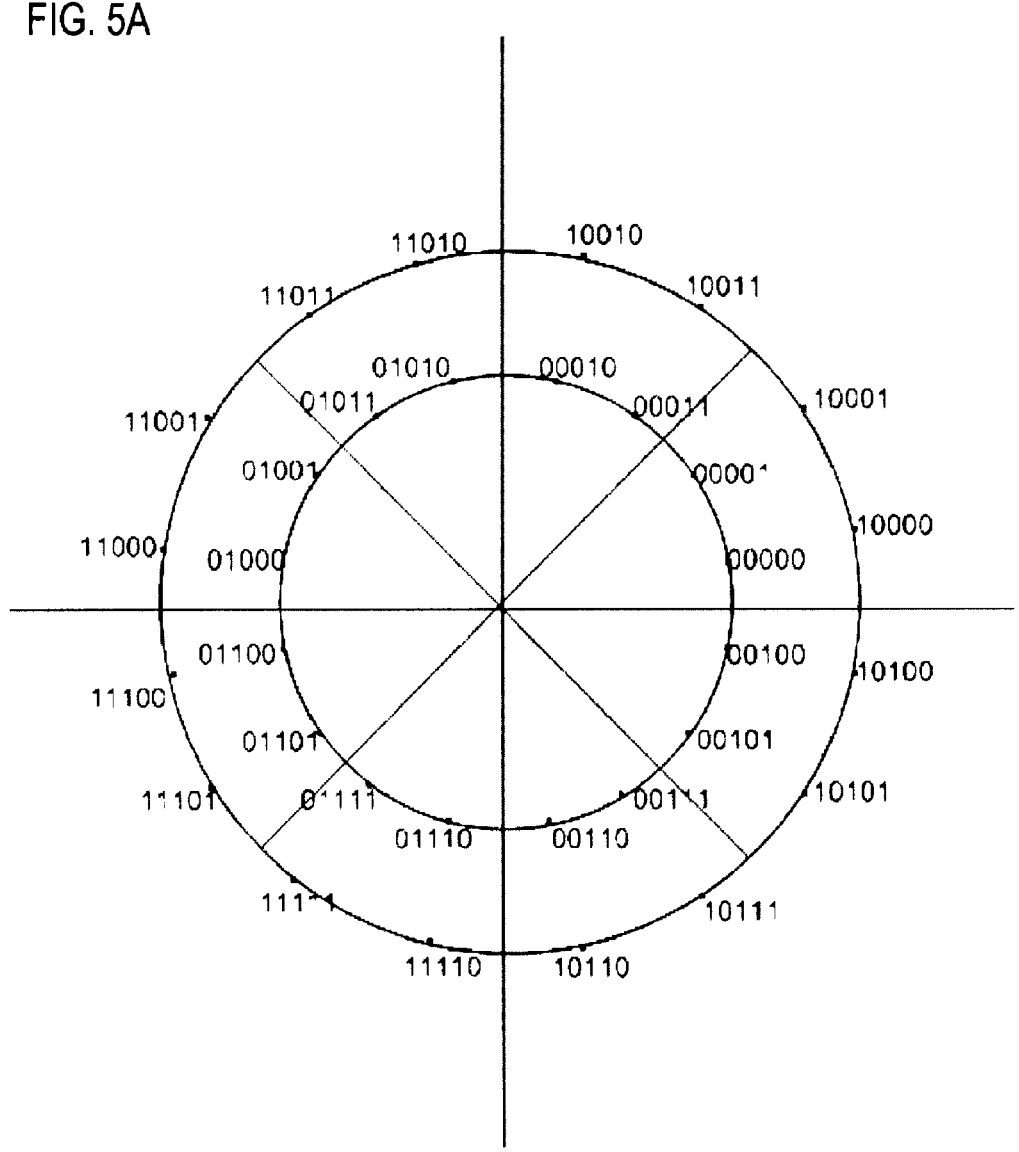
FIG. 5A illustrates a 32-ary, 16+16APSK signal constellation, in accordance with an exemplary embodiment.

According to a further exemplary embodiment, a 32-ary, 16+16APSK constellation, with associated bit labeling, is shown in FIG. 5A. With respect to the nomenclature, 16+16APSK, the first number (16) denotes the number of constellation points on the inner ring, and the second number (16) denotes the number of constellation points on the outer ring. Alternatively, the bit positioning for the signal constellation of FIG. 5A can be expressed as follows (where $\epsilon_x$ represents average energy per symbol, $R1^2+R2^2=2$, and R1 represents the radius of the inner ring and R2 represents the radius of the outer ring):

| Bit Label | [x, y] Coordinates |
|---|---|
| 00000 | [R1 * $\sqrt{\epsilon_x}$ * cos(π/16.0), R1 * $\sqrt{\epsilon_x}$ * sin(π/16.0)] |
| 00001 | [R1 * $\sqrt{\epsilon_x}$ * cos(3.0 * π/16.0), R1 * $\sqrt{\epsilon_x}$ * sin(3.0 * π/16.0)] |
| 00010 | [R1 * $\sqrt{\epsilon_x}$ * sin(π/16.0), R1 * $\sqrt{\epsilon_x}$ * cos(π/16.0)] |
| 00011 | [R1 * $\sqrt{\epsilon_x}$ * sin(3.0 * π/16.0), R1 * $\sqrt{\epsilon_x}$ * cos(3.0 * π/16.0)] |
| 00100 | [R1 * $\sqrt{\epsilon_x}$ * cos(π/16.0), -R1 * $\sqrt{\epsilon_x}$ * sin(π/16.0)] |
| 00101 | [R1 * $\sqrt{\epsilon_x}$ * cos(3.0 * π/16.0), -R1 * $\sqrt{\epsilon_x}$ * sin(3.0 * π/16.0)] |
| 00110 | [R1 * $\sqrt{\epsilon_x}$ * sin(π/16.0), -R1 * $\sqrt{\epsilon_x}$ * cos(π/16.0)] |
| 00111 | [R1 * $\sqrt{\epsilon_x}$ * sin(3.0 * π/16.0), -R1 * $\sqrt{\epsilon_x}$ * cos(3.0 * π/16.0)] |
| 01000 | [-R1 * $\sqrt{\epsilon_x}$ * cos(π/16.0), R1 * $\sqrt{\epsilon_x}$ * sin(π/16.0)] |
| 01001 | [-R1 * $\sqrt{\epsilon_x}$ * cos(3.0 * π/16.0), R1 * $\sqrt{\epsilon_x}$ * sin(3.0 * π/16.0)] |
| 01010 | [-R1 * $\sqrt{\epsilon_x}$ * sin(π/16.0), R1 * $\sqrt{\epsilon_x}$ * cos(π/16.0)] |
| 01011 | [-R1 * $\sqrt{\epsilon_x}$ * sin(3.0 * π/16.0), R1 * $\sqrt{\epsilon_x}$ * cos(3.0 * π/16.0)] |
| 01100 | [-R1 * $\sqrt{\epsilon_x}$ * cos(π/16.0), -R1 * $\sqrt{\epsilon_x}$ * sin(π/16.0)] |
| 01101 | [-R1 * $\sqrt{\epsilon_x}$ * cos(3.0 * π/16.0), -R1 * $\sqrt{\epsilon_x}$ * sin(3.0 * π/16.0)] |
| 01110 | [-R1 * $\sqrt{\epsilon_x}$ * sin(π/16.0), -R1 * $\sqrt{\epsilon_x}$ * cos(π/16.0)] |
| 01111 | [-R1 * $\sqrt{\epsilon_x}$ * sin(3.0 * π/16.0), -R1 * $\sqrt{\epsilon_x}$ * cos(3.0 * π/16.0)] |
| 10000 | [R2 * $\sqrt{\epsilon_x}$ * cos(π/16.0), R2 * $\sqrt{\epsilon_x}$ * sin(π/16.0)] |
| 10001 | [R2 * $\sqrt{\epsilon_x}$ * cos(3.0 * π/16.0), R2 * $\sqrt{\epsilon_x}$ * sin(3.0 * π/16.0)] |
| 10010 | [R2 * $\sqrt{\epsilon_x}$ * sin(π/16.0), R2 * $\sqrt{\epsilon_x}$ * cos(π/16.0)] |
| 10011 | [R2 * $\sqrt{\epsilon_x}$ * sin(3.0 * π/16.0), R2 * $\sqrt{\epsilon_x}$ * cos(3.0 * π/16.0)] |
| 10100 | [R2 * $\sqrt{\epsilon_x}$ * cos(π/16.0), -R2 * $\sqrt{\epsilon_x}$ * sin(π/16.0)] |
| 10101 | [R2 * $\sqrt{\epsilon_x}$ * cos(3.0 * π/16.0), -R2 * $\sqrt{\epsilon_x}$ * sin(3.0 * π/16.0)] |
| 10110 | [R2 * $\sqrt{\epsilon_x}$ * sin(π/16.0), -R2 * $\sqrt{\epsilon_x}$ * cos(π/16.0)] |
| 10111 | [R2 * $\sqrt{\epsilon_x}$ * sin(3.0 * π/16.0), -R2 * $\sqrt{\epsilon_x}$ * cos(3.0 * π/16.0)] |
| 11000 | [-R2 * $\sqrt{\epsilon_x}$ * cos(π/16.0), R2 * $\sqrt{\epsilon_x}$ * sin(π/16.0)] |
| 11001 | [-R2 * $\sqrt{\epsilon_x}$ * cos(3.0 * π/16.0), R2 * $\sqrt{\epsilon_x}$ * sin(3.0 * π/16.0)] |
| 11010 | [-R2 * $\sqrt{\epsilon_x}$ * sin(π/16.0), R2 * $\sqrt{\epsilon_x}$ * cos(π/16.0)] |
| 11011 | [-R2 * $\sqrt{\epsilon_x}$ * sin(3.0 * π/16.0), R2 * $\sqrt{\epsilon_x}$ * cos(3.0 * π/16.0)] |
| 11100 | [-R2 * $\sqrt{\epsilon_x}$ * cos(π/16.0), -R2 * $\sqrt{\epsilon_x}$ * sin(π/16.0)] |
| 11101 | [-R2 * $\sqrt{\epsilon_x}$ * cos(3.0 * π/16.0), -R2 * $\sqrt{\epsilon_x}$ * sin(3.0 * π/16.0)] |
| 11110 | [-R2 * $\sqrt{\epsilon_x}$ * sin(π/16.0), -R2 * $\sqrt{\epsilon_x}$ * cos(π/16.0)] |
| 11111 | [-R2 * $\sqrt{\epsilon_x}$ * sin(3.0 * π/16.0), -R2 * $\sqrt{\epsilon_x}$ * cos(3.0 * π/16.0)] |

Figure 5B:
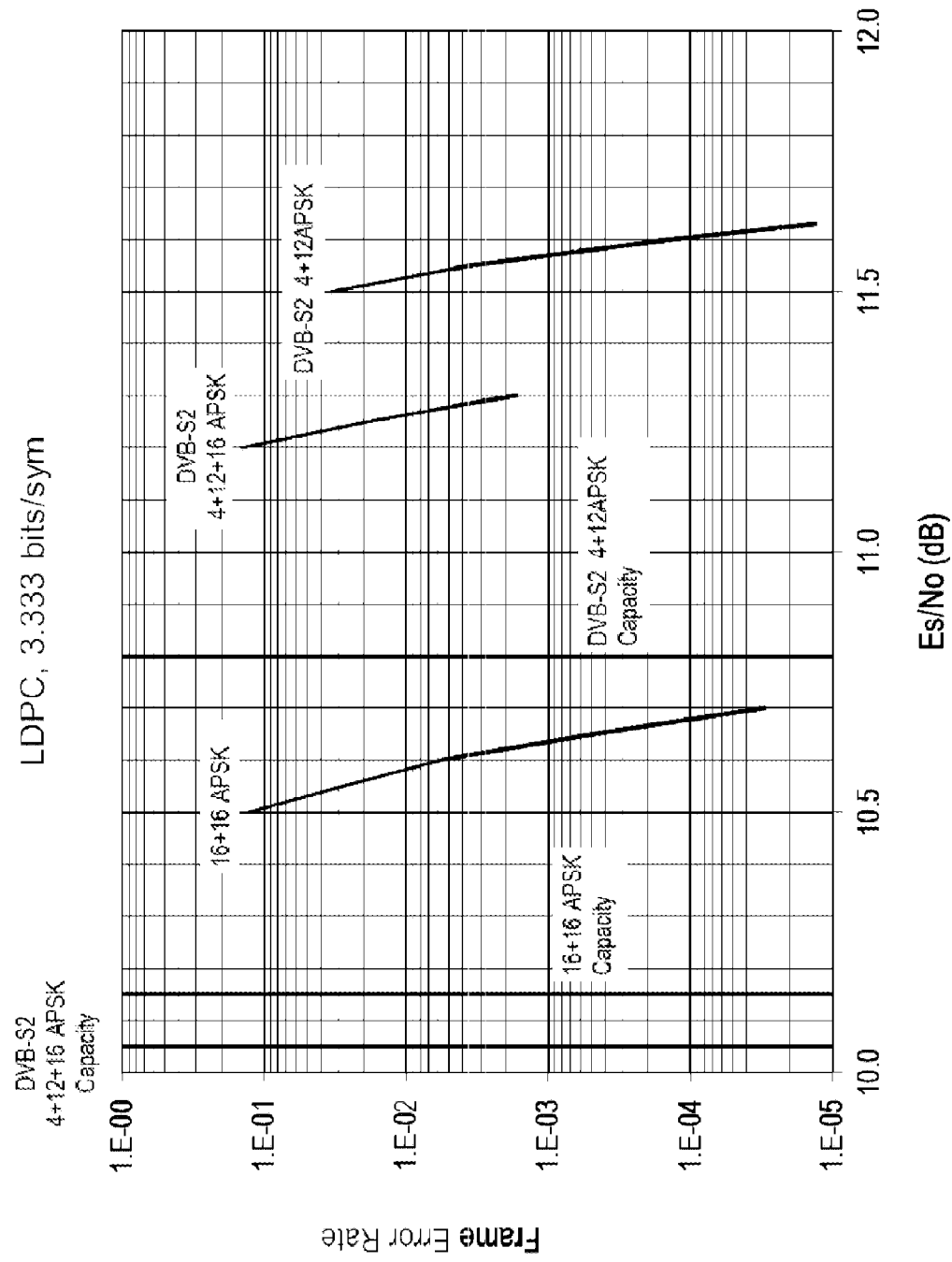
FIG. 5B illustrates simulated performance curves for the signal constellation of FIG. 5A compared to simulated performance curves for other comparable signal constellations.

For comparison, FIG. 5B depicts the performance (based on an LDPC code of 3.333 bits/symbol) for the 16+16APSK constellation of FIG. 5A, with respect to the theoretical capacity; as compared with performance curves for the DVB-S2 4+12+16APSK constellation, and the DVB-S2 4+12APSK constellation. As is evident from the performance curves of FIG. 5B, with a 3.333 bits/symbol FEC code, the 16+16APSK constellation of FIG. 5A achieves significant performance improvements over, for example, the DVB-S2 4+12+16APSK constellation (approximately 0.65 dB).

Accordingly, as described above with respect to the 1+7APSK constellation, by employing the signal constellation of FIG. 5A, a system 120 can achieve enhanced performance, such as decreased power consumption and/or enhanced throughput. Moreover, also as described above with respect to the 1+7APSK constellation, the optimal labeling and bit positions illustrated in FIG. 5A are not unique in that the above-specified modifications of the bit labeling and bit positioning can achieve equivalent performance. With respect to the bit positions, equivalent performance can be achieved with a 16+16APSK signal constellation as shown in FIG. 5A, but where each of the [x, y] bit positions is rotated by a fixed rotation factor (e.g., each bit position is rotated by the same rotation factor). Also, with respect to the bit labeling, equivalent performance can be achieved with a 16+16APSK signal constellation as shown in FIG. 5A, but where the bit labeling is modified by interchanging the 0's and 1's, and/or by applying a uniform swapping of bit positions within each bit label (e.g., swapping the first and third bit label positions within each bit label). Moreover, any of the foregoing specific modifications can either be applied by itself or in combination with any one or more of the other specific modifications.

Figure 6A:
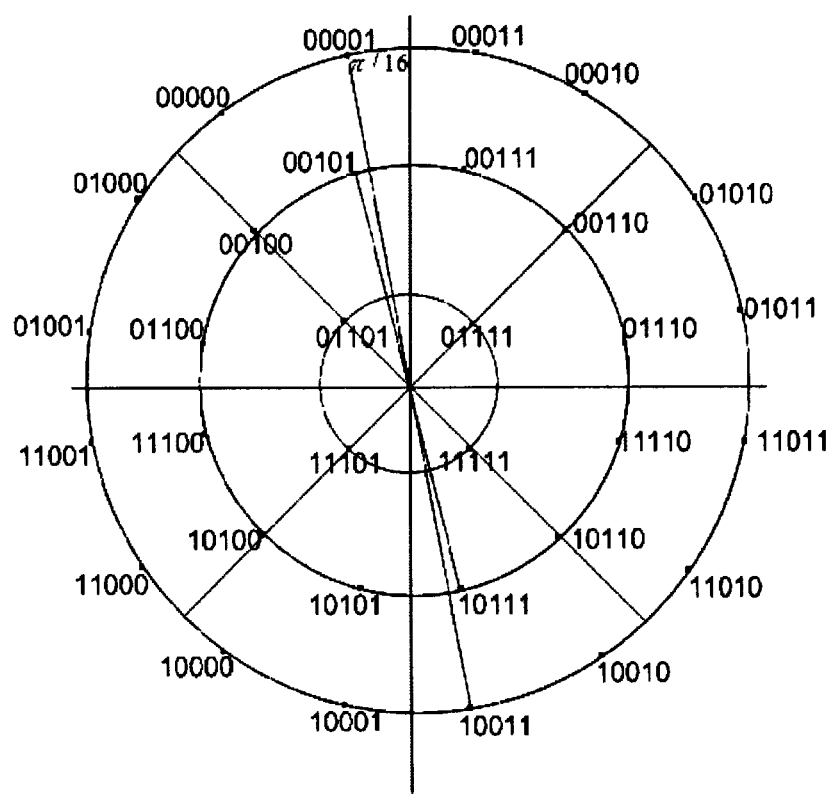
FIG. 6A illustrates a 32-ary, 4+12+16APSK signal constellation, in accordance with an exemplary embodiment.

According to yet a further exemplary embodiment, a 32-ary, 4+12+16APSK constellation, with associated bit labeling, is shown in FIG. 6A. With respect to the nomenclature, 4+12+16APSK, the first number (4) denotes the number of constellation points on the inner-most ring, the second number (12) denotes the number of constellation points on the next ring, and the third number (16) denotes the number of constellation points on the outer ring. Alternatively, the bit positioning for the signal constellation of FIG. 6A can be expressed as follows (where $\epsilon_x$ represents average energy per symbol, $4*R1^2+12*R2^2+16*R3^2=32$, and R1 represents the radius of the inner-most ring, R2 represents the radius of the middle ring and R3 represents the radius of the outer ring):

| Bit Label | [x, y] Coordinates |
|---|---|
| 00000 | [-R3 * $\sqrt{\epsilon_x}$ * cos(5.0 * π/16.0), R3 * $\sqrt{\epsilon_x}$ * cos(3.0 * π/16.0)] |
| 00001 | [-R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [-R2 * $\sqrt{\epsilon_x}$ * sin(π/4.0), R2 * $\sqrt{\epsilon_x}$ * sin(π/4.0)] |
| 00101 | [-R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [-R3 * $\sqrt{\epsilon_x}$ * cos(3.0 * π/16.0), R3 * $\sqrt{\epsilon_x}$ * cos(5.0 * π/16.0)] |
| 01001 | [-R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [-R2 * $\sqrt{\epsilon_x}$ * sin(5.0 * π/12.0), R2 * $\sqrt{\epsilon_x}$ * sin(π/12.0)] |
| 01101 | [-R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [-R3 * $\sqrt{\epsilon_x}$ * cos(5.0 * π/16.0), -R3 * $\sqrt{\epsilon_x}$ * cos(3.0 * π/16.0)] |
| 10001 | [-R3 * $\sqrt{\epsilon_x}$ * cos(7.0 * π/16.0), -R3 * $\sqrt{\epsilon_x}$ * cos(π/16.0)] |
| 10010 | [R3 * $\sqrt{\epsilon_x}$ * cos(5.0 * π/16.0), -R3 * $\sqrt{\epsilon_x}$ * cos(3.0 * π/16.0)] |
| 10011 | [R3 * $\sqrt{\epsilon_x}$ * cos(7.0 * π/16.0), -R3 * $\sqrt{\epsilon_x}$ * cos(π/16.0)] |
| 10100 | [-R2 * $\sqrt{\epsilon_x}$ * sin(π/4.0), -R2 * $\sqrt{\epsilon_x}$ * sin(π/4.0)] |
| 10101 | [-R2 * $\sqrt{\epsilon_x}$ * sin(π/12.0), -R2 * $\sqrt{\epsilon_x}$ * sin(5.0 * π/12.0)] |
| 10110 | [R2 * $\sqrt{\epsilon_x}$ * sin(π/4.0), -R2 * $\sqrt{\epsilon_x}$ * sin(π/4.0)] |
| 10111 | [R2 * $\sqrt{\epsilon_x}$ * sin(π/12.0), -R2 * $\sqrt{\epsilon_x}$ * sin(5.0 * π/12.0)] |
| 11000 | [-R3 * $\sqrt{\epsilon_x}$ * cos(3.0 * π/16.0), -R3 * $\sqrt{\epsilon_x}$ * cos(5.0 * π/16.0)] |
| 11001 | [-R3 * $\sqrt{\epsilon_x}$ * cos(π/16.0), -R3 * $\sqrt{\epsilon_x}$ * cos(7.0 * π/16.0)] |
| 11010 | [R3 * $\sqrt{\epsilon_x}$ * cos(3.0 * π/16.0), -R3 * $\sqrt{\epsilon_x}$ * cos(5.0 * π/16.0)] |
| 11011 | [R3 * $\sqrt{\epsilon_x}$ * cos(π/16.0), -R3 * $\sqrt{\epsilon_x}$ * cos(7.0 * π/16.0)] |
| 11100 | [-R2 * $\sqrt{\epsilon_x}$ * sin(5.0 * π/12.0), -R2 * $\sqrt{\epsilon_x}$ * sin(π/12.0)] |
| 11101 | [-R1 * $\sqrt{\epsilon_x}$ * sin(π/4.0), -R1 * $\sqrt{\epsilon_x}$ * sin(π/4.0)] |
| 11110 | [R2 * $\sqrt{\epsilon_x}$ * sin(5.0 * π/12.0), -R2 * $\sqrt{\epsilon_x}$ * sin(π/12.0)] |
| 11111 | [R1 * $\sqrt{\epsilon_x}$ * sin(π/4.0), -R1 * $\sqrt{\epsilon_x}$ * sin(π/4.0)] |

Figure 6B:
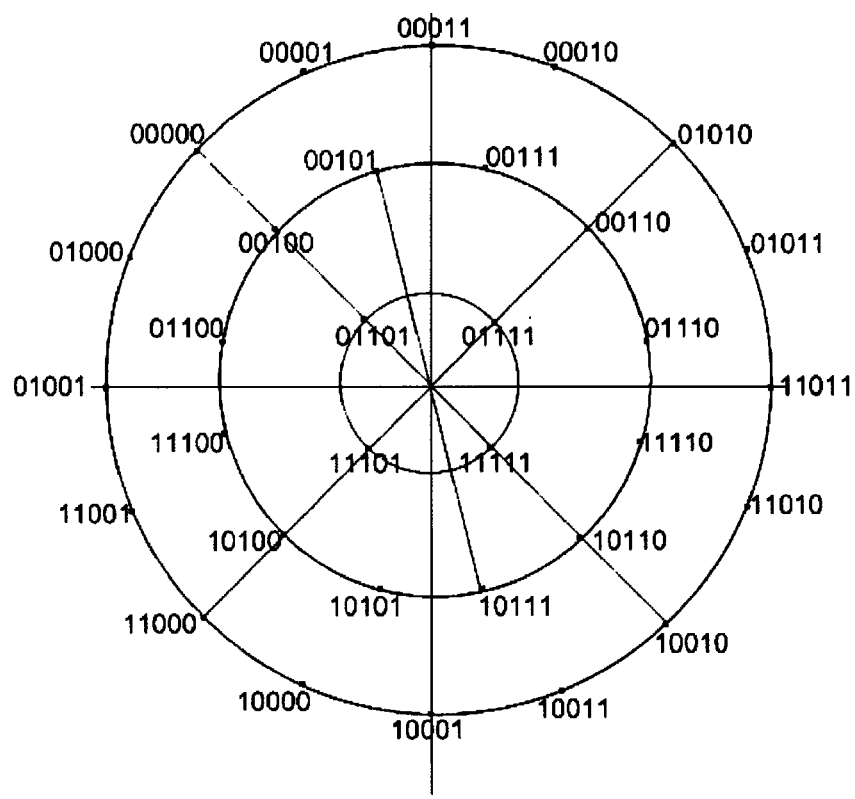
FIG. 6B illustrates a further 32-ary, 4+12+16APSK signal constellation, in accordance with an exemplary embodiment.

According to a further exemplary embodiment, a 32-ary, 4+12+16APSK constellation, with associated bit labeling, is shown in FIG. 6B. With respect to the nomenclature, 4+12+16APSK, the first number (4) denotes the number of constellation points on the inner-most ring, the second number (12) denotes the number of constellation points on the next ring, and the third number (16) denotes the number of constellation points on the outer ring. Alternatively, the bit positioning for the signal constellation of FIG. 6B can be expressed as follows (where $\epsilon_x$ represents average energy per symbol, $4*R1^2+12*R2^2+16*R3^2=32$, and R1 represents the radius of the inner-most ring, R2 represents the radius of the middle ring and R3 represents the radius of the outer ring):

| Bit Label | [x, y] Coordinates |
|---|---|
| 00000 | [-R3 * $\sqrt{\epsilon_x}$ * sin(π/4.0), R3 * $\sqrt{\epsilon_x}$ * sin(π/4.0)] |
| 00001 | [-R3 * $\sqrt{\epsilon_x}$ * sin(π/8.0), R3 * $\sqrt{\epsilon_x}$ * cos(π/8.0)] |
| 00010 | [R3 * $\sqrt{\epsilon_x}$ * sin(π/8.0), R3 * $\sqrt{\epsilon_x}$ * cos(π/8.0)] |
| 00011 | [0, R3 * $\sqrt{\epsilon_x}$] |
| 00100 | [-R2 * $\sqrt{\epsilon_x}$ * sin(π/4.0), R2 * $\sqrt{\epsilon_x}$ * sin(π/4.0)] |
| 00101 | [-R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [-R3 * $\sqrt{\epsilon_x}$ * cos(π/8.0), R3 * $\sqrt{\epsilon_x}$ * sin(π/8.0)] |
| 01001 | [-R3 * $\sqrt{\epsilon_x}$, 0] |
| 01010 | [R3 * $\sqrt{\epsilon_x}$ * sin(π/4.0), R3 * $\sqrt{\epsilon_x}$ * sin(π/4.0)] |
| 01011 | [R3 * $\sqrt{\epsilon_x}$ * cos(π/8.0), R3 $\sqrt{\epsilon_x}$ * sin(π/8.0)] |
| 01100 | [-R2 * $\sqrt{\epsilon_x}$ * sin(5.0 * π/12.0), R2 * $\sqrt{\epsilon_x}$ * sin(π/12.0)] |
| 01101 | [-R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [-R3 * $\sqrt{\epsilon_x}$ * sin(π/8.0), -R3 * $\sqrt{\epsilon_x}$ * cos(π/8.0)] |
| 10001 | [0, -R3 * $\sqrt{\epsilon_x}$] |
| 10010 | [R3 * $\sqrt{\epsilon_x}$ * sin(π/4.0), -R3 * $\sqrt{\epsilon_x}$ * sin(π/4.0)] |
| 10011 | [R3 * $\sqrt{\epsilon_x}$ * sin(π/8.0), -R3 * $\sqrt{\epsilon_x}$ * cos(π/8.0)] |
| 10100 | [-R2 * $\sqrt{\epsilon_x}$ * sin(π/4.0), -R2 * $\sqrt{\epsilon_x}$ * sin(π/4.0)] |
| 10101 | [-R2 * $\sqrt{\epsilon_x}$ * sin(π/12.0), -R2 * $\sqrt{\epsilon_x}$ * sin(5.0 * π/12.0)] |
| 10110 | [R2 * $\sqrt{\epsilon_x}$ * sin(π/4.0), -R2 * $\sqrt{\epsilon_x}$ * sin(π/4.0)] |
| 10111 | [R2 * $\sqrt{\epsilon_x}$ * sin(π/12.0), -R2 * $\sqrt{\epsilon_x}$ * sin(5.0 * π/12.0)] |
| 11000 | [-R3 * $\sqrt{\epsilon_x}$ * sin(π/4.0), -R3 * $\sqrt{\epsilon_x}$ * sin(π/4.0)] |
| 11001 | [-R3 * $\sqrt{\epsilon_x}$ * cos(π/8.0), -R3 * $\sqrt{\epsilon_x}$ * sin(π/8.0)] |
| 11010 | [R3 * $\sqrt{\epsilon_x}$ * cos(π/8.0), -R3 * $\sqrt{\epsilon_x}$ * sin(π/8.0)] |
| 11011 | [R3 * $\sqrt{\epsilon_x}$, 0] |
| 11100 | [-R2 * $\sqrt{\epsilon_x}$ * sin(5.0 * π/12.0), -R2 * $\sqrt{\epsilon_x}$ * sin(π/12.0)] |
| 11101 | [-R1 * $\sqrt{\epsilon_x}$ * sin(π/4.0), -R1 * $\sqrt{\epsilon_x}$ * sin(π/4.0)] |
| 11110 | [R2 * $\sqrt{\epsilon_x}$ * sin(5.0 * π/12.0), -R2 * $\sqrt{\epsilon_x}$ * sin(π/12.0)] |
| 11111 | [R1 * $\sqrt{\epsilon_x}$ * sin(π/4.0), -R1 * $\sqrt{\epsilon_x}$ * sin(π/4.0)] |

Figure 6C:
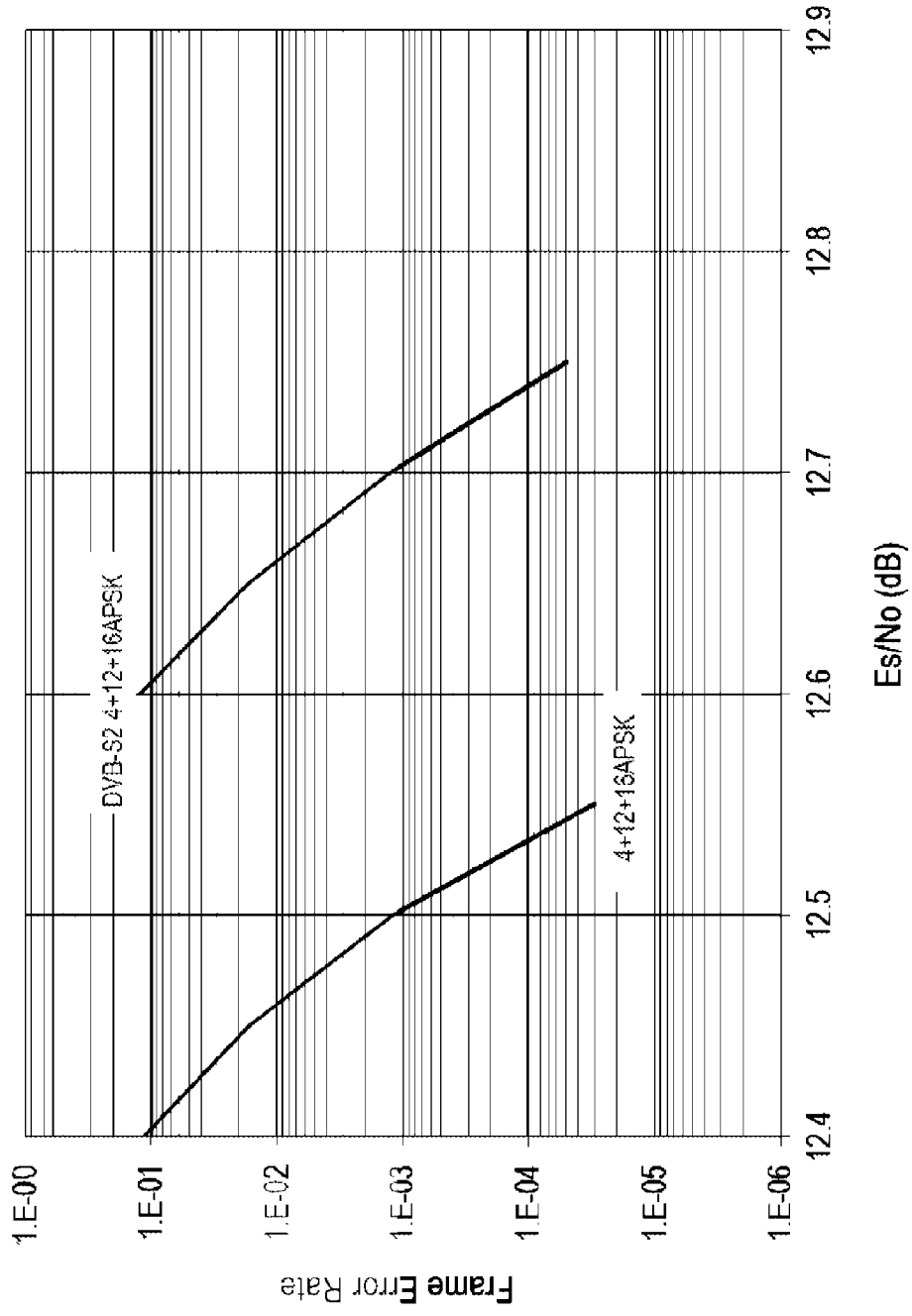
FIGS. 6C and 6D illustrate simulated performance curves for the signal constellations of FIGS. 6A and 6B compared to simulated performance curves for other comparable signal constellations.
Figure 6D:
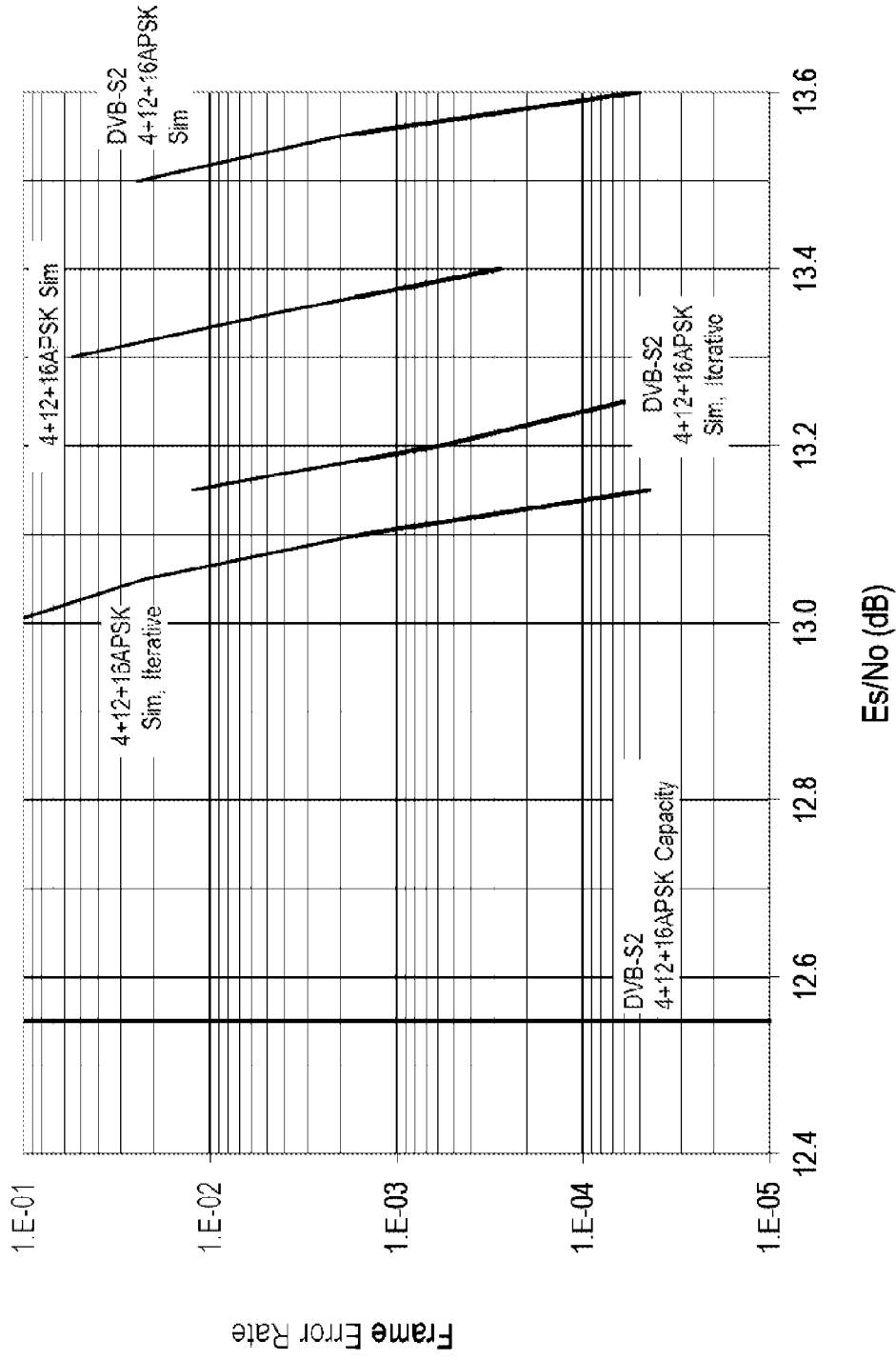

For comparison, the performance of the different constellations can be simulated with different FEC codes. For example, FIG. 6C depicts the performance (based on the DVB-S2 LDPC long code of rate 3/4 and N=64,800) for the 4+12+16APSK constellations of FIGS. 6A and 6B; as compared with performance curve for the 4+12+16APSK DVB-S2 constellation. Further, FIG. 6D depicts the performance (based on an LDPC code of rate 4/5 and N=64,800) for the 4+12+16APSK constellations of FIGS. 6A and 6B, with respect to simulations using iterative and non-iterative receivers; as compared with performance curves for the 4+12+16APSK constellation of the DVB-S2 standard. As is evident from the performance curves of FIG. 6C, with a 3/4 rate FEC code, the 4+12+16APSK constellations of FIGS. 6A and 6B achieve significant performance improvements over, for example, the DVB-S2 4+12+16APSK constellation (approximately 0.2 dB). Further, as is evident from the performance curves of FIG. 6D, the 4+12+16APSK constellations of FIGS. 6A and 6B also achieve significant performance improvements over the DVB-S2 4+12+16APSK constellation, for example, with a 4/5 rate FEC code (approximately 0.27 dB with a non-iterative receiver, and approximately 0.1 dB with an iterative receiver). Accordingly, in this case, the iterative receiver did not achieve as significant a performance improvement, and thus may not justify or offset the complexity of an iterative receiver.

Accordingly, as described above with respect to the 1+7APSK constellation, by employing either of the signal constellations of FIGS. 6A and 6B, a system 120 can achieve enhanced performance, such as decreased power consumption and/or enhanced throughput. Moreover, also as described above with respect to the 1+7APSK constellation, the optimal labeling and bit positions illustrated in FIGS. 6A and 6B are not unique in that the above-specified modifications of the bit labeling and bit positioning can achieve equivalent performance. With respect to the bit positions, equivalent performance can be achieved with 4+12+16APSK signal constellations as shown in FIGS. 6A and 6B, but where each of the [x, y] bit positions is rotated by a fixed rotation factor (e.g., each bit position is rotated by the same rotation factor). Also, with respect to the bit labeling, equivalent performance can be achieved with 4+12+16APSK signal constellations as shown in FIGS. 6A and 6B, but where the bit labeling is modified by interchanging the 0's and 1's, and/or by applying a uniform swapping of bit positions within each bit label (e.g., swapping the first and third bit label positions within each bit label). Moreover, any of the foregoing specific modifications can either be applied by itself or in combination with any one or more of the other specific modifications.

Figure 7A:
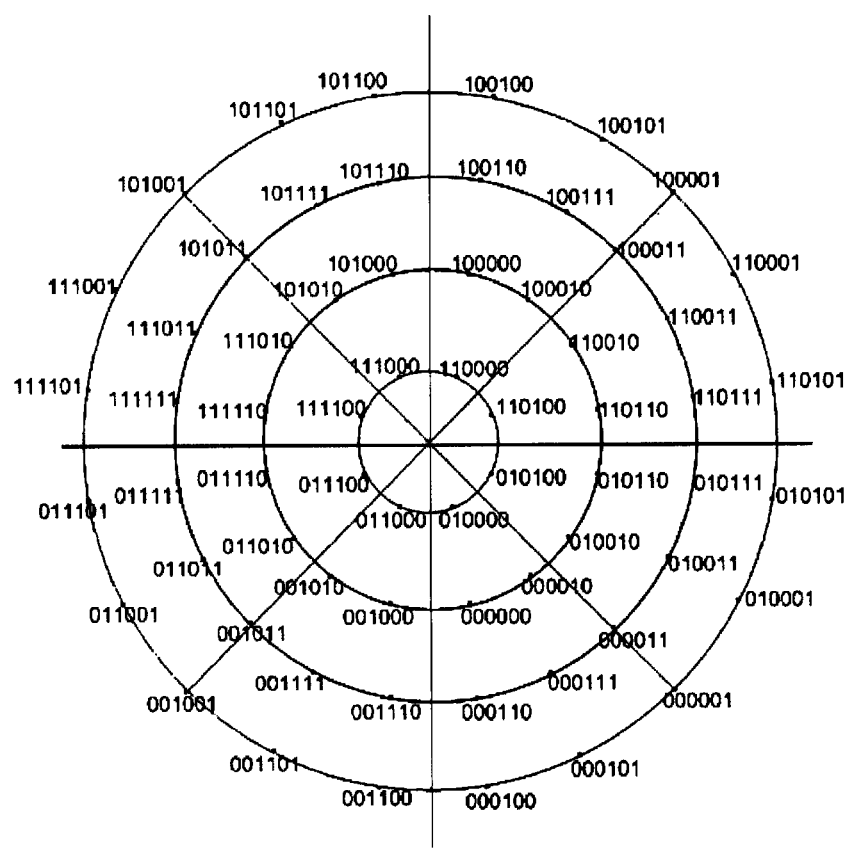
FIG. 7A illustrates a 64-ary, 8+16+20+20APSK signal constellation, in accordance with an exemplary embodiment.

According to a further exemplary embodiment, a 64-ary, 8+16+20+20APSK constellation, with associated bit labeling, is shown in FIG. 7A. With respect to the nomenclature, 8+16+20+20APSK, the first number (8) denotes the number of constellation points on the inner-most ring, the second number (16) denotes the number of constellation points on next outer ring, the third number (20) denotes the number of constellation points on next outer ring, and the fourth number (20) denotes the number of constellation points on outer-most ring. Alternatively, the bit positioning for the signal constellation of FIG. 7A can be expressed as follows (where $\epsilon_x$ represents average energy per symbol, $8*R1^2+16*R2^2+20*R3^2+20*R4^2=64$, and R1 represents the radius of the inner-most ring, R2 represents the radius of the next outer ring (the first middle ring), R3 represents the radius of the next outer ring (the second middle ring) and R4 represents the radius of the outer-most ring):

| Bit Label | [x, y] Coordinates |
|---|---|
| 000000 | [R2 * $\sqrt{\epsilon_x}$ * cos(25.0 * π/16.0), R2 * $\sqrt{\epsilon_x}$ * sin(25.0 * π/16.0)], |
| 000001 | [R4 * $\sqrt{\epsilon_x}$ * cos(35.0 * π/20.0), R4 * $\sqrt{\epsilon_x}$ * sin(35.0 * π/20.0)], |
| 000010 | [R2 * $\sqrt{\epsilon_x}$ * cos(27.0 * π/16.0), R2 * $\sqrt{\epsilon_x}$ * sin(27.0 * π/16.0)], |
| 000011 | [R3 * $\sqrt{\epsilon_x}$ * cos(35.0 * π/20.0), R3 * $\sqrt{\epsilon_x}$ * sin(35.0 * π/20.0)], |
| 000100 | [R4 * $\sqrt{\epsilon_x}$ * cos(31.0 * π/20.0), R4 * $\sqrt{\epsilon_x}$ * sin(31.0 * π/20.0)], |
| 000101 | [R4 * $\sqrt{\epsilon_x}$ * cos(33.0 * π/20.0), R4 * $\sqrt{\epsilon_x}$ * sin(33.0 * π/20.0)], |
| 000110 | [R3 * $\sqrt{\epsilon_x}$ * cos(31.0 * π/20.0), R3 * $\sqrt{\epsilon_x}$ * sin(31.0 * π/20.0)], |
| 000111 | [R3 * $\sqrt{\epsilon_x}$ * cos(33.0 * π/20.0), R3 * $\sqrt{\epsilon_x}$ * sin(33.0 * π/20.0)], |
| 001000 | [R2 * $\sqrt{\epsilon_x}$ * cos(23.0 * π/16.0), R2 * $\sqrt{\epsilon_x}$ * sin(23.0 * π/16.0)], |
| 001001 | [R4 * $\sqrt{\epsilon_x}$ * cos(25.0 * π/20.0), R4 * $\sqrt{\epsilon_x}$ * sin(25.0 * π/20.0)], |
| 001010 | [R2 * $\sqrt{\epsilon_x}$ * cos(21.0 * π/16.0), R2 * $\sqrt{\epsilon_x}$ * sin(21.0 * π/16.0)], |
| 001011 | [R3 * $\sqrt{\epsilon_x}$ * cos(25.0 * π/20.0), R3 * $\sqrt{\epsilon_x}$ * sin(25.0 * π/20.0)], |
| 001100 | [R4 * $\sqrt{\epsilon_x}$ * cos(29.0 * π/20.0), R4 * $\sqrt{\epsilon_x}$ * sin(29.0 * π/20.0)], |
| 001101 | [R4 * $\sqrt{\epsilon_x}$ * cos(27.0 * π/20.0), R4 * $\sqrt{\epsilon_x}$ * sin(27.0 * π/20.0)], |
| 001110 | [R3 * $\sqrt{\epsilon_x}$ * cos(29.0 * π/20.0), R3 * $\sqrt{\epsilon_x}$ * sin(29.0 * π/20.0)], |
| 001111 | [R3 * $\sqrt{\epsilon_x}$ * cos(27.0 * π/20.0), R3 * $\sqrt{\epsilon_x}$ * sin(27.0 * π/20.0)[, |
| 010000 | [R1 * $\sqrt{\epsilon_x}$ * cos(13.0 * π/8.0), R1 * $\sqrt{\epsilon_x}$ * sin(13.0 * π/8.0)], |
| 010001 | [R4 * $\sqrt{\epsilon_x}$ * cos(37.0 * π/20.0), R4 * $\sqrt{\epsilon_x}$ * sin(37.0 * π/20.0)], |
| 010010 | [R2 * $\sqrt{\epsilon_x}$ * cos(29.0 * π/16.0), R2 * $\sqrt{\epsilon_x}$ * sin(29.0 * π/16.0)], |
| 010011 | [R3 * $\sqrt{\epsilon_x}$ * cos(37.0 * π/20.0), R3 * $\sqrt{\epsilon_x}$ * sin(37.0 * π/20.0)], |
| 010100 | [R1 * $\sqrt{\epsilon_x}$ * cos(15.0 * π/8.0), R1 * $\sqrt{\epsilon_x}$ * sin(15.0 * π/8.0)], |
| 010101 | [R4 * $\sqrt{\epsilon_x}$ * cos(39.0 * π/20.0), R4 * $\sqrt{\epsilon_x}$ * sin(39.0 * π/20.0)], |
| 010110 | [R2 * $\sqrt{\epsilon_x}$ * cos(31.0 * π/16.0), R2 * $\sqrt{\epsilon_x}$ * sin(31.0 * π/16.0)], |
| 010111 | [R3 * $\sqrt{\epsilon_x}$ * cos(39.0 * π/20.0), R3 * $\sqrt{\epsilon_x}$ * sin(39.0 * π/20.0)], |
| 011000 | [R1 * $\sqrt{\epsilon_x}$ * cos(11.0 * π/8.0), R1 * $\sqrt{\epsilon_x}$ * sin(11.0 * π/8.0)], |
| 011001 | [R4 * $\sqrt{\epsilon_x}$ * cos(23.0 * π/20.0), R4 * $\sqrt{\epsilon_x}$ * sin(23.0 * π/20.0)], |
| 011010 | [R2 * $\sqrt{\epsilon_x}$ * cos(19.0 * π/16.0), R2 * $\sqrt{\epsilon_x}$ * sin(19.0 * π/16.0)], |
| 011011 | [R3 * $\sqrt{\epsilon_x}$ * cos(23.0 * π/20.0), R3 * $\sqrt{\epsilon_x}$ * sin(23.0 * π/20.0)], |
| 011100 | [R1 * $\sqrt{\epsilon_x}$ * cos(9.0 * π/8.0), R1 * $\sqrt{\epsilon_x}$ * sin(9.0 * π/8.0)], |
| 011101 | [R4 * $\sqrt{\epsilon_x}$ * cos(21.0 * π/20.0), R4 * $\sqrt{\epsilon_x}$ * sin(21.0 * π/20.0)], |
| 011110 | [R2 * $\sqrt{\epsilon_x}$ * cos(17.0 * π/16.0), R2 * $\sqrt{\epsilon_x}$ * sin(17.0 * π/16.0)], |
| 011111 | [R3 * $\sqrt{\epsilon_x}$ * cos(21.0 * π/20.0), R3 * $\sqrt{\epsilon_x}$ * sin(21.0 * π/20.0)], |
| 100000 | [R2 * $\sqrt{\epsilon_x}$ * cos(7.0 * π/16.0), R2 * $\sqrt{\epsilon_x}$ * sin(7.0 * π/16.0)], |
| 100001 | [R4 * $\sqrt{\epsilon_x}$ * cos(5.0 * π/20.0), R4 * $\sqrt{\epsilon_x}$ * sin(5.0 * π/20.0)], |
| 100010 | [R2 * $\sqrt{\epsilon_x}$ * cos(5.0 * π/16.0), R2 * $\sqrt{\epsilon_x}$ * sin(5.0 * π/16.0)], |
| 100011 | [R3 * $\sqrt{\epsilon_x}$ * cos(5.0 * π/20.0), R3 * $\sqrt{\epsilon_x}$ * sin(5.0 * π/20.0)], |
| 100100 | [R4 * $\sqrt{\epsilon_x}$ * cos(9.0 * π/20.0), R4 * $\sqrt{\epsilon_x}$ * sin(9.0 * π/20.0)], |
| 100101 | [R4 * $\sqrt{\epsilon_x}$ * cos(7.0 * π/20.0), R4 * $\sqrt{\epsilon_x}$ * sin(7.0 * π/20.0)], |
| 100110 | [R3 * $\sqrt{\epsilon_x}$ * cos(9.0 * π/20.0), R3 * $\sqrt{\epsilon_x}$ * sin(9.0 * π/20.0)], |
| 100111 | [R3 * $\sqrt{\epsilon_x}$ * cos(7.0 * π/20.0), R3 * $\sqrt{\epsilon_x}$ * sin(7.0 * π/20.0)], |
| 101000 | [R2 * $\sqrt{\epsilon_x}$ * cos(9.0 * π/16.0), R2 * $\sqrt{\epsilon_x}$ * sin(9.0 * π/16.0)], |
| 101001 | [R4 * $\sqrt{\epsilon_x}$ * cos(15.0 * π/20.0), R4 * $\sqrt{\epsilon_x}$ * sin(15.0 * π/20.0)], |
| 101010 | [R2 * $\sqrt{\epsilon_x}$ * cos(11.0 * π/16.0), R2 * $\sqrt{\epsilon_x}$ * sin(11.0 * π/16.0)], |
| 101011 | [R3 * $\sqrt{\epsilon_x}$ * cos(15.0 * π/20.0), R3 * $\sqrt{\epsilon_x}$ * sin(15.0 * π/20.0)], |
| 101100 | [R4 * $\sqrt{\epsilon_x}$ * cos(11.0 * π/20.0), R4 * $\sqrt{\epsilon_x}$ * sin(11.0 * π/20.0)], |
| 101101 | [R4 * $\sqrt{\epsilon_x}$ * cos(13.0 * π/20.0), R4 * $\sqrt{\epsilon_x}$ * sin(13.0 * π/20.0)], |
| 101110 | [R3 * $\sqrt{\epsilon_x}$ * cos(11.0 * π/20.0), R3 * $\sqrt{\epsilon_x}$ * sin(11.0 * π/20.0)], |
| 101111 | [R3 * $\sqrt{\epsilon_x}$ * cos(13.0 * π/20.0), R3 * $\sqrt{\epsilon_x}$ * sin(13.0 * π/20.0)], |
| 110000 | [R1 * $\sqrt{\epsilon_x}$ * cos(3.0 * π/8.0), R1 * $\sqrt{\epsilon_x}$ * sin(3.0 * π/8.0)], |
| 110001 | [R4 * $\sqrt{\epsilon_x}$ * cos(3.0 * π/20.0), R4 * $\sqrt{\epsilon_x}$ * sin(3.0 * π/20.0)], |
| 110010 | [R2 * $\sqrt{\epsilon_x}$ * cos(3.0 * π/16.0), R2 * $\sqrt{\epsilon_x}$ * sin(3.0 * π/16.0)], |
| 110011 | [R3 * $\sqrt{\epsilon_x}$ * cos(3.0 * π/20.0), R3 * $\sqrt{\epsilon_x}$ * sin(3.0 * π/20.0)], |
| 110100 | [R1 * $\sqrt{\epsilon_x}$ * cos(π/8.0), R1 * $\sqrt{\epsilon_x}$ * sin(π/8.0)], |
| 110101 | [R4 * $\sqrt{\epsilon_x}$ * cos(π/20.0), R4 * $\sqrt{\epsilon_x}$ * sin(π/20.0)], |
| 110110 | [R2 * $\sqrt{\epsilon_x}$ * cos(π/16.0), R2 * $\sqrt{\epsilon_x}$ * sin(π/16.0)], |
| 110111 | [R3 * $\sqrt{\epsilon_x}$ * cos(π/20.0), R3 * $\sqrt{\epsilon_x}$ * sin(π/20.0)], |
| 111000 | [R1 * $\sqrt{\epsilon_x}$ * cos(5.0 * π/8.0), R1 * $\sqrt{\epsilon_x}$ * sin(5.0 * π/8.0)], |
| 111001 | [R4 * $\sqrt{\epsilon_x}$ * cos(17.0 * π/20.0), R4 * $\sqrt{\epsilon_x}$ * sin(17.0 * π/20.0)], |
| 111010 | [R2 * $\sqrt{\epsilon_x}$ * cos(13.0 * π/16.0), R2 * $\sqrt{\epsilon_x}$ * sin(13.0 * π/16.0)], |
| 111011 | [R3 * $\sqrt{\epsilon_x}$ * cos(17.0 * π/20.0), R3 * $\sqrt{\epsilon_x}$ * sin(17.0 * π/20.0)], |
| 111100 | [R1 * $\sqrt{\epsilon_x}$ * cos(7.0 * π/8.0), R1 * $\sqrt{\epsilon_x}$ * sin(7.0 * π/8.0)], |
| 111101 | [R4 * $\sqrt{\epsilon_x}$ * cos(19.0 * π/20.0), R4 * $\sqrt{\epsilon_x}$ * sin(19.0 * π/20.0)], |
| 111110 | [R2 * $\sqrt{\epsilon_x}$ * cos(15.0 * π/16.0), R2 * $\sqrt{\epsilon_x}$ * sin(15.0 * π/16.0)], |
| 111111 | [R3 * $\sqrt{\epsilon_x}$ * cos(19.0 * π/20.0), R3 * $\sqrt{\epsilon_x}$ * sin(19.0 * π/20.0)]. |

Figure 7B:
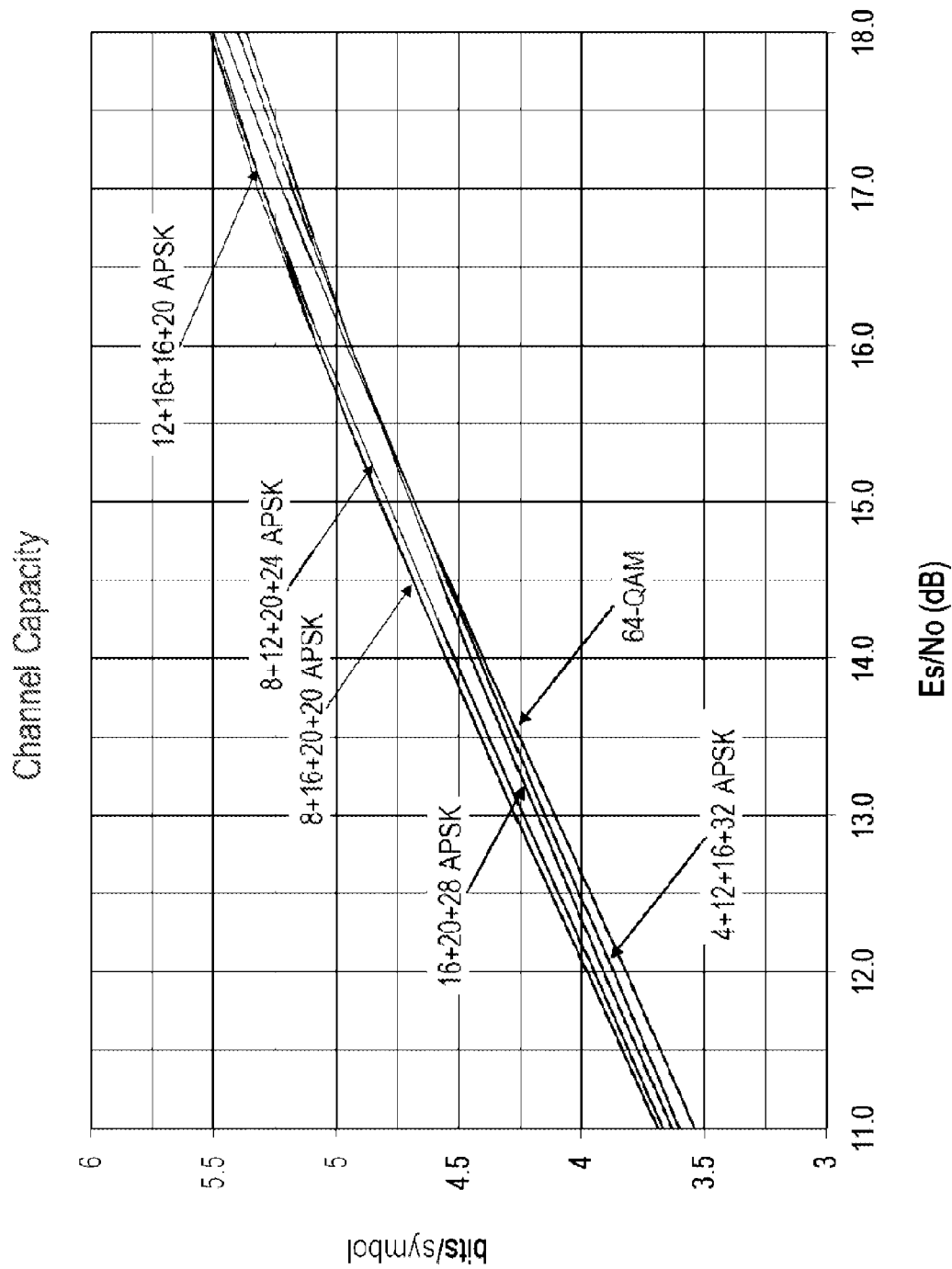
FIG. 7B illustrates a theoretical channel capacity curve for the signal constellation of FIG. 7A compared to theoretical channel capacity curves for other comparable signal constellations.
Figure 7C:
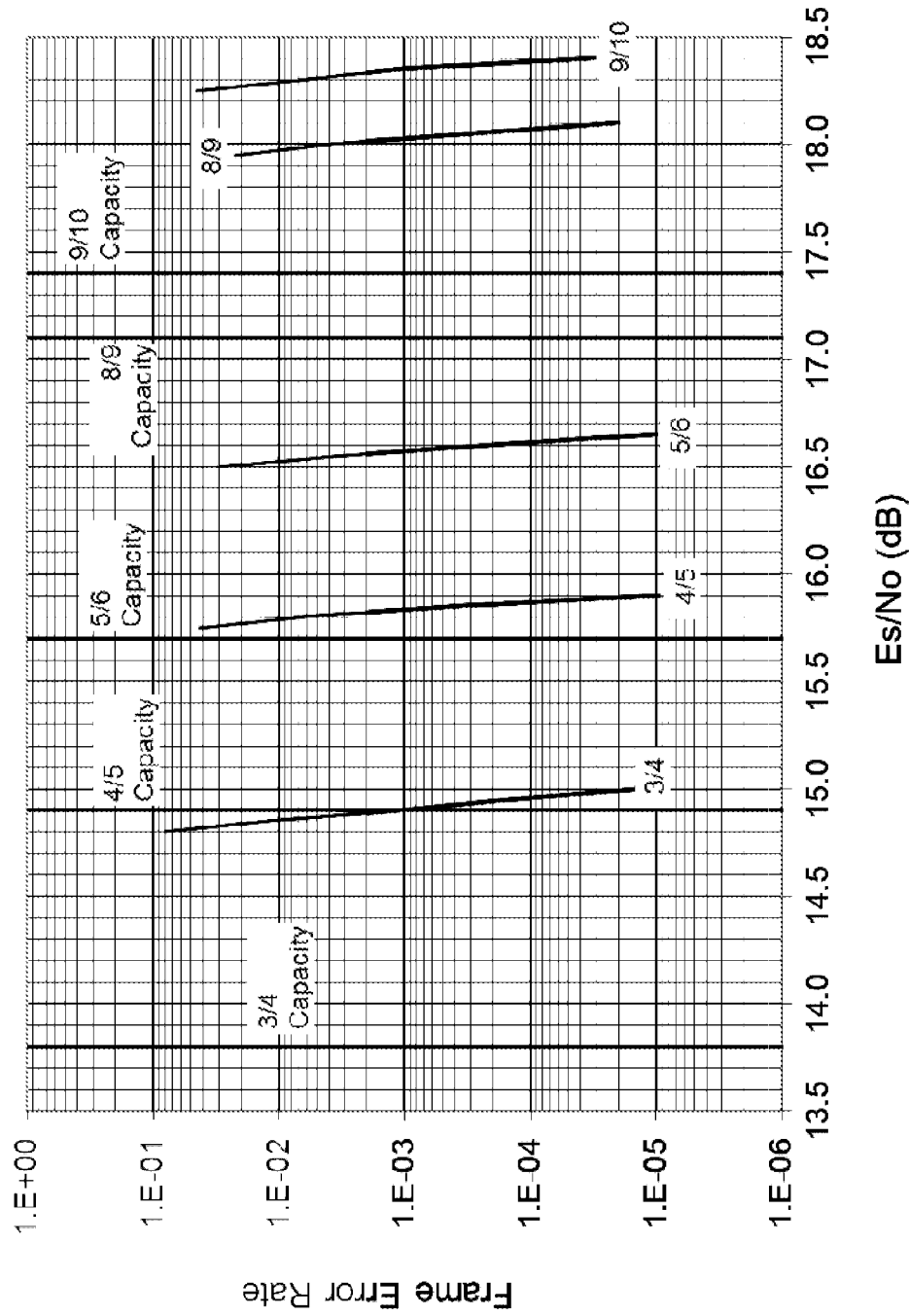
FIG. 7C illustrates simulated performance curves for the signal constellation of FIG. 7A compared to simulated performance curves for other comparable signal constellations.

A plot of the theoretical channel capacity curves for several 64-ary constellations is shown in FIG. 7B, where the capacity curves are irrespective or unrelated to any bit labeling. As can be seen from the capacity curves, the 8+16+20+20APSK constellation achieves the optimal capacity over the other constellations. From there, through extensive simulation of different bit labeling designs, the optimal bit labeling of FIG. 7A is determined. For further comparison, the performance of the different constellations can be simulated with different FEC codes. For example, FIG. 7C depicts the performance (based on an LDPC code of N=64,800) for the 8+16+20+20APSK constellation of FIG. 7A, with respect to the theoretical capacity, and simulations using a non-iterative receiver and LDPC code rates of 3/4, 4/5, 5/6, 8/9 and 9/10.

Accordingly, as described above with respect to the 1+7APSK constellation, by employing the signal constellation of FIG. 7A, a system 120 can achieve enhanced performance, such as decreased power consumption and/or enhanced throughput. Moreover, also as described above with respect to the 1+7APSK constellation, the optimal labeling and bit positions illustrated in FIG. 7A are not unique in that the above-specified modifications of the bit labeling and bit positioning can achieve equivalent performance. With respect to the bit positions, equivalent performance can be achieved with a 8+16+20+20APSK signal constellation as shown in FIG. 7A, but where each of the [x, y] bit positions is rotated by a fixed rotation factor (e.g., each bit position is rotated by the same rotation factor). Also, with respect to the bit labeling, equivalent performance can be achieved with a 8+16+20+20APSK signal constellation as shown in FIG. 7A, but where the bit labeling is modified by interchanging the 0's and 1's, and/or by applying a uniform swapping of bit positions within each bit label (e.g., swapping the first and third bit label positions within each bit label). Moreover, any of the foregoing specific modifications can either be applied by itself or in combination with any one or more of the other specific modifications.

According to a further exemplary embodiment, a 64-ary, 12+16+16+20APSK constellation can be employed. With respect to the nomenclature, 12+16+16+20APSK, the first number (12) denotes the number of constellation points on the inner-most ring, the second number (16) denotes the number of constellation points on next outer ring, the third number (16) denotes the number of constellation points on next outer ring, and the fourth number (20) denotes the number of constellation points on outer-most ring. A plot of the theoretical channel capacity curve for this 12+16+16+20APSK constellation is also shown in FIG. 7B along with several other 64-ary constellations, where the capacity curves are irrespective or unrelated to any bit labeling. As can be seen from the capacity curves, the 12+16+16+20APSK constellation achieves similar capacity levels as reflected by the theoretical capacity curve for the above 8+16+20+20APSK constellation. Accordingly, as described above with respect to the 1+7APSK constellation, by employing a 12+16+16+20APSK signal constellation, a system 120 can achieve enhanced performance, such as decreased power consumption and/or enhanced throughput.

Figure 8:
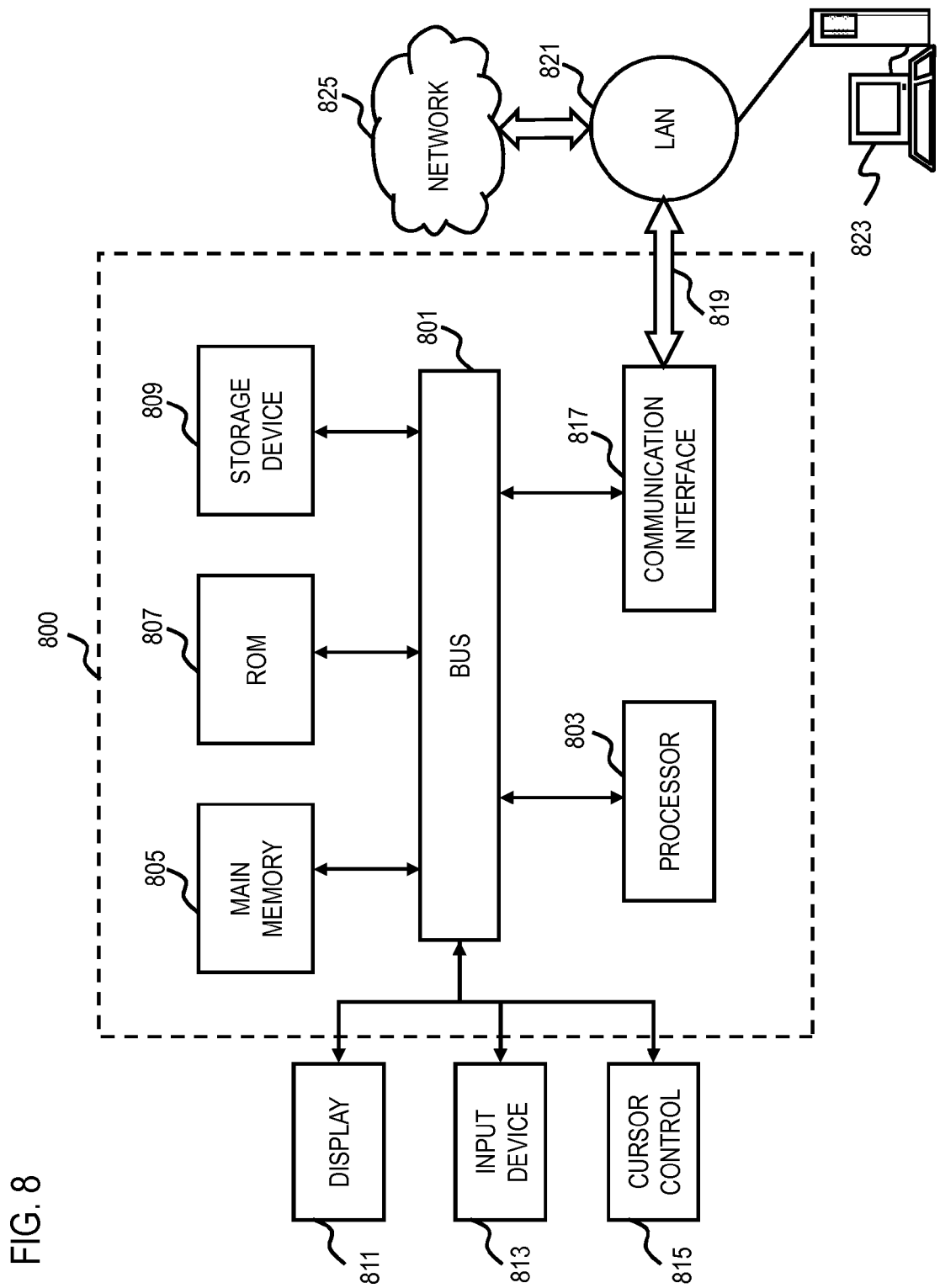
FIG. 8 is a diagram of a computer system that can perform the processes for a parameterized interleaver design, according to exemplary embodiments.

FIG. 8 illustrates a computer system upon which exemplary embodiments according to the present invention can be implemented. The computer system 800 includes a bus 801 or other communication mechanism for communicating information, and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions to be executed by the processor 803. The computer system 800 further includes a read only memory (ROM) 807 or other static storage device coupled to the bus 801 for storing static information and instructions for the processor 803. A storage device 809, such as a magnetic disk or optical disk, is additionally coupled to the bus 801 for storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is cursor control 815, such as a mouse, a trackball, or cursor direction keys for communicating direction information and command selections to the processor 803 and for controlling cursor movement on the display 811.

According to one embodiment of the invention, generation and operation of interleaver designs in accordance with exemplary embodiments is provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, or a telephone modem to provide a data communication connection to a corresponding type of telephone line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by service provider. The local network 821 and network 825 both use electrical, electromagnetic, or optical signals to convey information and instructions. The signals through the various networks and the signals on network link 819 and through communication interface 817, which communicate digital data with computer system 800, are exemplary forms of carrier waves bearing the information and instructions.

The computer system 800 can send messages and receive data, including program code, through the network(s), network link 819, and communication interface 817. In the Internet example, a server (not shown) might transmit requested code belonging to an application program for implementing an embodiment of the present invention through the network 825, local network 821 and communication interface 817. The processor 803 may execute the transmitted code while being received and/or store the code in storage device 805, or other non-volatile storage for later execution. In this manner, computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 9 illustrates a chip set 900 in which embodiments of the invention may be implemented. Chip set 900 includes, for instance, processor and memory components described with respect to FIG. 9 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, and/or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM) and static memory (e.g., ROM) for storing executable instructions that, when executed by the processor 903 and/or the DSP 907 and/or the ASIC 909, perform the process of exemplary embodiments as described herein. The memory 905 also stores the data associated with or generated by the execution of the process.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    modulating a signal, through a modulation device, based at least in part on an 8-ary, 1+7APSK signal constellation, having an outer ring with 7 bit positions, in accordance with the following bit labeling and [x, y] bit coordinate positions:

| Bit Label | [x, y] Coordinates |
|---|---|
| 000 | [0.0, 0.0] |
| 001 | [$\sqrt{8.0*\epsilon_x/7.0}$, 0.0] |
| 010 | [$\sqrt{8.0*\epsilon_x/7.0}$ * cos (4.0 * π/7.0), $\sqrt{8.0*\epsilon_x/7.0}$ * sin (4.0 * π/7.0)] |
| 011 | [$\sqrt{8.0*\epsilon_x/7.0}$ * cos (2.0 * π/7.0), $\sqrt{8.0*\epsilon_x/7.0}$ * sin (2.0 * π/7.0)] |
| 100 | [$\sqrt{8.0*\epsilon_x/7.0}$ * cos (12.0 * π/7.0), $\sqrt{8.0*\epsilon_x/7.0}$ * sin (12.0 * π/7.0)] |
| 101 | [$\sqrt{8.0*\epsilon_x/7.0}$ * cos (10.0 * π/7.0), $\sqrt{8.0*\epsilon_x/7.0}$ * sin (10.0 * π/7.0)] |
| 110 | [$\sqrt{8.0*\epsilon_x/7.0}$ * cos (6.0 * π/7.0), $\sqrt{8.0*\epsilon_x/7.0}$ * sin (6.0 * π/7.0)] |
| 111 | [$\sqrt{8.0*\epsilon_x/7.0}$ * cos (8.0 * π/7.0), $\sqrt{8.0*\epsilon_x/7.0}$ * sin (8.0 * π/7.0)] | where $\epsilon_x$ represents average energy per symbol, and
wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

2. An apparatus, comprising:
    a modulation device configured to modulate a signal based at least in part on an 8-ary, 1+7APSK signal constellation, having an outer ring with 7 bit positions, in accordance with the following bit labeling and [x, y] bit coordinate positions:

| Bit Label | [x, y] Coordinates |
|---|---|
| 000 | [0.0, 0.0] |
| 001 | [$\sqrt{(8.0*\epsilon_x/7.0}$ , 0.0] |
| 010 | [$\sqrt{8.0*\epsilon_x/7.0}$ * cos (4.0 * π/7.0), $\sqrt{8.0*\epsilon_x/7.0}$ * sin (4.0 * π/7.0)] |
| 011 | [$\sqrt{8.0*\epsilon_x/7.0}$ * cos (2.0 * π/7.0), $\sqrt{8.0*\epsilon_x/7.0}$ * sin (2.0 * π/7.0)] |
| 100 | [$\sqrt{8.0*\epsilon_x/7.0}$ * cos (12.0 * π/7.0), $\sqrt{8.0*\epsilon_x/7.0}$ * sin (12.0 * π/7.0)] |
| 101 | [$\sqrt{8.0*\epsilon_x/7.0}$ * cos (10.0 * π/7.0), $\sqrt{8.0*\epsilon_x/7.0}$ * sin (10.0 * π/7.0)] |
| 110 | [$\sqrt{8.0*\epsilon_x/7.0}$ * cos (6.0 * π/7.0), $\sqrt{8.0*\epsilon_x/7.0}$ * sin (6.0 * π/7.0)] |
| 111 | [$\sqrt{8.0*\epsilon_x/7.0}$ * cos (8.0 * π/7.0), $\sqrt{8.0*\epsilon_x/7.0}$ * sin (8.0 * π/7.0)] | where $\epsilon_x$ represents average energy per symbol, and
wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

3. A method, comprising:
demodulating a signal, through a demodulation device, wherein the signal was modulated based at least in part on an 8-ary, 1+7APSK signal constellation, having an outer ring with 7 bit positions, in accordance with the following bit labeling and [x, y] bit coordinate positions:

| Bit Label | [x, y] Coordinates |
|---|---|
| 000 | [0.0, 0.0] |
| 001 | [$\sqrt{(8.0*\epsilon_x/7.0}$ , 0.0] |
| 010 | [$\sqrt{8.0*\epsilon_x/7.0}$ * cos (4.0 * π/7.0), $\sqrt{8.0*\epsilon_x/7.0}$ * sin (4.0 * π/7.0)] |
| 011 | [$\sqrt{8.0*\epsilon_x/7.0}$ * cos (2.0 * π/7.0), $\sqrt{8.0*\epsilon_x/7.0}$ * sin (2.0 * π/7.0)] |
| 100 | [$\sqrt{8.0*\epsilon_x/7.0}$ * cos (12.0 * π/7.0), $\sqrt{8.0*\epsilon_x/7.0}$ * sin (12.0 * π/7.0)] |
| 101 | [$\sqrt{8.0*\epsilon_x/7.0}$ * cos (10.0 * π/7.0), $\sqrt{8.0*\epsilon_x/7.0}$ * sin (10.0 * π/7.0)] |
| 110 | [$\sqrt{8.0*\epsilon_x/7.0}$ * cos (6.0 * π/7.0), $\sqrt{8.0*\epsilon_x/7.0}$ * sin (6.0 * π/7.0)] |
| 111 | [$\sqrt{8.0*\epsilon_x/7.0}$ * cos (8.0 * π/7.0), $\sqrt{8.0*\epsilon_x/7.0}$ * sin (8.0 * π/7.0)] | where $\epsilon_x$ represents average energy per symbol, and
wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

4. An apparatus, comprising:
a demodulation device configured to demodulate a signal, wherein the signal was modulated based at least in part on an 8-ary, 1+7APSK signal constellation, having an outer ring with 7 bit positions, in accordance with the following bit labeling and [x, y] bit coordinate positions:

| Bit Label | [x, y] Coordinates |
|---|---|
| 000 | [0.0, 0.0] |
| 001 | [$\sqrt{8.0*\epsilon_x/7.0}$, 0.0] |
| 010 | [$\sqrt{8.0*\epsilon_x/7.0}$ * cos (4.0 * π/7.0), $\sqrt{8.0*\epsilon_x/7.0}$ * sin (4.0 * π/7.0)] |
| 011 | [$\sqrt{8.0*\epsilon_x/7.0}$ * cos (2.0 * π/7.0), $\sqrt{8.0*\epsilon_x/7.0}$ * sin (2.0 * π/7.0)] |
| 100 | [$\sqrt{8.0*\epsilon_x/7.0}$ * cos (12.0 * π/7.0), $\sqrt{8.0*\epsilon_x/7.0}$ * sin (12.0 * π/7.0)] |
| 101 | [$\sqrt{8.0*\epsilon_x/7.0}$ * cos (10.0 * π/7.0), $\sqrt{8.0*\epsilon_x/7.0}$ * sin (10.0 * π/7.0)] |
| 110 | [$\sqrt{8.0*\epsilon_x/7.0}$ * cos (6.0 * π/7.0), $\sqrt{8.0*\epsilon_x/7.0}$ * sin (6.0 * π/7.0)] |
| 111 | [$\sqrt{8.0*\epsilon_x/7.0}$ * cos (8.0 * π/7.0), $\sqrt{8.0*\epsilon_x/7.0}$ * sin (8.0 * π/7.0)] | where $\epsilon_x$ represents average energy per symbol, and
wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

5. A method, comprising:
modulating a signal, through a modulation device, based at least in part on an 16-ary, 6+10APSK signal constellation, having an inner ring with 6 bit positions and an outer ring with 10 bit positions.

6. The method according to claim 5, wherein the bit positions of the inner and outer rings are in accordance with the following bit labeling and [x, y] bit coordinate positions:

| Bit Label | [x, y] Coordinates |
|---|---|
| 0000 | [R1 * $\sqrt{\epsilon_x}$, 0.0] |
| 0001 | [R1 * $\sqrt{\epsilon_x}$ * cos (5.0 * π/3.0), R1 * $\sqrt{\epsilon_x}$ * sin (5.0 * π/3.0)] |
| 0010 | [R1 * $\sqrt{\epsilon_x}$ * cos (π/3.0), R1 * $\sqrt{\epsilon_x}$ * sin (π/3.0)] |
| 0011 | [R2 * $\sqrt{\epsilon_x}$ * cos (13.0 * π/30.0), R2 * $\sqrt{\epsilon_x}$ * sin (13.0 * π/30.0)] |
| 0100 | [R2 * $\sqrt{\epsilon_x}$ * cos (55.0 * π/30.0), R2 * $\sqrt{\epsilon_x}$ * sin (55.0 * π/30.0)] |
| 0101 | [R2 * $\sqrt{\epsilon_x}$ * cos (49.0 * π/30.0), R2 * $\sqrt{\epsilon_x}$ * sin (49.0 * π/30.0)] |
| 0110 | [R2 * $\sqrt{\epsilon_x}$ * cos (π/30.0), R2 * $\sqrt{\epsilon_x}$ * sin (π/30.0)] |
| 0111 | [R2 * $\sqrt{\epsilon_x}$ * cos (7.0 * π/30.0), R2 * $\sqrt{\epsilon_x}$ * sin (7.0 * π/30.0)] |
| 1000 | [-R1 * $\sqrt{\epsilon_x}$, 0.0] |
| 1001 | [R1 * $\sqrt{\epsilon_x}$ * cos (4.0 * π/3.0), R1 * $\sqrt{\epsilon_x}$ * sin (4.0 * π/3.0)] |
| 1010 | [R1 * $\sqrt{\epsilon_x}$ * cos (2.0 * π/3.0), R1 * $\sqrt{\epsilon_x}$ * sin (2.0 * π/3.0)] |
| 1011 | [R2 * $\sqrt{\epsilon_x}$ * cos (19.0 * π/30.0), R2 * $\sqrt{\epsilon_x}$ * sin (19.0 * π/30.0)] |
| 1100 | [R2 * $\sqrt{\epsilon_x}$ * cos (37.0 * π/30.0), R2 * $\sqrt{\epsilon_x}$ * sin (37.0 * π/30.0)] |
| 1101 | [R2 * $\sqrt{\epsilon_x}$ * cos (43.0 * π/30.0), R2 * $\sqrt{\epsilon_x}$ * sin (43.0 * π/30.0)] |
| 1110 | [R2 * $\sqrt{\epsilon_x}$ * cos (31.0 * π/30.0), R2 * $\sqrt{\epsilon_x}$ * sin (31.0 * π/30.0)] |
| 1111 | [R2 * $\sqrt{\epsilon_x}$ * cos (25.0 * π/30.0), R2 * $\sqrt{\epsilon_x}$ * sin (25.0 * π/30.0)] | where $\epsilon_x$ represents average energy per symbol, $6*R1^2 + 10*R2^2 = 16$, and R1 represents the radius of the inner ring and R2 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

7. An apparatus, comprising:
a modulation device configured to modulate a signal based at least in part on an 16-ary, 6+10APSK signal constellation, having an inner ring with 6 bit positions and an outer ring with 10 bit positions.

8. The apparatus according to claim 7, wherein the bit positions of the inner and outer rings are in accordance with the following bit labeling and [x, y] bit coordinate positions:

| Bit Label | [x, y] Coordinates |
|---|---|
| 0000 | [R1 * $\sqrt{\epsilon_x}$, 0.0] |
| 0001 | [R1 * $\sqrt{\epsilon_x}$ * cos (5.0 * π/3.0), R1 * $\sqrt{\epsilon_x}$ * sin (5.0 * π/3.0)] |
| 0010 | [R1 * $\sqrt{\epsilon_x}$ * cos (π/3.0), R1 * $\sqrt{\epsilon_x}$ * sin (π/3.0)] |
| 0011 | [R2 * $\sqrt{\epsilon_x}$ * cos (13.0 * π/30.0), R2 * $\sqrt{\epsilon_x}$ * sin (13.0 * π/30.0)] |
| 0100 | [R2 * $\sqrt{\epsilon_x}$ * cos (55.0 * π/30.0), R2 * $\sqrt{\epsilon_x}$ * sin (55.0 * π/30.0)] |
| 0101 | [R2 * $\sqrt{\epsilon_x}$ * cos (49.0 * π/30.0), R2 * $\sqrt{\epsilon_x}$ * sin (49.0 * π/30.0)] |
| 0110 | [R2 * $\sqrt{\epsilon_x}$ * cos (π/30.0), R2 * $\sqrt{\epsilon_x}$ * sin (π/30.0)] |
| 0111 | [R2 * $\sqrt{\epsilon_x}$ * cos (7.0 * π/30.0), R2 * $\sqrt{\epsilon_x}$ * sin (7.0 * π/30.0)] |
| 1000 | [-R1 * $\sqrt{\epsilon_x}$, 0.0] |
| 1001 | [R1 * $\sqrt{\epsilon_x}$ * cos (4.0 * π/3.0), R1 * $\sqrt{\epsilon_x}$ * sin (4.0 * π/3.0)] |
| 1010 | [R1 * $\sqrt{\epsilon_x}$ * cos (2.0 * π/3.0), R1 * $\sqrt{\epsilon_x}$ * sin (2.0 * π/3.0)] |
| 1011 | [R2 * $\sqrt{\epsilon_x}$ * cos (19.0 * π/30.0), R2 * $\sqrt{\epsilon_x}$ * sin (19.0 * π/30.0)] |
| 1100 | [R2 * $\sqrt{\epsilon_x}$ * cos (37.0 * π/30.0), R2 * $\sqrt{\epsilon_x}$ * sin (37.0 * π/30.0)] |
| 1101 | [R2 * $\sqrt{\epsilon_x}$ * cos (43.0 * π/30.0), R2 * $\sqrt{\epsilon_x}$ * sin (43.0 * π/30.0)] |
| 1110 | [R2 * $\sqrt{\epsilon_x}$ * cos (31.0 * π/30.0), R2 * $\sqrt{\epsilon_x}$ * sin (31.0 * π/30.0)] |
| 1111 | [R2 * $\sqrt{\epsilon_x}$ * cos (25.0 * π/30.0), R2 * $\sqrt{\epsilon_x}$ * sin (25.0 * π/30.0)] | where $\epsilon_x$ represents average energy per symbol, $6*R1^2+10*R2^2=16$, and R1 represents the radius of the inner ring and R2 represents the radius of the outer ring, and
wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

9. A method, comprising:
demodulating a signal, through a demodulation device, wherein the signal was modulated based at least in part on an 16-ary, 6+10APSK signal constellation, having an inner ring with 6 bit positions and an outer ring with 10 bit positions.

10. The method according to claim 9, wherein the bit positions of the inner and outer rings are in accordance with the following bit labeling and [x, y] bit coordinate positions:

| Bit Label | [x, y] Coordinates |
|---|---|
| 0000 | [R1 * $\sqrt{\epsilon_x}$, 0.0] |
| 0001 | [R1 * $\sqrt{\epsilon_x}$ * cos (5.0 * π/3.0), R1 * $\sqrt{\epsilon_x}$ * sin (5.0 * π/3.0)] |
| 0010 | [R1 * $\sqrt{\epsilon_x}$ * cos (π/3.0), R1 * $\sqrt{\epsilon_x}$ * sin (π/3.0)] |
| 0011 | [R2 * $\sqrt{\epsilon_x}$ * cos (13.0 * π/30.0), R2 * $\sqrt{\epsilon_x}$ * sin (13.0 * π/30.0)] |
| 0100 | [R2 * $\sqrt{\epsilon_x}$ * cos (55.0 * π/30.0), R2 * $\sqrt{\epsilon_x}$ * sin (55.0 * π/30.0)] |
| 0101 | [R2 * $\sqrt{\epsilon_x}$ * cos (49.0 * π/30.0), R2 * $\sqrt{\epsilon_x}$ * sin (49.0 * π/30.0)] |
| 0110 | [R2 * $\sqrt{\epsilon_x}$ * cos (π/30.0), R2 * $\sqrt{\epsilon_x}$ * sin (π/30.0)] |
| 0111 | [R2 * $\sqrt{\epsilon_x}$ * cos (7.0 * π/30.0), R2 * $\sqrt{\epsilon_x}$ * sin (7.0 * π/30.0)] |
| 1000 | [-R1 * $\sqrt{\epsilon_x}$, 0.0] |
| 1001 | [R1 * $\sqrt{\epsilon_x}$ * cos (4.0 * π/3.0), R1 * $\sqrt{\epsilon_x}$ * sin (4.0 * π/3.0)] |
| 1010 | [R1 * $\sqrt{\epsilon_x}$ * cos (2.0 * π/3.0), R1 * $\sqrt{\epsilon_x}$ * sin (2.0 * π/3.0)] |
| 1011 | [R2 * $\sqrt{\epsilon_x}$ * cos (19.0 * π/30.0), R2 * $\sqrt{\epsilon_x}$ * sin (19.0 * π/30.0)] |
| 1100 | [R2 * $\sqrt{\epsilon_x}$ * cos (37.0 * π/30.0), R2 * $\sqrt{\epsilon_x}$ * sin (37.0 * π/30.0)] |
| 1101 | [R2 * $\sqrt{\epsilon_x}$ * cos (43.0 * π/30.0), R2 * $\sqrt{\epsilon_x}$ * sin (43.0 * π/30.0)] |
| 1110 | [R2 * $\sqrt{\epsilon_x}$ * cos (31.0 * π/30.0), R2 * $\sqrt{\epsilon_x}$ * sin (31.0 * π/30.0)] |
| 1111 | [R2 * $\sqrt{\epsilon_x}$ * cos (25.0 * π/30.0), R2 * $\sqrt{\epsilon_x}$ * sin (25.0 * π/30.0)] | where $\epsilon_x$ represents average energy per symbol, $6*R1^2+10*R2^2=16$, and R1 represents the radius of the inner ring and R2 represents the radius of the outer ring, and
wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

11. An apparatus, comprising:
a demodulation device configured to demodulate a signal, wherein the signal was modulated based at least in part on an 16-ary, 6+10APSK signal constellation, having an inner ring with 6 bit positions and an outer ring with 10 bit positions.

12. The apparatus according to claim 11, wherein the bit positions of the inner and outer rings are in accordance with the following bit labeling and [x, y] bit coordinate positions:

| Bit Label | [x, y] Coordinates |
|---|---|
| 0000 | [R1 * $\sqrt{\epsilon_x}$, 0.0] |
| 0001 | [R1 * $\sqrt{\epsilon_x}$ * cos (5.0 * π/3.0), R1 * $\sqrt{\epsilon_x}$ * sin (5.0 * π/3.0)] |
| 0010 | [R1 * $\sqrt{\epsilon_x}$ * cos (π/3.0), R1 * $\sqrt{\epsilon_x}$ * sin (π/3.0)] |
| 0011 | [R2 * $\sqrt{\epsilon_x}$ * cos (13.0 * π/30.0), R2 * $\sqrt{\epsilon_x}$ * sin (13.0 * π/30.0)] |
| 0100 | [R2 * $\sqrt{\epsilon_x}$ * cos (55.0 * π/30.0), R2 * $\sqrt{\epsilon_x}$ * sin (55.0 * π/30.0)] |
| 0101 | [R2 * $\sqrt{\epsilon_x}$ * cos (49.0 * π/30.0), R2 * $\sqrt{\epsilon_x}$ * sin (49.0 * π/30.0)] |
| 0110 | [R2 * $\sqrt{\epsilon_x}$ * cos (π/30.0), R2 * $\sqrt{\epsilon_x}$ * sin (π/30.0)] |
| 0111 | [R2 * $\sqrt{\epsilon_x}$ * cos (7.0 * π/30.0), R2 * $\sqrt{\epsilon_x}$ * sin (7.0 * π/30.0)] |
| 1000 | [-R1 * $\sqrt{\epsilon_x}$, 0.0] |
| 1001 | [R1 * $\sqrt{\epsilon_x}$ * cos (4.0 * π/3.0), R1 * $\sqrt{\epsilon_x}$ * sin (4.0 * π/3.0)] |
| 1010 | [R1 * $\sqrt{\epsilon_x}$ * cos (2.0 * π/3.0), R1 * $\sqrt{\epsilon_x}$ * sin (2.0 * π/3.0)] |
| 1011 | [R2 * $\sqrt{\epsilon_x}$ * cos (19.0 * π/30.0), R2 * $\sqrt{\epsilon_x}$ * sin (19.0 * π/30.0)] |
| 1100 | [R2 * $\sqrt{\epsilon_x}$ * cos (37.0 * π/30.0), R2 * $\sqrt{\epsilon_x}$ * sin (37.0 * π/30.0)] |
| 1101 | [R2 * $\sqrt{\epsilon_x}$ * cos (43.0 * π/30.0), R2 * $\sqrt{\epsilon_x}$ * sin (43.0 * π/30.0)] |
| 1110 | [R2 * $\sqrt{\epsilon_x}$ * cos (31.0 * π/30.0), R2 * $\sqrt{\epsilon_x}$ * sin (31.0 * π/30.0)] |
| 1111 | [R2 * $\sqrt{\epsilon_x}$ * cos (25.0 * π/30.0), R2 * $\sqrt{\epsilon_x}$ * sin (25.0 * π/30.0)] | where $\epsilon_x$ represents average energy per symbol, $6*R1^2+10*R2^2=16$, and R1 represents the radius of the inner ring and R2 represents the radius of the outer ring, and
wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

13. A method, comprising:
modulating a signal, through a modulation device, based at least in part on an 32-ary, 16+16APSK signal constellation, having an inner ring with 16 bit positions and an outer ring with 16 bit positions.

14. The method according to claim 13, wherein the bit positions of the inner and outer rings are in accordance with the following bit labeling and [x, y] bit coordinate positions:

| Bit Label | [x, y] Coordinates |
|---|---|
| 00000 | [R1 * $\sqrt{\epsilon_x}$ * cos(π/16.0), R1 * $\sqrt{\epsilon_x}$ * sin(π/16.0)] |
| 00001 | [R1 * $\sqrt{\epsilon_x}$ * cos(3.0 * π/16.0), R1 * $\sqrt{\epsilon_x}$ * sin(3.0 * π/16.0)] |
| 00010 | [R1 * $\sqrt{\epsilon_x}$ * sin(π/16.0), R1 * $\sqrt{\epsilon_x}$ * cos(π/16.0)] |
| 00011 | [R1 * $\sqrt{\epsilon_x}$ * sin(3.0 * π/16.0), R1 * $\sqrt{\epsilon_x}$ * cos(3.0 * π/16.0)] |
| 00100 | [R1 * $\sqrt{\epsilon_x}$ * cos(π/16.0), -R1 * $\sqrt{\epsilon_x}$ * sin(π/16.0)] |
| 00101 | [R1 * $\sqrt{\epsilon_x}$ * cos(3.0 * π/16.0), -R1 * $\sqrt{\epsilon_x}$ * sin(3.0 * π/16.0)] |
| 00110 | [R1 * $\sqrt{\epsilon_x}$ * sin(π/16.0), -R1 * $\sqrt{\epsilon_x}$ * cos(π/16.0)] |
| 00111 | [R1 * $\sqrt{\epsilon_x}$ * sin(3.0 * π/16.0), -R1 * $\sqrt{\epsilon_x}$ * cos(3.0 * π/16.0)] |
| 01000 | [-R1 * $\sqrt{\epsilon_x}$ * cos(π/16.0), R1 * $\sqrt{\epsilon_x}$ * sin(π/16.0)] |
| 01001 | [-R1 * $\sqrt{\epsilon_x}$ * cos(3.0 * π/16.0), R1 * $\sqrt{\epsilon_x}$ * sin(3.0 * π/16.0)] |
| 01010 | [-R1 * $\sqrt{\epsilon_x}$ * sin(π/16.0), R1 * $\sqrt{\epsilon_x}$ * cos(π/16.0)] |
| 01011 | [-R1 * $\sqrt{\epsilon_x}$ * sin(3.0 * π/16.0), R1 * $\sqrt{\epsilon_x}$ * cos(3.0 * π/16.0)] |
| 01100 | [-R1 * $\sqrt{\epsilon_x}$ * cos(π/16.0), -R1 * $\sqrt{\epsilon_x}$ * sin(π/16.0)] |
| 01101 | [-R1 * $\sqrt{\epsilon_x}$ * cos(3.0 * π/16.0), -R1 * $\sqrt{\epsilon_x}$ * sin(3.0 * π/16.0)] |
| 01110 | [-R1 * $\sqrt{\epsilon_x}$ * sin(π/16.0), -R1 * $\sqrt{\epsilon_x}$ * cos(π/16.0)] |

-continued

| Bit Label | [x, y] Coordinates |
|---|---|
| 01111 | $[-R1 * \sqrt{\epsilon_x} * \sin(3.0 * \pi/16.0), -R1 * \sqrt{\epsilon_x} * \cos(3.0 * \pi/16.0)]$ |
| 10000 | $[R2 * \sqrt{\epsilon_x} * \cos(\pi/16.0), R2 * \sqrt{\epsilon_x} * \sin(\pi/16.0)]$ |
| 10001 | $[R2 * \sqrt{\epsilon_x} * \cos(3.0 * \pi/16.0), R2 * \sqrt{\epsilon_x} * \sin(3.0 * \pi/16.0)]$ |
| 10010 | $[R2 * \sqrt{\epsilon_x} * \sin(\pi/16.0), R2 * \sqrt{\epsilon_x} * \cos(\pi/16.0)]$ |
| 10011 | $[R2 * \sqrt{\epsilon_x} * \sin(3.0 * \pi/16.0), R2 * \sqrt{\epsilon_x} * \cos(3.0 * \pi/16.0)]$ |
| 10100 | $[R2 * \sqrt{\epsilon_x} * \cos(\pi/16.0), -R2 * \sqrt{\epsilon_x} * \sin(\pi/16.0)]$ |
| 10101 | $[R2 * \sqrt{\epsilon_x} * \cos(3.0 * \pi/16.0), -R2 * \sqrt{\epsilon_x} * \sin(3.0 * \pi/16.0)]$ |
| 10110 | $[R2 * \sqrt{\epsilon_x} * \sin(\pi/16.0), -R2 * \sqrt{\epsilon_x} * \cos(\pi/16.0)]$ |
| 10111 | $[R2 * \sqrt{\epsilon_x} * \sin(3.0 * \pi/16.0), -R2 * \sqrt{\epsilon_x} * \cos(3.0 * \pi/16.0)]$ |
| 11000 | $[-R2 * \sqrt{\epsilon_x} * \cos(\pi/16.0), R2 * \sqrt{\epsilon_x} * \sin(\pi/16.0)]$ |
| 11001 | $[-R2 * \sqrt{\epsilon_x} * \cos(3.0 * \pi/16.0), R2 * \sqrt{\epsilon_x} * \sin(3.0 * \pi/16.0)]$ |
| 11010 | $[-R2 * \sqrt{\epsilon_x} * \sin(\pi/16.0), R2 * \sqrt{\epsilon_x} * \cos(\pi/16.0)]$ |
| 11011 | $[-R2 * \sqrt{\epsilon_x} * \sin(3.0 * \pi/16.0), R2 * \sqrt{\epsilon_x} * \cos(3.0 * \pi/16.0)]$ |
| 11100 | $[-R2 * \sqrt{\epsilon_x} * \cos(\pi/16.0), -R2 * \sqrt{\epsilon_x} * \sin(\pi/16.0)]$ |
| 11101 | $[-R2 * \sqrt{\epsilon_x} * \cos(3.0 * \pi/16.0), -R2 * \sqrt{\epsilon_x} * \sin(3.0 * \pi/16.0)]$ |
| 11110 | $[-R2 * \sqrt{\epsilon_x} * \sin(\pi/16.0), -R2 * \sqrt{\epsilon_x} * \cos(\pi/16.0)]$ |
| 11111 | $[-R2 * \sqrt{\epsilon_x} * \sin(3.0 * \pi/16.0), -R2 * \sqrt{\epsilon_x} * \cos(3.0 * \pi/16.0)]$ | where $\epsilon_x$ represents average energy per symbol, $R1^2 + R2^2 = 2$, and R1 represents the radius of the inner ring and R2 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

15. An apparatus, comprising:
a modulation device configured to modulate a signal based at least in part on an 32-ary, 16+16APSK signal constellation, having an inner ring with 16 bit positions and an outer ring with 16 bit positions.

16. The apparatus according to claim 15, wherein the bit positions of the inner and outer rings are in accordance with the following bit labeling and [x, y] bit coordinate positions:

| Bit Label | [x, y] Coordinates |
|---|---|
| 00000 | $[R1 * \sqrt{\epsilon_x} * \cos(\pi/16.0), R1 * \sqrt{\epsilon_x} * \sin(\pi/16.0)]$ |
| 00001 | $[R1 * \sqrt{\epsilon_x} * \cos(3.0 * \pi/16.0), R1 * \sqrt{\epsilon_x} * \sin(3.0 * \pi/16.0)]$ |
| 00010 | $[R1 * \sqrt{\epsilon_x} * \sin(\pi/16.0), R1 * \sqrt{\epsilon_x} * \cos(\pi/16.0)]$ |
| 00011 | $[R1 * \sqrt{\epsilon_x} * \sin(3.0 * \pi/16.0), R1 * \sqrt{\epsilon_x} * \cos(3.0 * \pi/16.0)]$ |
| 00100 | $[R1 * \sqrt{\epsilon_x} * \cos(\pi/16.0), -R1 * \sqrt{\epsilon_x} * \sin(\pi/16.0)]$ |
| 00101 | $[R1 * \sqrt{\epsilon_x} * \cos(3.0 * \pi/16.0), -R1 * \sqrt{\epsilon_x} * \sin(3.0 * \pi/16.0)]$ |
| 00110 | $[R1 * \sqrt{\epsilon_x} * \sin(\pi/16.0), -R1 * \sqrt{\epsilon_x} * \cos(\pi/16.0)]$ |
| 00111 | $[R1 * \sqrt{\epsilon_x} * \sin(3.0 * \pi/16.0), -R1 * \sqrt{\epsilon_x} * \cos(3.0 * \pi/16.0)]$ |
| 01000 | $[-R1 * \sqrt{\epsilon_x} * \cos(\pi/16.0), R1 * \sqrt{\epsilon_x} * \sin(\pi/16.0)]$ |
| 01001 | $[-R1 * \sqrt{\epsilon_x} * \cos(3.0 * \pi/16.0), R1 * \sqrt{\epsilon_x} * \sin(3.0 * \pi/16.0)]$ |
| 01010 | $[-R1 * \sqrt{\epsilon_x} * \sin(\pi/16.0), R1 * \sqrt{\epsilon_x} * \cos(\pi/16.0)]$ |
| 01011 | $[-R1 * \sqrt{\epsilon_x} * \sin(3.0 * \pi/16.0), R1 * \sqrt{\epsilon_x} * \cos(3.0 * \pi/16.0)]$ |
| 01100 | $[-R1 * \sqrt{\epsilon_x} * \cos(\pi/16.0), -R1 * \sqrt{\epsilon_x} * \sin(\pi/16.0)]$ |
| 01101 | $[-R1 * \sqrt{\epsilon_x} * \cos(3.0 * \pi/16.0), -R1 * \sqrt{\epsilon_x} * \sin(3.0 * \pi/16.0)]$ |
| 01110 | $[-R1 * \sqrt{\epsilon_x} * \sin(\pi/16.0), -R1 * \sqrt{\epsilon_x} * \cos(\pi/16.0)]$ |
| 01111 | $[-R1 * \sqrt{\epsilon_x} * \sin(3.0 * \pi/16.0), -R1 * \sqrt{\epsilon_x} * \cos(3.0 * \pi/16.0)]$ |
| 10000 | $[R2 * \sqrt{\epsilon_x} * \cos(\pi/16.0), R2 * \sqrt{\epsilon_x} * \sin(\pi/16.0)]$ |
| 10001 | $[R2 * \sqrt{\epsilon_x} * \cos(3.0 * \pi/16.0), R2 * \sqrt{\epsilon_x} * \sin(3.0 * \pi/16.0)]$ |
| 10010 | $[R2 * \sqrt{\epsilon_x} * \sin(\pi/16.0), R2 * \sqrt{\epsilon_x} * \cos(\pi/16.0)]$ |
| 10011 | $[R2 * \sqrt{\epsilon_x} * \sin(3.0 * \pi/16.0), R2 * \sqrt{\epsilon_x} * \cos(3.0 * \pi/16.0)]$ |
| 10100 | $[R2 * \sqrt{\epsilon_x} * \cos(\pi/16.0), -R2 * \sqrt{\epsilon_x} * \sin(\pi/16.0)]$ |
| 10101 | $[R2 * \sqrt{\epsilon_x} * \cos(3.0 * \pi/16.0), -R2 * \sqrt{\epsilon_x} * \sin(3.0 * \pi/16.0)]$ |
| 10110 | $[R2 * \sqrt{\epsilon_x} * \sin(\pi/16.0), -R2 * \sqrt{\epsilon_x} * \cos(\pi/16.0)]$ |
| 10111 | $[R2 * \sqrt{\epsilon_x} * \sin(3.0 * \pi/16.0), -R2 * \sqrt{\epsilon_x} * \cos(3.0 * \pi/16.0)]$ |
| 11000 | $[-R2 * \sqrt{\epsilon_x} * \cos(\pi/16.0), R2 * \sqrt{\epsilon_x} * \sin(\pi/16.0)]$ |
| 11001 | $[-R2 * \sqrt{\epsilon_x} * \cos(3.0 * \pi/16.0), R2 * \sqrt{\epsilon_x} * \sin(3.0 * \pi/16.0)]$ |
| 11010 | $[-R2 * \sqrt{\epsilon_x} * \sin(\pi/16.0), R2 * \sqrt{\epsilon_x} * \cos(\pi/16.0)]$ |
| 11011 | $[-R2 * \sqrt{\epsilon_x} * \sin(3.0 * \pi/16.0), R2 * \sqrt{\epsilon_x} * \cos(3.0 * \pi/16.0)]$ |
| 11100 | $[-R2 * \sqrt{\epsilon_x} * \cos(\pi/16.0), -R2 * \sqrt{\epsilon_x} * \sin(\pi/16.0)]$ |
| 11101 | $[-R2 * \sqrt{\epsilon_x} * \cos(3.0 * \pi/16.0), -R2 * \sqrt{\epsilon_x} * \sin(3.0 * \pi/16.0)]$ |
| 11110 | $[-R2 * \sqrt{\epsilon_x} * \sin(\pi/16.0), -R2 * \sqrt{\epsilon_x} * \cos(\pi/16.0)]$ |
| 11111 | $[-R2 * \sqrt{\epsilon_x} * \sin(3.0 * \pi/16.0), -R2 * \sqrt{\epsilon_x} * \cos(3.0 * \pi/16.0)]$ | where $\epsilon_x$ represents average energy per symbol, $R1^2 + R2^2 = 2$, and R1 represents the radius of the inner ring and R2 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

17. A method, comprising:
demodulating a signal, through a demodulation device, wherein the signal was modulated based at least in part on an 32-ary, 16+16APSK signal constellation, having an inner ring with 16 bit positions and an outer ring with 16 bit positions.

18. The method according to claim 17, wherein the bit positions of the inner and outer rings are in accordance with the following bit labeling and [x, y] bit coordinate positions:

| Bit Label | [x, y] Coordinates |
|---|---|
| 00000 | $[R1 * \sqrt{\epsilon_x} * \cos(\pi/16.0), R1 * \sqrt{\epsilon_x} * \sin(\pi/16.0)]$ |
| 00001 | $[R1 * \sqrt{\epsilon_x} * \cos(3.0 * \pi/16.0), R1 * \sqrt{\epsilon_x} * \sin(3.0 * \pi/16.0)]$ |
| 00010 | $[R1 * \sqrt{\epsilon_x} * \sin(\pi/16.0), R1 * \sqrt{\epsilon_x} * \cos(\pi/16.0)]$ |
| 00011 | $[R1 * \sqrt{\epsilon_x} * \sin(3.0 * \pi/16.0), R1 * \sqrt{\epsilon_x} * \cos(3.0 * \pi/16.0)]$ |
| 00100 | $[R1 * \sqrt{\epsilon_x} * \cos(\pi/16.0), -R1 * \sqrt{\epsilon_x} * \sin(\pi/16.0)]$ |
| 00101 | $[R1 * \sqrt{\epsilon_x} * \cos(3.0 * \pi/16.0), -R1 * \sqrt{\epsilon_x} * \sin(3.0 * \pi/16.0)]$ |
| 00110 | $[R1 * \sqrt{\epsilon_x} * \sin(\pi/16.0), -R1 * \sqrt{\epsilon_x} * \cos(\pi/16.0)]$ |
| 00111 | $[R1 * \sqrt{\epsilon_x} * \sin(3.0 * \pi/16.0), -R1 * \sqrt{\epsilon_x} * \cos(3.0 * \pi/16.0)]$ |
| 01000 | $[-R1 * \sqrt{\epsilon_x} * \cos(\pi/16.0), R1 * \sqrt{\epsilon_x} * \sin(\pi/16.0)]$ |
| 01001 | $[-R1 * \sqrt{\epsilon_x} * \cos(3.0 * \pi/16.0), R1 * \sqrt{\epsilon_x} * \sin(3.0 * \pi/16.0)]$ |
| 01010 | $[-R1 * \sqrt{\epsilon_x} * \sin(\pi/16.0), R1 * \sqrt{\epsilon_x} * \cos(\pi/16.0)]$ |
| 01011 | $[-R1 * \sqrt{\epsilon_x} * \sin(3.0 * \pi/16.0), R1 * \sqrt{\epsilon_x} * \cos(3.0 * \pi/16.0)]$ |
| 01100 | $[-R1 * \sqrt{\epsilon_x} * \cos(\pi/16.0), -R1 * \sqrt{\epsilon_x} * \sin(\pi/16.0)]$ |
| 01101 | $[-R1 * \sqrt{\epsilon_x} * \cos(3.0 * \pi/16.0), -R1 * \sqrt{\epsilon_x} * \sin(3.0 * \pi/16.0)]$ |
| 01110 | $[-R1 * \sqrt{\epsilon_x} * \sin(\pi/16.0), -R1 * \sqrt{\epsilon_x} * \cos(\pi/16.0)]$ |
| 01111 | $[-R1 * \sqrt{\epsilon_x} * \sin(3.0 * \pi/16.0), -R1 * \sqrt{\epsilon_x} * \cos(3.0 * \pi/16.0)]$ |
| 10000 | $[R2 * \sqrt{\epsilon_x} * \cos(\pi/16.0), R2 * \sqrt{\epsilon_x} * \sin(\pi/16.0)]$ |
| 10001 | $[R2 * \sqrt{\epsilon_x} * \cos(3.0 * \pi/16.0), R2 * \sqrt{\epsilon_x} * \sin(3.0 * \pi/16.0)]$ |
| 10010 | $[R2 * \sqrt{\epsilon_x} * \sin(\pi/16.0), R2 * \sqrt{\epsilon_x} * \cos(\pi/16.0)]$ |
| 10011 | $[R2 * \sqrt{\epsilon_x} * \sin(3.0 * \pi/16.0), R2 * \sqrt{\epsilon_x} * \cos(3.0 * \pi/16.0)]$ |
| 10100 | $[R2 * \sqrt{\epsilon_x} * \cos(\pi/16.0), -R2 * \sqrt{\epsilon_x} * \sin(\pi/16.0)]$ |
| 10101 | $[R2 * \sqrt{\epsilon_x} * \cos(3.0 * \pi/16.0), -R2 * \sqrt{\epsilon_x} * \sin(3.0 * \pi/16.0)]$ |
| 10110 | $[R2 * \sqrt{\epsilon_x} * \sin(\pi/16.0), -R2 * \sqrt{\epsilon_x} * \cos(\pi/16.0)]$ |
| 10111 | $[R2 * \sqrt{\epsilon_x} * \sin(3.0 * \pi/16.0), -R2 * \sqrt{\epsilon_x} * \cos(3.0 * \pi/16.0)]$ |
| 11000 | $[-R2 * \sqrt{\epsilon_x} * \cos(\pi/16.0), R2 * \sqrt{\epsilon_x} * \sin(\pi/16.0)]$ |
| 11001 | $[-R2 * \sqrt{\epsilon_x} * \cos(3.0 * \pi/16.0), R2 * \sqrt{\epsilon_x} * \sin(3.0 * \pi/16.0)]$ |
| 11010 | $[-R2 * \sqrt{\epsilon_x} * \sin(\pi/16.0), R2 * \sqrt{\epsilon_x} * \cos(\pi/16.0)]$ |
| 11011 | $[-R2 * \sqrt{\epsilon_x} * \sin(3.0 * \pi/16.0), R2 * \sqrt{\epsilon_x} * \cos(3.0 * \pi/16.0)]$ |
| 11100 | $[-R2 * \sqrt{\epsilon_x} * \cos(\pi/16.0), -R2 * \sqrt{\epsilon_x} * \sin(\pi/16.0)]$ |
| 11101 | $[-R2 * \sqrt{\epsilon_x} * \cos(3.0 * \pi/16.0), -R2 * \sqrt{\epsilon_x} * \sin(3.0 * \pi/16.0)]$ |
| 11110 | $[-R2 * \sqrt{\epsilon_x} * \sin(\pi/16.0), -R2 * \sqrt{\epsilon_x} * \cos(\pi/16.0)]$ |
| 11111 | $[-R2 * \sqrt{\epsilon_x} * \sin(3.0 * \pi/16.0), -R2 * \sqrt{\epsilon_x} * \cos(3.0 * \pi/16.0)]$ | where $\epsilon_x$ represents average energy per symbol, $R1^2 + R2^2 = 2$, and R1 represents the radius of the inner ring and R2 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

19. An apparatus, comprising:
a demodulation device configured to demodulate a signal, wherein the signal was modulated based at least in part on an 32-ary, 16+16APSK signal constellation, having an inner ring with 16 bit positions and an outer ring with 16 bit positions.

20. The apparatus according to claim 19, wherein the bit positions of the inner and outer rings are in accordance with the following bit labeling and [x, y] bit coordinate positions:

| Bit Label | [x, y] Coordinates |
|---|---|
| 00000 | [R1 * $\sqrt{\epsilon_x}$ * cos(π/16.0), R1 * $\sqrt{\epsilon_x}$ * sin(π/16.0)] |
| 00001 | [R1 * $\sqrt{\epsilon_x}$ * cos(3.0 * π/16.0), R1 * $\sqrt{\epsilon_x}$ * sin(3.0 * π/16.0)] |
| 00010 | [R1 * $\sqrt{\epsilon_x}$ * sin(π/16.0), R1 * $\sqrt{\epsilon_x}$ * cos(π/16.0)] |
| 00011 | [R1 * $\sqrt{\epsilon_x}$ * sin(3.0 * π/16.0), R1 * $\sqrt{\epsilon_x}$ * cos(3.0 * π/16.0)] |
| 00100 | [R1 * $\sqrt{\epsilon_x}$ * cos(π/16.0), −R1 * $\sqrt{\epsilon_x}$ * sin(π/16.0)] |
| 00101 | [R1 * $\sqrt{\epsilon_x}$ * cos(3.0 * π/16.0), −R1 * $\sqrt{\epsilon_x}$ * sin(3.0 * π/16.0)] |
| 00110 | [R1 * $\sqrt{\epsilon_x}$ * sin(π/16.0), −R1 * $\sqrt{\epsilon_x}$ * cos(π/16.0)] |
| 00111 | [R1 * $\sqrt{\epsilon_x}$ * sin(3.0 * π/16.0), −R1 * $\sqrt{\epsilon_x}$ * cos(3.0 * π/16.0)] |
| 01000 | [−R1 * $\sqrt{\epsilon_x}$ * cos(π/16.0), R1 * $\sqrt{\epsilon_x}$ * sin(π/16.0)] |
| 01001 | [−R1 * $\sqrt{\epsilon_x}$ * cos(3.0 * π/16.0), R1 * $\sqrt{\epsilon_x}$ * sin(3.0 * π/16.0)] |
| 01010 | [−R1 * $\sqrt{\epsilon_x}$ * sin(π/16.0), R1 * $\sqrt{\epsilon_x}$ * cos(π/16.0)] |
| 01011 | [−R1 * $\sqrt{\epsilon_x}$ * sin(3.0 * π/16.0), R1 * $\sqrt{\epsilon_x}$ * cos(3.0 * π/16.0)] |
| 01100 | [−R1 * $\sqrt{\epsilon_x}$ * cos(π/16.0), −R1 * $\sqrt{\epsilon_x}$ * sin(π/16.0)] |
| 01101 | [−R1 * $\sqrt{\epsilon_x}$ * cos(3.0 * π/16.0), −R1 * $\sqrt{\epsilon_x}$ * sin(3.0 * π/16.0)] |
| 01110 | [−R1 * $\sqrt{\epsilon_x}$ * sin(π/16.0), −R1 * $\sqrt{\epsilon_x}$ * cos(π/16.0)] |
| 01111 | [−R1 * $\sqrt{\epsilon_x}$ * sin(3.0 * π/16.0), −R1 * $\sqrt{\epsilon_x}$ * cos(3.0 * π/16.0)] |
| 10000 | [R2 * $\sqrt{\epsilon_x}$ * cos(π/16.0), R2 * $\sqrt{\epsilon_x}$ * sin(π/16.0)] |
| 10001 | [R2 * $\sqrt{\epsilon_x}$ * cos(3.0 * π/16.0), R2 * $\sqrt{\epsilon_x}$ * sin(3.0 * π/16.0)] |
| 10010 | [R2 * $\sqrt{\epsilon_x}$ * sin(π/16.0), R2 * $\sqrt{\epsilon_x}$ * cos(π/16.0)] |
| 10011 | [R2 * $\sqrt{\epsilon_x}$ * sin(3.0 * π/16.0), R2 * $\sqrt{\epsilon_x}$ * cos(3.0 * π/16.0)] |
| 10100 | [R2 * $\sqrt{\epsilon_x}$ * cos(π/16.0), −R2 * $\sqrt{\epsilon_x}$ * sin(π/16.0)] |
| 10101 | [R2 * $\sqrt{\epsilon_x}$ * cos(3.0 * π/16.0), −R2 * $\sqrt{\epsilon_x}$ * sin(3.0 * π/16.0)] |
| 10110 | [R2 * $\sqrt{\epsilon_x}$ * sin(π/16.0), −R2 * $\sqrt{\epsilon_x}$ * cos(π/16.0)] |
| 10111 | [R2 * $\sqrt{\epsilon_x}$ * sin(3.0 * π/16.0), −R2 * $\sqrt{\epsilon_x}$ * cos(3.0 * π/16.0)] |
| 11000 | [−R2 * $\sqrt{\epsilon_x}$ * cos(π/16.0), R2 * $\sqrt{\epsilon_x}$ * sin(π/16.0)] |
| 11001 | [−R2 * $\sqrt{\epsilon_x}$ * cos(3.0 * π/16.0), R2 * $\sqrt{\epsilon_x}$ * sin(3.0 * π/16.0)] |
| 11010 | [−R2 * $\sqrt{\epsilon_x}$ * sin(π/16.0), R2 * $\sqrt{\epsilon_x}$ * cos(π/16.0)] |
| 11011 | [−R2 * $\sqrt{\epsilon_x}$ * sin(3.0 * π/16.0), R2 * $\sqrt{\epsilon_x}$ * cos(3.0 * π/16.0)] |
| 11100 | [−R2 * $\sqrt{\epsilon_x}$ * cos(π/16.0), −R2 * $\sqrt{\epsilon_x}$ * sin(π/16.0)] |
| 11101 | [−R2 * $\sqrt{\epsilon_x}$ * cos(3.0 * π/16.0), −R2 * $\sqrt{\epsilon_x}$ * sin(3.0 * π/16.0)] |
| 11110 | [−R2 * $\sqrt{\epsilon_x}$ * sin(π/16.0), −R2 * $\sqrt{\epsilon_x}$ * cos(π/16.0)] |
| 11111 | [−R2 * $\sqrt{\epsilon_x}$ * sin(3.0 * π/16.0), −R2 * $\sqrt{\epsilon_x}$ * cos(3.0 * π/16.0)] | where $\epsilon_x$ represents average energy per symbol, $R1^2 + R2^2 = 2$, and R1 represents the radius of the inner ring and R2 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

21. A method, comprising:

modulating a signal, through a modulation device, based at least in part on an 32-ary, 4+12+16APSK signal constellation, having an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | [−R3 * $\sqrt{\epsilon_x}$ * cos(5.0 * π/16.0), R3 * $\sqrt{\epsilon_x}$ * cos(3.0 * π/16.0)] |
| 00001 | [−R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(3.0 * π/16.0), R3 * $\sqrt{\epsilon_x}$ * cos(5.0 * π/16.0)] |
| 01001 | [−R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * cos(5.0 * π/16.0), −R3 * $\sqrt{\epsilon_x}$ * cos(3.0 * π/16.0)] |
| 10001 | [−R3 * $\sqrt{\epsilon_x}$ * cos(7.0 * π/16.0), −R3 * $\sqrt{\epsilon_x}$ * cos(π/16.0)] |
| 10010 | [R3 * $\sqrt{\epsilon_x}$ * cos(5.0 * π/16.0), −R3 * $\sqrt{\epsilon_x}$ * cos(3.0 * π/16.0)] |
| 10011 | [R3 * $\sqrt{\epsilon_x}$ * cos(7.0 * π/16.0), −R3 * $\sqrt{\epsilon_x}$ * cos(π/16.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * cos(3.0 * π/16.0), −R3 * $\sqrt{\epsilon_x}$ * cos(5.0 * π/16.0)] |
| 11001 | [−R3 * $\sqrt{\epsilon_x}$ * cos(π/16.0), −R3 * $\sqrt{\epsilon_x}$ * cos(7.0 * π/16.0)] |
| 11010 | [R3 * $\sqrt{\epsilon_x}$ * cos(3.0 * π/16.0), −R3 * $\sqrt{\epsilon_x}$ * cos(5.0 * π/16.0)] |
| 11011 | [R3 * $\sqrt{\epsilon_x}$ * cos(π/16.0), −R3 * $\sqrt{\epsilon_x}$ * cos(7.0 * π/16.0)] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2 + 12*R2^2 + 16*R3^2 = 32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

22. An apparatus, comprising:

a modulation device configured to modulate a signal based at least in part on an 32-ary, 4+12+16APSK signal constellation, having an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | [−R3 * $\sqrt{\epsilon_x}$ * cos(5.0 * π/16.0), R3 * $\sqrt{\epsilon_x}$ * cos(3.0 * π/16.0)] |
| 00001 | [−R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(3.0 * π/16.0), R3 * $\sqrt{\epsilon_x}$ * cos(5.0 * π/16.0)] |
| 01001 | [−R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * cos(5.0 * π/16.0), −R3 * $\sqrt{\epsilon_x}$ * cos(3.0 * π/16.0)] |
| 10001 | [−R3 * $\sqrt{\epsilon_x}$ * cos(7.0 * π/16.0), −R3 * $\sqrt{\epsilon_x}$ * cos(π/16.0)] |
| 10010 | [R3 * $\sqrt{\epsilon_x}$ * cos(5.0 * π/16.0), −R3 * $\sqrt{\epsilon_x}$ * cos(3.0 * π/16.0)] |
| 10011 | [R3 * $\sqrt{\epsilon_x}$ * cos(7.0 * π/16.0), −R3 * $\sqrt{\epsilon_x}$ * cos(π/16.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * cos(3.0 * π/16.0), −R3 * $\sqrt{\epsilon_x}$ * cos(5.0 * π/16.0)] |
| 11001 | [−R3 * $\sqrt{\epsilon_x}$ * cos(π/16.0), −R3 * $\sqrt{\epsilon_x}$ * cos(7.0 * π/16.0)] |
| 11010 | [R3 * $\sqrt{\epsilon_x}$ * cos(3.0 * π/16.0), −R3 * $\sqrt{\epsilon_x}$ * cos(5.0 * π/16.0)] |
| 11011 | [R3 * $\sqrt{\epsilon_x}$ * cos(π/16.0), −R3 * $\sqrt{\epsilon_x}$ * cos(7.0 * π/16.0)] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2 + 12*R2^2 + 16*R3^2 = 32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

23. A method, comprising:

demodulating a signal, through a demodulation device, wherein the signal was modulated based at least in part on an 32-ary, 4+12+16APSK signal constellation, having an inner ring with 4 bit positions, a middle ring with 12 bit positions and an outer ring with 16 bit positions, in accordance with the following bit labeling and [x, y] coordinate positions:

| Bit Label | [x, y] Coordinates |
|---|---|
| 00000 | [-R3 * $\sqrt{\epsilon_x}$ * cos(5.0 * π/16.0), R3 * $\sqrt{\epsilon_x}$ * cos(3.0 * π/16.0)] |
| 00001 | [-R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [-R2 * $\sqrt{\epsilon_x}$ * sin(π/4.0), R2 * $\sqrt{\epsilon_x}$ * sin(π/4.0)] |
| 00101 | [-R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [-R3 * $\sqrt{\epsilon_x}$ * cos(3.0 * π/16.0), R3 * $\sqrt{\epsilon_x}$ * cos(5.0 * π/16.0)] |
| 01001 | [-R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [-R2 * $\sqrt{\epsilon_x}$ * sin(5.0 * π/12.0), R2 * $\sqrt{\epsilon_x}$ * sin(π/12.0)] |
| 01101 | [-R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [-R3 * $\sqrt{\epsilon_x}$ * cos(5.0 * π/16.0), -R3 * $\sqrt{\epsilon_x}$ * cos(3.0 * π/16.0)] |
| 10001 | [-R3 * $\sqrt{\epsilon_x}$ * cos(7.0 * π/16.0), -R3 * $\sqrt{\epsilon_x}$ * cos(π/16.0)] |
| 10010 | [R3 * $\sqrt{\epsilon_x}$ * cos(5.0 * π/16.0), -R3 * $\sqrt{\epsilon_x}$ * cos(3.0 * π/16.0)] |
| 10011 | [R3 * $\sqrt{\epsilon_x}$ * cos(7.0 * π/16.0), -R3 * $\sqrt{\epsilon_x}$ * cos(π/16.0)] |
| 10100 | [-R2 * $\sqrt{\epsilon_x}$ * sin(π/4.0), -R2 * $\sqrt{\epsilon_x}$ * sin(π/4.0)] |
| 10101 | [-R2 * $\sqrt{\epsilon_x}$ * sin(π/12.0), -R2 * $\sqrt{\epsilon_x}$ * sin(5.0 * π/12.0)] |
| 10110 | [R2 * $\sqrt{\epsilon_x}$ * sin(π/4.0), -R2 * $\sqrt{\epsilon_x}$ * sin(π/4.0)] |
| 10111 | [R2 * $\sqrt{\epsilon_x}$ * sin(π/12.0), -R2 * $\sqrt{\epsilon_x}$ * sin(5.0 * π/12.0)] |
| 11000 | [-R3 * $\sqrt{\epsilon_x}$ * cos(3.0 * π/16.0), -R3 * $\sqrt{\epsilon_x}$ * cos(5.0 * π/16.0)] |
| 11001 | [-R3 * $\sqrt{\epsilon_x}$ * cos(π/16.0), -R3 * $\sqrt{\epsilon_x}$ * cos(7.0 * π/16.0)] |
| 11010 | [R3 * $\sqrt{\epsilon_x}$ * cos(3.0 * π/16.0), -R3 * $\sqrt{\epsilon_x}$ * cos(5.0 * π/16.0)] |
| 11011 | [R3 * $\sqrt{\epsilon_x}$ * cos(π/16.0), -R3 * $\sqrt{\epsilon_x}$ * cos(7.0 * π/16.0)] |
| 11100 | [-R2 * $\sqrt{\epsilon_x}$ * sin(5.0 * π/12.0), -R2 * $\sqrt{\epsilon_x}$ * sin(π/12.0)] |
| 11101 | [-R1 * $\sqrt{\epsilon_x}$ * sin(π/4.0), -R1 * $\sqrt{\epsilon_x}$ * sin(π/4.0)] |
| 11110 | [R2 * $\sqrt{\epsilon_x}$ * sin(5.0 * π/12.0), -R2 * $\sqrt{\epsilon_x}$ * sin(π/12.0)] |
| 11111 | [R1 * $\sqrt{\epsilon_x}$ * sin(π/4.0), -R1 * $\sqrt{\epsilon_x}$ * sin(π/4.0)] | where $\epsilon_x$ represents average energy per symbol, $4*R1^2+12*R2^2+16*R3^2=32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

24. An apparatus, comprising:

a demodulation device configured to demodulate a signal, wherein the signal was modulated based at least in part on an 32-ary, 4+12+16APSK signal constellation, having an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | [-R3 * $\sqrt{\epsilon_x}$ * cos(5.0 * π/16.0), R3 * $\sqrt{\epsilon_x}$ * cos(3.0 * π/16.0)] |
| 00001 | [-R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [-R2 * $\sqrt{\epsilon_x}$ * sin(π/4.0), R2 * $\sqrt{\epsilon_x}$ * sin(π/4.0)] |
| 00101 | [-R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [-R3 * $\sqrt{\epsilon_x}$ * cos(3.0 * π/16.0), R3 * $\sqrt{\epsilon_x}$ * cos(5.0 * π/16.0)] |
| 01001 | [-R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [-R2 * $\sqrt{\epsilon_x}$ * sin(5.0 * π/12.0), R2 * $\sqrt{\epsilon_x}$ * sin(π/12.0)] |
| 01101 | [-R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [-R3 * $\sqrt{\epsilon_x}$ * cos(5.0 * π/16.0), -R3 * $\sqrt{\epsilon_x}$ * cos(3.0 * π/16.0)] |
| 10001 | [-R3 * $\sqrt{\epsilon_x}$ * cos(7.0 * π/16.0), -R3 * $\sqrt{\epsilon_x}$ * cos(π/16.0)] |
| 10010 | [R3 * $\sqrt{\epsilon_x}$ * cos(5.0 * π/16.0), -R3 * $\sqrt{\epsilon_x}$ * cos(3.0 * π/16.0)] |
| 10011 | [R3 * $\sqrt{\epsilon_x}$ * cos(7.0 * π/16.0), -R3 * $\sqrt{\epsilon_x}$ * cos(π/16.0)] |
| 10100 | [-R2 * $\sqrt{\epsilon_x}$ * sin(π/4.0), -R2 * $\sqrt{\epsilon_x}$ * sin(π/4.0)] |
| 10101 | [-R2 * $\sqrt{\epsilon_x}$ * sin(π/12.0), -R2 * $\sqrt{\epsilon_x}$ * sin(5.0 * π/12.0)] |
| 10110 | [R2 * $\sqrt{\epsilon_x}$ * sin(π/4.0), -R2 * $\sqrt{\epsilon_x}$ * sin(π/4.0)] |
| 10111 | [R2 * $\sqrt{\epsilon_x}$ * sin(π/12.0), -R2 * $\sqrt{\epsilon_x}$ * sin(5.0 * π/12.0)] |
| 11000 | [-R3 * $\sqrt{\epsilon_x}$ * cos(3.0 * π/16.0), -R3 * $\sqrt{\epsilon_x}$ * cos(5.0 * π/16.0)] |
| 11001 | [-R3 * $\sqrt{\epsilon_x}$ * cos(π/16.0), -R3 * $\sqrt{\epsilon_x}$ * cos(7.0 * π/16.0)] |
| 11010 | [R3 * $\sqrt{\epsilon_x}$ * cos(3.0 * π/16.0), -R3 * $\sqrt{\epsilon_x}$ * cos(5.0 * π/16.0)] |
| 11011 | [R3 * $\sqrt{\epsilon_x}$ * cos(π/16.0), -R3 * $\sqrt{\epsilon_x}$ * cos(7.0 * π/16.0)] |
| 11100 | [-R2 * $\sqrt{\epsilon_x}$ * sin(5.0 * π/12.0), -R2 * $\sqrt{\epsilon_x}$ * sin(π/12.0)] |
| 11101 | [-R1 * $\sqrt{\epsilon_x}$ * sin(π/4.0), -R1 * $\sqrt{\epsilon_x}$ * sin(π/4.0)] |
| 11110 | [R2 * $\sqrt{\epsilon_x}$ * sin(5.0 * π/12.0), -R2 * $\sqrt{\epsilon_x}$ * sin(π/12.0)] |
| 11111 | [R1 * $\sqrt{\epsilon_x}$ * sin(π/4.0), -R1 * $\sqrt{\epsilon_x}$ * sin(π/4.0)] | where $\epsilon_x$ represents average energy per symbol, $4*R1^2+12*R2^2+16*R3^2=32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

25. A method, comprising:

modulating a signal, through a modulation device, based at least in part on an 32-ary, 4+12+16APSK signal constellation, having an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | [-R3 * $\sqrt{\epsilon_x}$ * sin(π/4.0), R3 * $\sqrt{\epsilon_x}$ * sin(π/4.0)] |
| 00001 | [-R3 * $\sqrt{\epsilon_x}$ * sin(π/8.0), R3 * $\sqrt{\epsilon_x}$ * cos(π/8.0)] |
| 00010 | [R3 * $\sqrt{\epsilon_x}$ * sin(π/8.0), R3 * $\sqrt{\epsilon_x}$ * cos(π/8.0)] |
| 00011 | [0, R3 * $\sqrt{\epsilon_x}$] |
| 00100 | [-R2 * $\sqrt{\epsilon_x}$ * sin(π/4.0), R2 * $\sqrt{\epsilon_x}$ * sin(π/4.0)] |
| 00101 | [-R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [-R3 * $\sqrt{\epsilon_x}$ * cos(π/8.0), R3 * $\sqrt{\epsilon_x}$ * sin(π/8.0)] |
| 01001 | [-R3 * $\sqrt{\epsilon_x}$, 0] |
| 01010 | [R3 * $\sqrt{\epsilon_x}$ * sin(π/4.0), R3 * $\sqrt{\epsilon_x}$ * sin(π/4.0)] |
| 01011 | [R3 * $\sqrt{\epsilon_x}$ * cos(π/8.0), R3 * $\sqrt{\epsilon_x}$ * sin(π/8.0)] |
| 01100 | [-R2 * $\sqrt{\epsilon_x}$ * sin(5.0 * π/12.0), R2 * $\sqrt{\epsilon_x}$ * sin(π/12.0)] |
| 01101 | [-R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [-R3 * $\sqrt{\epsilon_x}$ * sin(π/8.0), -R3 * $\sqrt{\epsilon_x}$ * cos(π/8.0)] |

-continued

| Bit Label | [x, y] Coordinates |
|---|---|
| 10001 | $[0, -R3 * \sqrt{\epsilon_x}]$ |
| 10010 | $[R3 * \sqrt{\epsilon_x} * \sin(\pi/4.0), -R3 * \sqrt{\epsilon_x} * \sin(\pi/4.0)]$ |
| 10011 | $[R3 * \sqrt{\epsilon_x} * \sin(\pi/8.0), -R3 * \sqrt{\epsilon_x} * \cos(\pi/8.0)]$ |
| 10100 | $[-R2 * \sqrt{\epsilon_x} * \sin(\pi/4.0), -R2 * \sqrt{\epsilon_x} * \sin(\pi/4.0)]$ |
| 10101 | $[-R2 * \sqrt{\epsilon_x} * \sin(\pi/12.0), -R2 * \sqrt{\epsilon_x} * \sin(5.0 * \pi/12.0)]$ |
| 10110 | $[R2 * \sqrt{\epsilon_x} * \sin(\pi/4.0), -R2 * \sqrt{\epsilon_x} * \sin(\pi/4.0)]$ |
| 10111 | $[R2 * \sqrt{\epsilon_x} * \sin(\pi/12.0), -R2 * \sqrt{\epsilon_x} * \sin(5.0 * \pi/12.0)]$ |
| 11000 | $[-R3 * \sqrt{\epsilon_x} * \sin(\pi/4.0), -R3 * \sqrt{\epsilon_x} * \sin(\pi/4.0)]$ |
| 11001 | $[-R3 * \sqrt{\epsilon_x} * \cos(\pi/8.0), -R3 * \sqrt{\epsilon_x} * \sin(\pi/8.0)]$ |
| 11010 | $[R3 * \sqrt{\epsilon_x} * \cos(\pi/8.0), -R3 * \sqrt{\epsilon_x} * \sin(\pi/8.0)]$ |
| 11011 | $[R3 * \sqrt{\epsilon_x}, 0]$ |
| 11100 | $[-R2 * \sqrt{\epsilon_x} * \sin(5.0 * \pi/12.0), -R2 * \sqrt{\epsilon_x} * \sin(\pi/12.0)]$ |
| 11101 | $[-R1 * \sqrt{\epsilon_x} * \sin(\pi/4.0), -R1 * \sqrt{\epsilon_x} * \sin(\pi/4.0)]$ |
| 11110 | $[R2 * \sqrt{\epsilon_x} * \sin(5.0 * \pi/12.0), -R2 * \sqrt{\epsilon_x} * \sin(\pi/12.0)]$ |
| 11111 | $[R1 * \sqrt{\epsilon_x} * \sin(\pi/4.0), -R1 * \sqrt{\epsilon_x} * \sin(\pi/4.0)]$ | where $\epsilon_x$ represents average energy per symbol, $4*R1^2+12*R2^2+16*R3^2=32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

26. An apparatus, comprising:

a modulation device configured to modulate a signal based at least in part on an 32-ary, 4+12+16APSK signal constellation, having an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | $[-R3 * \sqrt{\epsilon_x} * \sin(\pi/4.0), R3 * \sqrt{\epsilon_x} * \sin(\pi/4.0)]$ |
| 00001 | $[-R3 * \sqrt{\epsilon_x} * \sin(\pi/8.0), R3 * \sqrt{\epsilon_x} * \cos(\pi/8.0)]$ |
| 00010 | $[R3 * \sqrt{\epsilon_x} * \sin(\pi/8.0), R3 * \sqrt{\epsilon_x} * \cos(\pi/8.0)]$ |
| 00011 | $[0, R3 * \sqrt{\epsilon_x}]$ |
| 00100 | $[-R2 * \sqrt{\epsilon_x} * \sin(\pi/4.0), R2 * \sqrt{\epsilon_x} * \sin(\pi/4.0)]$ |
| 00101 | $[-R2 * \sqrt{\epsilon_x} * \sin(\pi/12.0), R2 * \sqrt{\epsilon_x} * \sin(5.0 * \pi/12.0)]$ |
| 00110 | $[R2 * \sqrt{\epsilon_x} * \sin(\pi/4.0), R2 * \sqrt{\epsilon_x} * \sin(\pi/4.0)]$ |
| 00111 | $[R2 * \sqrt{\epsilon_x} * \sin(\pi/12.0), R2 * \sqrt{\epsilon_x} * \sin(5.0 * \pi/12.0)]$ |
| 01000 | $[-R3 * \sqrt{\epsilon_x} * \cos(\pi/8.0), R3 * \sqrt{\epsilon_x} * \sin(\pi/8.0)]$ |
| 01001 | $[-R3 * \sqrt{\epsilon_x}, 0]$ |
| 01010 | $[R3 * \sqrt{\epsilon_x} * \sin(\pi/4.0), R3 * \sqrt{\epsilon_x} * \sin(\pi/4.0)]$ |
| 01011 | $[R3 * \sqrt{\epsilon_x} * \cos(\pi/8.0), R3 * \sqrt{\epsilon_x} * \sin(\pi/8.0)]$ |
| 01100 | $[-R2 * \sqrt{\epsilon_x} * \sin(5.0 * \pi/12.0), R2 * \sqrt{\epsilon_x} * \sin(\pi/12.0)]$ |
| 01101 | $[-R1 * \sqrt{\epsilon_x} * \sin(\pi/4.0), R1 * \sqrt{\epsilon_x} * \sin(\pi/4.0)]$ |
| 01110 | $[R2 * \sqrt{\epsilon_x} * \sin(5.0 * \pi/12.0), R2 * \sqrt{\epsilon_x} * \sin(\pi/12.0)]$ |
| 01111 | $[R1 * \sqrt{\epsilon_x} * \sin(\pi/4.0), R1 * \sqrt{\epsilon_x} * \sin(\pi/4.0)]$ |
| 10000 | $[-R3 * \sqrt{\epsilon_x} * \sin(\pi/8.0), -R3 * \sqrt{\epsilon_x} * \cos(\pi/8.0)]$ |
| 10001 | $[0, -R3 * \sqrt{\epsilon_x}]$ |
| 10010 | $[R3 * \sqrt{\epsilon_x} * \sin(\pi/4.0), -R3 * \sqrt{\epsilon_x} * \sin(\pi/4.0)]$ |
| 10011 | $[R3 * \sqrt{\epsilon_x} * \sin(\pi/8.0), -R3 * \sqrt{\epsilon_x} * \cos(\pi/8.0)]$ |
| 10100 | $[-R2 * \sqrt{\epsilon_x} * \sin(\pi/4.0), -R2 * \sqrt{\epsilon_x} * \sin(\pi/4.0)]$ |
| 10101 | $[-R2 * \sqrt{\epsilon_x} * \sin(\pi/12.0), -R2 * \sqrt{\epsilon_x} * \sin(5.0 * \pi/12.0)]$ |
| 10110 | $[R2 * \sqrt{\epsilon_x} * \sin(\pi/4.0), -R2 * \sqrt{\epsilon_x} * \sin(\pi/4.0)]$ |
| 10111 | $[R2 * \sqrt{\epsilon_x} * \sin(\pi/12.0), -R2 * \sqrt{\epsilon_x} * \sin(5.0 * \pi/12.0)]$ |
| 11000 | $[-R3 * \sqrt{\epsilon_x} * \sin(\pi/4.0), -R3 * \sqrt{\epsilon_x} * \sin(\pi/4.0)]$ |
| 11001 | $[-R3 * \sqrt{\epsilon_x} * \cos(\pi/8.0), -R3 * \sqrt{\epsilon_x} * \sin(\pi/8.0)]$ |
| 11010 | $[R3 * \sqrt{\epsilon_x} * \cos(\pi/8.0), -R3 * \sqrt{\epsilon_x} * \sin(\pi/8.0)]$ |
| 11011 | $[R3 * \sqrt{\epsilon_x}, 0]$ |
| 11100 | $[-R2 * \sqrt{\epsilon_x} * \sin(5.0 * \pi/12.0), -R2 * \sqrt{\epsilon_x} * \sin(\pi/12.0)]$ |
| 11101 | $[-R1 * \sqrt{\epsilon_x} * \sin(\pi/4.0), -R1 * \sqrt{\epsilon_x} * \sin(\pi/4.0)]$ |
| 11110 | $[R2 * \sqrt{\epsilon_x} * \sin(5.0 * \pi/12.0), -R2 * \sqrt{\epsilon_x} * \sin(\pi/12.0)]$ |
| 11111 | $[R1 * \sqrt{\epsilon_x} * \sin(\pi/4.0), -R1 * \sqrt{\epsilon_x} * \sin(\pi/4.0)]$ | where $\epsilon_x$ represents average energy per symbol, $4*R1^2+12*R2^2+16*R3^2=32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

27. A method, comprising:

demodulating a signal, through a demodulation device, wherein the signal was modulated based at least in part on an 32-ary, 4+12+16APSK signal constellation, having an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | $[-R3 * \sqrt{\epsilon_x} * \sin(\pi/4.0), R3 * \sqrt{\epsilon_x} * \sin(\pi/4.0)]$ |
| 00001 | $[-R3 * \sqrt{\epsilon_x} * \sin(\pi/8.0), R3 * \sqrt{\epsilon_x} * \cos(\pi/8.0)]$ |
| 00010 | $[R3 * \sqrt{\epsilon_x} * \sin(\pi/8.0), R3 * \sqrt{\epsilon_x} * \cos(\pi/8.0)]$ |
| 00011 | $[0, R3 * \sqrt{\epsilon_x}]$ |
| 00100 | $[-R2 * \sqrt{\epsilon_x} * \sin(\pi/4.0), R2 * \sqrt{\epsilon_x} * \sin(\pi/4.0)]$ |
| 00101 | $[-R2 * \sqrt{\epsilon_x} * \sin(\pi/12.0), R2 * \sqrt{\epsilon_x} * \sin(5.0 * \pi/12.0)]$ |
| 00110 | $[R2 * \sqrt{\epsilon_x} * \sin(\pi/4.0), R2 * \sqrt{\epsilon_x} * \sin(\pi/4.0)]$ |
| 00111 | $[R2 * \sqrt{\epsilon_x} * \sin(\pi/12.0), R2 * \sqrt{\epsilon_x} * \sin(5.0 * \pi/12.0)]$ |
| 01000 | $[-R3 * \sqrt{\epsilon_x} * \cos(\pi/8.0), R3 * \sqrt{\epsilon_x} * \sin(\pi/8.0)]$ |
| 01001 | $[-R3 * \sqrt{\epsilon_x}, 0]$ |
| 01010 | $[R3 * \sqrt{\epsilon_x} * \sin(\pi/4.0), R3 * \sqrt{\epsilon_x} * \sin(\pi/4.0)]$ |
| 01011 | $[R3 * \sqrt{\epsilon_x} * \cos(\pi/8.0), R3 * \sqrt{\epsilon_x} * \sin(\pi/8.0)]$ |
| 01100 | $[-R2 * \sqrt{\epsilon_x} * \sin(5.0 * \pi/12.0), R2 * \sqrt{\epsilon_x} * \sin(\pi/12.0)]$ |
| 01101 | $[-R1 * \sqrt{\epsilon_x} * \sin(\pi/4.0), R1 * \sqrt{\epsilon_x} * \sin(\pi/4.0)]$ |
| 01110 | $[R2 * \sqrt{\epsilon_x} * \sin(5.0 * \pi/12.0), R2 * \sqrt{\epsilon_x} * \sin(\pi/12.0)]$ |
| 01111 | $[R1 * \sqrt{\epsilon_x} * \sin(\pi/4.0), R1 * \sqrt{\epsilon_x} * \sin(\pi/4.0)]$ |
| 10000 | $[-R3 * \sqrt{\epsilon_x} * \sin(\pi/8.0), -R3 * \sqrt{\epsilon_x} * \cos(\pi/8.0)]$ |
| 10001 | $[0, -R3 * \sqrt{\epsilon_x}]$ |
| 10010 | $[R3 * \sqrt{\epsilon_x} * \sin(\pi/4.0), -R3 * \sqrt{\epsilon_x} * \sin(\pi/4.0)]$ |
| 10011 | $[R3 * \sqrt{\epsilon_x} * \sin(\pi/8.0), -R3 * \sqrt{\epsilon_x} * \cos(\pi/8.0)]$ |
| 10100 | $[-R2 * \sqrt{\epsilon_x} * \sin(\pi/4.0), -R2 * \sqrt{\epsilon_x} * \sin(\pi/4.0)]$ |
| 10101 | $[-R2 * \sqrt{\epsilon_x} * \sin(\pi/12.0), -R2 * \sqrt{\epsilon_x} * \sin(5.0 * \pi/12.0)]$ |
| 10110 | $[R2 * \sqrt{\epsilon_x} * \sin(\pi/4.0), -R2 * \sqrt{\epsilon_x} * \sin(\pi/4.0)]$ |
| 10111 | $[R2 * \sqrt{\epsilon_x} * \sin(\pi/12.0), -R2 * \sqrt{\epsilon_x} * \sin(5.0 * \pi/12.0)]$ |
| 11000 | $[-R3 * \sqrt{\epsilon_x} * \sin(\pi/4.0), -R3 * \sqrt{\epsilon_x} * \sin(\pi/4.0)]$ |
| 11001 | $[-R3 * \sqrt{\epsilon_x} * \cos(\pi/8.0), -R3 * \sqrt{\epsilon_x} * \sin(\pi/8.0)]$ |
| 11010 | $[R3 * \sqrt{\epsilon_x} * \cos(\pi/8.0), -R3 * \sqrt{\epsilon_x} * \sin(\pi/8.0)]$ |
| 11011 | $[R3 * \sqrt{\epsilon_x}, 0]$ |
| 11100 | $[-R2 * \sqrt{\epsilon_x} * \sin(5.0 * \pi/12.0), -R2 * \sqrt{\epsilon_x} * \sin(\pi/12.0)]$ |
| 11101 | $[-R1 * \sqrt{\epsilon_x} * \sin(\pi/4.0), -R1 * \sqrt{\epsilon_x} * \sin(\pi/4.0)]$ |
| 11110 | $[R2 * \sqrt{\epsilon_x} * \sin(5.0 * \pi/12.0), -R2 * \sqrt{\epsilon_x} * \sin(\pi/12.0)]$ |
| 11111 | $[R1 * \sqrt{\epsilon_x} * \sin(\pi/4.0), -R1 * \sqrt{\epsilon_x} * \sin(\pi/4.0)]$ | where $\epsilon_x$ represents average energy per symbol, $4*R1^2+12*R2^2+16*R3^2=32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

28. An apparatus, comprising:

a demodulation device configured to demodulate a signal, wherein the signal was modulated based at least in part on an 32-ary, 4+12+16APSK signal constellation, having an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | [−R3 * $\sqrt{\epsilon_x}$ * sin(π/4.0), R3 * $\sqrt{\epsilon_x}$ * sin(π/4.0)] |
| 00001 | [−R3 * $\sqrt{\epsilon_x}$ * sin(π/8.0), R3 * $\sqrt{\epsilon_x}$ * cos(π/8.0)] |
| 00010 | [R3 * $\sqrt{\epsilon_x}$ * sin(π/8.0), R3 * $\sqrt{\epsilon_x}$ * cos(π/8.0)] |
| 00011 | [0, R3 * $\sqrt{\epsilon_x}$] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(π/8.0), R3 * $\sqrt{\epsilon_x}$ * sin(π/8.0)] |
| 01001 | [−R3 * $\sqrt{\epsilon_x}$, 0] |
| 01010 | [R3 * $\sqrt{\epsilon_x}$ * sin(π/4.0), R3 * $\sqrt{\epsilon_x}$ * sin(π/4.0)] |
| 01011 | [R3 * $\sqrt{\epsilon_x}$ * cos(π/8.0), R3 * $\sqrt{\epsilon_x}$ * sin(π/8.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * sin(π/8.0), −R3 * $\sqrt{\epsilon_x}$ * cos(π/8.0)] |
| 10001 | [0, −R3 * $\sqrt{\epsilon_x}$] |
| 10010 | [R3 * $\sqrt{\epsilon_x}$ * sin(π/4.0), −R3 * $\sqrt{\epsilon_x}$ * sin(π/4.0)] |
| 10011 | [R3 * $\sqrt{\epsilon_x}$ * sin(π/8.0), −R3 * $\sqrt{\epsilon_x}$ * cos(π/8.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * sin(π/4.0), −R3 * $\sqrt{\epsilon_x}$ * sin(π/4.0)] |
| 11001 | [−R3 * $\sqrt{\epsilon_x}$ * cos(π/8.0), −R3 * $\sqrt{\epsilon_x}$ * sin(π/8.0)] |
| 11010 | [R3 * $\sqrt{\epsilon_x}$ * cos(π/8.0), −R3 * $\sqrt{\epsilon_x}$ * sin(π/8.0)] |
| 11011 | [R3 * $\sqrt{\epsilon_x}$, 0] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2 + 12*R2^2 + 16*R3^2 = 32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

29. A method, comprising:

modulating a signal, through a modulation device, based at least in part on an 64-ary, 8+16+20+20APSK signal constellation, having an inner ring with 8 bit positions, a first middle ring with 16 bit positions, a second middle ring with 20 bit positions and an outer ring with 20 bit positions.

30. The method according to claim 29, wherein the bit positions of the inner, first middle, second middle and outer rings are in accordance with the following bit labeling and [x, y] bit coordinate positions:

| Bit Label | [x, y] Coordinates |
|---|---|
| 000000 | [R2 * $\sqrt{\epsilon_x}$ * cos(25.0 * π/16.0), R2 * $\sqrt{\epsilon_x}$ * sin(25.0 * π/16.0)] |
| 000001 | [R4 * $\sqrt{\epsilon_x}$ * cos(35.0 * π/20.0), R4 * $\sqrt{\epsilon_x}$ * sin(35.0 * π/20.0)] |
| 000010 | [R2 * $\sqrt{\epsilon_x}$ * cos(27.0 * π/16.0), R2 * $\sqrt{\epsilon_x}$ * sin(27.0 * π/16.0)] |
| 000011 | [R3 * $\sqrt{\epsilon_x}$ * cos(35.0 * π/20.0), R3 * $\sqrt{\epsilon_x}$ * sin(35.0 * π/20.0)] |
| 000100 | [R4 * $\sqrt{\epsilon_x}$ * cos(31.0 * π/20.0), R4 * $\sqrt{\epsilon_x}$ * sin(31.0 * π/20.0)] |
| 000101 | [R4 * $\sqrt{\epsilon_x}$ * cos(33.0 * π/20.0), R4 * $\sqrt{\epsilon_x}$ * sin(33.0 * π/20.0)] |
| 000110 | [R3 * $\sqrt{\epsilon_x}$ * cos(31.0 * π/20.0), R3 * $\sqrt{\epsilon_x}$ * sin(31.0 * π/20.0)] |
| 000111 | [R3 * $\sqrt{\epsilon_x}$ * cos(33.0 * π/20.0), R3 * $\sqrt{\epsilon_x}$ * sin(33.0 * π/20.0)] |
| 001000 | [R2 * $\sqrt{\epsilon_x}$ * cos(23.0 * π/16.0), R2 * $\sqrt{\epsilon_x}$ * sin(23.0 * π/16.0)] |
| 001001 | [R4 * $\sqrt{\epsilon_x}$ * cos(25.0 * π/20.0), R4 * $\sqrt{\epsilon_x}$ * sin(25.0 * π/20.0)] |
| 001010 | [R2 * $\sqrt{\epsilon_x}$ * cos(21.0 * π/16.0), R2 * $\sqrt{\epsilon_x}$ * sin(21.0 * π/16.0)] |
| 001011 | [R3 * $\sqrt{\epsilon_x}$ * cos(25.0 * π/20.0), R3 * $\sqrt{\epsilon_x}$ * sin(25.0 * π/20.0)] |
| 001100 | [R4 * $\sqrt{\epsilon_x}$ * cos(29.0 * π/20.0), R4 * $\sqrt{\epsilon_x}$ * sin(29.0 * π/20.0)] |
| 001101 | [R4 * $\sqrt{\epsilon_x}$ * cos(27.0 * π/20.0), R4 * $\sqrt{\epsilon_x}$ * sin(27.0 * π/20.0)] |
| 001110 | [R3 * $\sqrt{\epsilon_x}$ * cos(29.0 * π/20.0), R3 * $\sqrt{\epsilon_x}$ * sin(29.0 * π/20.0)] |
| 001111 | [R3 * $\sqrt{\epsilon_x}$ * cos(27.0 * π/20.0), R3 * $\sqrt{\epsilon_x}$ * sin(27.0 * π/20.0)] |
| 010000 | [R1 * $\sqrt{\epsilon_x}$ * cos(13.0 * π/8.0), R1 * $\sqrt{\epsilon_x}$ * sin(13.0 * π/8.0)] |
| 010001 | [R4 * $\sqrt{\epsilon_x}$ * cos(37.0 * π/20.0), R4 * $\sqrt{\epsilon_x}$ * sin(37.0 * π/20.0)] |
| 010010 | [R2 * $\sqrt{\epsilon_x}$ * cos(29.0 * π/16.0), R2 * $\sqrt{\epsilon_x}$ * sin(29.0 * π/16.0)] |
| 010011 | [R3 * $\sqrt{\epsilon_x}$ * cos(37.0 * π/20.0), R3 * $\sqrt{\epsilon_x}$ * sin(37.0 * π/20.0)] |
| 010100 | [R1 * $\sqrt{\epsilon_x}$ * cos(15.0 * π/8.0), R1 * $\sqrt{\epsilon_x}$ * sin(15.0 * π/8.0)] |
| 010101 | [R4 * $\sqrt{\epsilon_x}$ * cos(39.0 * π/20.0), R4 * $\sqrt{\epsilon_x}$ * sin(39.0 * π/20.0)] |
| 010110 | [R2 * $\sqrt{\epsilon_x}$ * cos(31.0 * π/16.0), R2 * $\sqrt{\epsilon_x}$ * sin(31.0 * π/16.0)] |
| 010111 | [R3 * $\sqrt{\epsilon_x}$ * cos(39.0 * π/20.0), R3 * $\sqrt{\epsilon_x}$ * sin(39.0 * π/20.0)] |
| 011000 | [R1 * $\sqrt{\epsilon_x}$ * cos(11.0 * π/8.0), R1 * $\sqrt{\epsilon_x}$ * sin(11.0 * π/8.0)] |
| 011001 | [R4 * $\sqrt{\epsilon_x}$ * cos(23.0 * π/20.0), R4 * $\sqrt{\epsilon_x}$ * sin(23.0 * π/20.0)] |
| 011010 | [R2 * $\sqrt{\epsilon_x}$ * cos(19.0 * π/16.0), R2 * $\sqrt{\epsilon_x}$ * sin(19.0 * π/16.0)] |
| 011011 | [R3 * $\sqrt{\epsilon_x}$ * cos(23.0 * π/20.0), R3 * $\sqrt{\epsilon_x}$ * sin(23.0 * π/20.0)] |
| 011100 | [R1 * $\sqrt{\epsilon_x}$ * cos(9.0 * π/8.0), R1 * $\sqrt{\epsilon_x}$ * sin(9.0 * π/8.0)] |
| 011101 | [R4 * $\sqrt{\epsilon_x}$ * cos(21.0 * π/20.0), R4 * $\sqrt{\epsilon_x}$ * sin(21.0 * π/20.0)] |
| 011110 | [R2 * $\sqrt{\epsilon_x}$ * cos(17.0 * π/16.0), R2 * $\sqrt{\epsilon_x}$ * sin(17.0 * π/16.0)] |
| 011111 | [R3 * $\sqrt{\epsilon_x}$ * cos(21.0 * π/20.0), R3 * $\sqrt{\epsilon_x}$ * sin(21.0 * π/20.0)] |
| 100000 | [R2 * $\sqrt{\epsilon_x}$ * cos(7.0 * π/16.0), R2 * $\sqrt{\epsilon_x}$ * sin(7.0 * π/16.0)] |
| 100001 | [R4 * $\sqrt{\epsilon_x}$ * cos(5.0 * π/20.0), R4 * $\sqrt{\epsilon_x}$ * sin(5.0 * π/20.0)] |
| 100010 | [R2 * $\sqrt{\epsilon_x}$ * cos(5.0 * π/16.0), R2 * $\sqrt{\epsilon_x}$ * sin(5.0 * π/16.0)] |
| 100011 | [R3 * $\sqrt{\epsilon_x}$ * cos(5.0 * π/20.0), R3 * $\sqrt{\epsilon_x}$ * sin(5.0 * π/20.0)] |
| 100100 | [R4 * $\sqrt{\epsilon_x}$ * cos(9.0 * π/20.0), R4 * $\sqrt{\epsilon_x}$ * sin(9.0 * π/20.0)] |
| 100101 | [R4 * $\sqrt{\epsilon_x}$ * cos(7.0 * π/20.0), R4 * $\sqrt{\epsilon_x}$ * sin(7.0 * π/20.0)] |
| 100110 | [R3 * $\sqrt{\epsilon_x}$ * cos(9.0 * π/20.0), R3 * $\sqrt{\epsilon_x}$ * sin(9.0 * π/20.0)] |
| 100111 | [R3 * $\sqrt{\epsilon_x}$ * cos(7.0 * π/20.0), R3 * $\sqrt{\epsilon_x}$ * sin(7.0 * π/20.0)] |
| 101000 | [R2 * $\sqrt{\epsilon_x}$ * cos(9.0 * π/16.0), R2 * $\sqrt{\epsilon_x}$ * sin(9.0 * π/16.0)] |
| 101001 | [R4 * $\sqrt{\epsilon_x}$ * cos(15.0 * π/20.0), R4 * $\sqrt{\epsilon_x}$ * sin(15.0 * π/20.0)] |
| 101010 | [R2 * $\sqrt{\epsilon_x}$ * cos(11.0 * π/16.0), R2 * $\sqrt{\epsilon_x}$ * sin(11.0 * π/16.0)] |
| 101011 | [R3 * $\sqrt{\epsilon_x}$ * cos(15.0 * π/20.0), R3 * $\sqrt{\epsilon_x}$ * sin(15.0 * π/20.0)] |
| 101100 | [R4 * $\sqrt{\epsilon_x}$ * cos(11.0 * π/20.0), R4 * $\sqrt{\epsilon_x}$ * sin(11.0 * π/20.0)] |
| 101101 | [R4 * $\sqrt{\epsilon_x}$ * cos(13.0 * π/20.0), R4 * $\sqrt{\epsilon_x}$ * sin(13.0 * π/20.0)] |
| 101110 | [R3 * $\sqrt{\epsilon_x}$ * cos(11.0 * π/20.0), R3 * $\sqrt{\epsilon_x}$ * sin(11.0 * π/20.0)] |
| 101111 | [R3 * $\sqrt{\epsilon_x}$ * cos(13.0 * π/20.0), R3 * $\sqrt{\epsilon_x}$ * sin(13.0 * π/20.0)] |
| 110000 | [R1 * $\sqrt{\epsilon_x}$ * cos(3.0 * π/8.0), R1 * $\sqrt{\epsilon_x}$ * sin(3.0 * π/8.0)] |
| 110001 | [R4 * $\sqrt{\epsilon_x}$ * cos(3.0 * π/20.0), R4 * $\sqrt{\epsilon_x}$ * sin(3.0 * π/20.0)] |
| 110010 | [R2 * $\sqrt{\epsilon_x}$ * cos(3.0 * π/16.0), R2 * $\sqrt{\epsilon_x}$ * sin(3.0 * π/16.0)] |
| 110011 | [R3 * $\sqrt{\epsilon_x}$ * cos(3.0 * π/20.0), R3 * $\sqrt{\epsilon_x}$ * sin(3.0 * π/20.0)] |
| 110100 | [R1 * $\sqrt{\epsilon_x}$ * cos(π/8.0), R1 * $\sqrt{\epsilon_x}$ * sin(π/8.0)] |
| 110101 | [R4 * $\sqrt{\epsilon_x}$ * cos(π/20.0), R4 * $\sqrt{\epsilon_x}$ * sin(π/20.0)] |
| 110110 | [R2 * $\sqrt{\epsilon_x}$ * cos(π/16.0), R2 * $\sqrt{\epsilon_x}$ * sin(π/16.0)] |
| 110111 | [R3 * $\sqrt{\epsilon_x}$ * cos(π/20.0), R3 * $\sqrt{\epsilon_x}$ * sin(π/20.0)] |
| 111000 | [R1 * $\sqrt{\epsilon_x}$ * cos(5.0 * π/8.0), R1 * $\sqrt{\epsilon_x}$ * sin(5.0 * π/8.0)] |
| 111001 | [R4 * $\sqrt{\epsilon_x}$ * cos(17.0 * π/20.0), R4 * $\sqrt{\epsilon_x}$ * sin(17.0 * π/20.0)] |
| 111010 | [R2 * $\sqrt{\epsilon_x}$ * cos(13.0 * π/16.0), R2 * $\sqrt{\epsilon_x}$ * sin(13.0 * π/16.0)] |
| 111011 | [R3 * $\sqrt{\epsilon_x}$ * cos(17.0 * π/20.0), R3 * $\sqrt{\epsilon_x}$ * sin(17.0 * π/20.0)] |
| 111100 | [R1 * $\sqrt{\epsilon_x}$ * cos(7.0 * π/8.0), R1 * $\sqrt{\epsilon_x}$ * sin(7.0 * π/8.0)] |
| 111101 | [R4 * $\sqrt{\epsilon_x}$ * cos(19.0 * π/20.0), R4 * $\sqrt{\epsilon_x}$ * sin(19.0 * π/20.0)] |
| 111110 | [R2 * $\sqrt{\epsilon_x}$ * cos(15.0 * π/16.0), R2 * $\sqrt{\epsilon_x}$ * sin(15.0 * π/16.0)] |
| 111111 | [R3 * $\sqrt{\epsilon_x}$ * cos(19.0 * π/20.0), R3 * $\sqrt{\epsilon_x}$ * sin(19.0 * π/20.0)] | where $\epsilon_x$ represents average energy per symbol, $8*R1^2 + 16*R2^2 + 20*R3^2 + 20*R4^2 = 64$, and R1 represents the radius of the inner ring, R2 represents the radius of the first middle ring, R3 represents the radius of the second middle ring and R4 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

31. An apparatus, comprising:

a modulation device configured to modulate a signal based at least in part on an 64-ary, 8+16+20+20APSK signal constellation, having an inner ring with 8 bit positions, a first middle ring with 16 bit positions, a second middle ring with 20 bit positions and an outer ring with 20 bit positions.

32. The apparatus according to claim 31, wherein the bit positions of the inner, first middle, second middle and outer rings are in accordance with the following bit labeling and [x, y] bit coordinate positions:

| Bit Label | [x, y] Coordinates |
|---|---|
| 000000 | [R2 * $\sqrt{\epsilon_x}$ * cos(25.0 * π/16.0), R2 * $\sqrt{\epsilon_x}$ * sin(25.0 * π/16.0)] |
| 000001 | [R4 * $\sqrt{\epsilon_x}$ * cos(35.0 * π/20.0), R4 * $\sqrt{\epsilon_x}$ * sin(35.0 * π/20.0)] |
| 000010 | [R2 * $\sqrt{\epsilon_x}$ * cos(27.0 * π/16.0), R2 * $\sqrt{\epsilon_x}$ * sin(27.0 * π/16.0)] |
| 000011 | [R3 * $\sqrt{\epsilon_x}$ * cos(35.0 * π/20.0), R3 * $\sqrt{\epsilon_x}$ * sin(35.0 * π/20.0)] |
| 000100 | [R4 * $\sqrt{\epsilon_x}$ * cos(31.0 * π/20.0), R4 * $\sqrt{\epsilon_x}$ * sin(31.0 * π/20.0)] |
| 000101 | [R4 * $\sqrt{\epsilon_x}$ * cos(33.0 * π/20.0), R4 * $\sqrt{\epsilon_x}$ * sin(33.0 * π/20.0)] |
| 000110 | [R3 * $\sqrt{\epsilon_x}$ * cos(31.0 * π/20.0), R3 * $\sqrt{\epsilon_x}$ * sin(31.0 * π/20.0)] |
| 000111 | [R3 * $\sqrt{\epsilon_x}$ * cos(33.0 * π/20.0), R3 * $\sqrt{\epsilon_x}$ * sin(33.0 * π/20.0)] |
| 001000 | [R2 * $\sqrt{\epsilon_x}$ * cos(23.0 * π/16.0), R2 * $\sqrt{\epsilon_x}$ * sin(23.0 * π/16.0)] |
| 001001 | [R4 * $\sqrt{\epsilon_x}$ * cos(25.0 * π/20.0), R4 * $\sqrt{\epsilon_x}$ * sin(25.0 * π/20.0)] |
| 001010 | [R2 * $\sqrt{\epsilon_x}$ * cos(21.0 * π/16.0), R2 * $\sqrt{\epsilon_x}$ * sin(21.0 * π/16.0)] |
| 001011 | [R3 * $\sqrt{\epsilon_x}$ * cos(25.0 * π/20.0), R3 * $\sqrt{\epsilon_x}$ * sin(25.0 * π/20.0)] |
| 001100 | [R4 * $\sqrt{\epsilon_x}$ * cos(29.0 * π/20.0), R4 * $\sqrt{\epsilon_x}$ * sin(29.0 * π/20.0)] |
| 001101 | [R4 * $\sqrt{\epsilon_x}$ * cos(27.0 * π/20.0), R4 * $\sqrt{\epsilon_x}$ * sin(27.0 * π/20.0)] |
| 001110 | [R3 * $\sqrt{\epsilon_x}$ * cos(29.0 * π/20.0), R3 * $\sqrt{\epsilon_x}$ * sin(29.0 * π/20.0)] |
| 001111 | [R3 * $\sqrt{\epsilon_x}$ * cos(27.0 * π/20.0), R3 * $\sqrt{\epsilon_x}$ * sin(27.0 * π/20.0)] |
| 010000 | [R1 * $\sqrt{\epsilon_x}$ * cos(13.0 * π/8.0), R1 * $\sqrt{\epsilon_x}$ * sin(13.0 * π/8.0)] |
| 010001 | [R4 * $\sqrt{\epsilon_x}$ * cos(37.0 * π/20.0), R4 * $\sqrt{\epsilon_x}$ * sin(37.0 * π/20.0)] |
| 010010 | [R2 * $\sqrt{\epsilon_x}$ * cos(29.0 * π/16.0), R2 * $\sqrt{\epsilon_x}$ * sin(29.0 * π/16.0)] |
| 010011 | [R3 * $\sqrt{\epsilon_x}$ * cos(37.0 * π/20.0), R3 * $\sqrt{\epsilon_x}$ * sin(37.0 * π/20.0)] |
| 010100 | [R1 * $\sqrt{\epsilon_x}$ * cos(15.0 * π/8.0), R1 * $\sqrt{\epsilon_x}$ * sin(15.0 * π/8.0)] |
| 010101 | [R4 * $\sqrt{\epsilon_x}$ * cos(39.0 * π/20.0), R4 * $\sqrt{\epsilon_x}$ * sin(39.0 * π/20.0)] |
| 010110 | [R2 * $\sqrt{\epsilon_x}$ * cos(31.0 * π/16.0), R2 * $\sqrt{\epsilon_x}$ * sin(31.0 * π/16.0)] |
| 010111 | [R3 * $\sqrt{\epsilon_x}$ * cos(39.0 * π/20.0), R3 * $\sqrt{\epsilon_x}$ * sin(39.0 * π/20.0)] |
| 011000 | [R1 * $\sqrt{\epsilon_x}$ * cos(11.0 * π/8.0), R1 * $\sqrt{\epsilon_x}$ * sin(11.0 * π/8.0)] |
| 011001 | [R4 * $\sqrt{\epsilon_x}$ * cos(23.0 * π/20.0), R4 * $\sqrt{\epsilon_x}$ * sin(23.0 * π/20.0)] |
| 011010 | [R2 * $\sqrt{\epsilon_x}$ * cos(19.0 * π/16.0), R2 * $\sqrt{\epsilon_x}$ * sin(19.0 * π/16.0)] |
| 011011 | [R3 * $\sqrt{\epsilon_x}$ * cos(23.0 * π/20.0), R3 * $\sqrt{\epsilon_x}$ * sin(23.0 * π/20.0)] |
| 011100 | [R1 * $\sqrt{\epsilon_x}$ * cos(9.0 * π/8.0), R1 * $\sqrt{\epsilon_x}$ * sin(9.0 * π/8.0)] |
| 011101 | [R4 * $\sqrt{\epsilon_x}$ * cos(21.0 * π/20.0), R4 * $\sqrt{\epsilon_x}$ * sin(21.0 * π/20.0)] |
| 011110 | [R2 * $\sqrt{\epsilon_x}$ * cos(17.0 * π/16.0), R2 * $\sqrt{\epsilon_x}$ * sin(17.0 * π/16.0)] |
| 011111 | [R3 * $\sqrt{\epsilon_x}$ * cos(21.0 * π/20.0), R3 * $\sqrt{\epsilon_x}$ * sin(21.0 * π/20.0)] |
| 100000 | [R2 * $\sqrt{\epsilon_x}$ * cos(7.0 * π/16.0), R2 * $\sqrt{\epsilon_x}$ * sin(7.0 * π/16.0)] |
| 100001 | [R4 * $\sqrt{\epsilon_x}$ * cos(5.0 * π/20.0), R4 * $\sqrt{\epsilon_x}$ * sin(5.0 * π/20.0)] |
| 100010 | [R2 * $\sqrt{\epsilon_x}$ * cos(5.0 * π/16.0), R2 * $\sqrt{\epsilon_x}$ * sin(5.0 * π/16.0)] |
| 100011 | [R3 * $\sqrt{\epsilon_x}$ * cos(5.0 * π/20.0), R3 * $\sqrt{\epsilon_x}$ * sin(5.0 * π/20.0)] |
| 100100 | [R4 * $\sqrt{\epsilon_x}$ * cos(9.0 * π/20.0), R4 * $\sqrt{\epsilon_x}$ * sin(9.0 * π/20.0)] |
| 100101 | [R4 * $\sqrt{\epsilon_x}$ * cos(7.0 * π/20.0), R4 * $\sqrt{\epsilon_x}$ * sin(7.0 * π/20.0)] |
| 100110 | [R3 * $\sqrt{\epsilon_x}$ * cos(9.0 * π/20.0), R3 * $\sqrt{\epsilon_x}$ * sin(9.0 * π/20.0)] |
| 100111 | [R3 * $\sqrt{\epsilon_x}$ * cos(7.0 * π/20.0), R3 * $\sqrt{\epsilon_x}$ * sin(7.0 * π/20.0)] |
| 101000 | [R2 * $\sqrt{\epsilon_x}$ * cos(9.0 * π/16.0), R2 * $\sqrt{\epsilon_x}$ * sin(9.0 * π/16.0)] |
| 101001 | [R4 * $\sqrt{\epsilon_x}$ * cos(15.0 * π/20.0), R4 * $\sqrt{\epsilon_x}$ * sin(15.0 * π/20.0)] |
| 101010 | [R2 * $\sqrt{\epsilon_x}$ * cos(11.0 * π/16.0), R2 * $\sqrt{\epsilon_x}$ * sin(11.0 * π/16.0)] |
| 101011 | [R3 * $\sqrt{\epsilon_x}$ * cos(15.0 * π/20.0), R3 * $\sqrt{\epsilon_x}$ * sin(15.0 * π/20.0)] |
| 101100 | [R4 * $\sqrt{\epsilon_x}$ * cos(11.0 * π/20.0), R4 * $\sqrt{\epsilon_x}$ * sin(11.0 * π/20.0)] |
| 101101 | [R4 * $\sqrt{\epsilon_x}$ * cos(13.0 * π/20.0), R4 * $\sqrt{\epsilon_x}$ * sin(13.0 * π/20.0)] |
| 101110 | [R3 * $\sqrt{\epsilon_x}$ * cos(11.0 * π/20.0), R3 * $\sqrt{\epsilon_x}$ * sin(11.0 * π/20.0)] |
| 101111 | [R3 * $\sqrt{\epsilon_x}$ * cos(13.0 * π/20.0), R3 * $\sqrt{\epsilon_x}$ * sin(13.0 * π/20.0)] |
| 110000 | [R1 * $\sqrt{\epsilon_x}$ * cos(3.0 * π/8.0), R1 * $\sqrt{\epsilon_x}$ * sin(3.0 * π/8.0)] |
| 110001 | [R4 * $\sqrt{\epsilon_x}$ * cos(3.0 * π/20.0), R4 * $\sqrt{\epsilon_x}$ * sin(3.0 * π/20.0)] |
| 110010 | [R2 * $\sqrt{\epsilon_x}$ * cos(3.0 * π/16.0), R2 * $\sqrt{\epsilon_x}$ * sin(3.0 * π/16.0)] |
| 110011 | [R3 * $\sqrt{\epsilon_x}$ * cos(3.0 * π/20.0), R3 * $\sqrt{\epsilon_x}$ * sin(3.0 * π/20.0)] |
| 110100 | [R1 * $\sqrt{\epsilon_x}$ * cos(π/8.0), R1 * $\sqrt{\epsilon_x}$ * sin(π/8.0)] |
| 110101 | [R4 * $\sqrt{\epsilon_x}$ * cos(π/20.0), R4 * $\sqrt{\epsilon_x}$ * sin(π/20.0)] |
| 110110 | [R2 * $\sqrt{\epsilon_x}$ * cos(π/16.0), R2 * $\sqrt{\epsilon_x}$ * sin(π/16.0)] |
| 110111 | [R3 * $\sqrt{\epsilon_x}$ * cos(π/20.0), R3 * $\sqrt{\epsilon_x}$ * sin(π/20.0)] |
| 111000 | [R1 * $\sqrt{\epsilon_x}$ * cos(5.0 * π/8.0), R1 * $\sqrt{\epsilon_x}$ * sin(5.0 * π/8.0)] |
| 111001 | [R4 * $\sqrt{\epsilon_x}$ * cos(17.0 * π/20.0), R4 * $\sqrt{\epsilon_x}$ * sin(17.0 * π/20.0)] |
| 111010 | [R2 * $\sqrt{\epsilon_x}$ * cos(13.0 * π/16.0), R2 * $\sqrt{\epsilon_x}$ * sin(13.0 * π/16.0)] |
| 111011 | [R3 * $\sqrt{\epsilon_x}$ * cos(17.0 * π/20.0), R3 * $\sqrt{\epsilon_x}$ * sin(17.0 * π/20.0)] |
| 111100 | [R1 * $\sqrt{\epsilon_x}$ * cos(7.0 * π/8.0), R1 * $\sqrt{\epsilon_x}$ * sin(7.0 * π/8.0)] |
| 111101 | [R4 * $\sqrt{\epsilon_x}$ * cos(19.0 * π/20.0), R4 * $\sqrt{\epsilon_x}$ * sin(19.0 * π/20.0)] |
| 111110 | [R2 * $\sqrt{\epsilon_x}$ * cos(15.0 * π/16.0), R2 * $\sqrt{\epsilon_x}$ * sin(15.0 * π/16.0)] |
| 111111 | [R3 * $\sqrt{\epsilon_x}$ * cos(19.0 * π/20.0), R3 * $\sqrt{\epsilon_x}$ * sin(19.0 * π/20.0)] | where $\epsilon_x$ represents average energy per symbol, $8*R1^2 + 16*R2^2 + 20*R3^2 + 20*R4^2 = 64$, and R1 represents the radius of the inner ring, R2 represents the radius of the first middle ring, R3 represents the radius of the second middle ring and R4 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

33. A method, comprising:
demodulating a signal, through a demodulation device, wherein the signal was modulated based at least in part on an 64-ary, 8+16+20+20APSK signal constellation, having an inner ring with 8 bit positions, a first middle ring with 16 bit positions, a second middle ring with 20 bit positions and an outer ring with 20 bit positions.

34. The method according to claim 33, wherein the bit positions of the inner, first middle, second middle and outer rings are in accordance with the following bit labeling and [x, y] bit coordinate positions:

| Bit Label | [x, y] Coordinates |
|---|---|
| 000000 | [R2 * $\sqrt{\epsilon_x}$ * cos(25.0 * π/16.0), R2 * $\sqrt{\epsilon_x}$ * sin(25.0 * π/16.0)] |
| 000001 | [R4 * $\sqrt{\epsilon_x}$ * cos(35.0 * π/20.0), R4 * $\sqrt{\epsilon_x}$ * sin(35.0 * π/20.0)] |
| 000010 | [R2 * $\sqrt{\epsilon_x}$ * cos(27.0 * π/16.0), R2 * $\sqrt{\epsilon_x}$ * sin(27.0 * π/16.0)] |
| 000011 | [R3 * $\sqrt{\epsilon_x}$ * cos(35.0 * π/20.0), R3 * $\sqrt{\epsilon_x}$ * sin(35.0 * π/20.0)] |
| 000100 | [R4 * $\sqrt{\epsilon_x}$ * cos(31.0 * π/20.0), R4 * $\sqrt{\epsilon_x}$ * sin(31.0 * π/20.0)] |
| 000101 | [R4 * $\sqrt{\epsilon_x}$ * cos(33.0 * π/20.0), R4 * $\sqrt{\epsilon_x}$ * sin(33.0 * π/20.0)] |
| 000110 | [R3 * $\sqrt{\epsilon_x}$ * cos(31.0 * π/20.0), R3 * $\sqrt{\epsilon_x}$ * sin(31.0 * π/20.0)] |
| 000111 | [R3 * $\sqrt{\epsilon_x}$ * cos(33.0 * π/20.0), R3 * $\sqrt{\epsilon_x}$ * sin(33.0 * π/20.0)] |
| 001000 | [R2 * $\sqrt{\epsilon_x}$ * cos(23.0 * π/16.0), R2 * $\sqrt{\epsilon_x}$ * sin(23.0 * π/16.0)] |
| 001001 | [R4 * $\sqrt{\epsilon_x}$ * cos(25.0 * π/20.0), R4 * $\sqrt{\epsilon_x}$ * sin(25.0 * π/20.0)] |
| 001010 | [R2 * $\sqrt{\epsilon_x}$ * cos(21.0 * π/16.0), R2 * $\sqrt{\epsilon_x}$ * sin(21.0 * π/16.0)] |
| 001011 | [R3 * $\sqrt{\epsilon_x}$ * cos(25.0 * π/20.0), R3 * $\sqrt{\epsilon_x}$ * sin(25.0 * π/20.0)] |
| 001100 | [R4 * $\sqrt{\epsilon_x}$ * cos(29.0 * π/20.0), R4 * $\sqrt{\epsilon_x}$ * sin(29.0 * π/20.0)] |
| 001101 | [R4 * $\sqrt{\epsilon_x}$ * cos(27.0 * π/20.0), R4 * $\sqrt{\epsilon_x}$ * sin(27.0 * π/20.0)] |
| 001110 | [R3 * $\sqrt{\epsilon_x}$ * cos(29.0 * π/20.0), R3 * $\sqrt{\epsilon_x}$ * sin(29.0 * π/20.0)] |
| 001111 | [R3 * $\sqrt{\epsilon_x}$ * cos(27.0 * π/20.0), R3 * $\sqrt{\epsilon_x}$ * sin(27.0 * π/20.0)] |
| 010000 | [R1 * $\sqrt{\epsilon_x}$ * cos(13.0 * π/8.0), R1 * $\sqrt{\epsilon_x}$ * sin(13.0 * π/8.0)] |
| 010001 | [R4 * $\sqrt{\epsilon_x}$ * cos(37.0 * π/20.0), R4 * $\sqrt{\epsilon_x}$ * sin(37.0 * π/20.0)] |
| 010010 | [R2 * $\sqrt{\epsilon_x}$ * cos(29.0 * π/16.0), R2 * $\sqrt{\epsilon_x}$ * sin(29.0 * π/16.0)] |
| 010011 | [R3 * $\sqrt{\epsilon_x}$ * cos(37.0 * π/20.0), R3 * $\sqrt{\epsilon_x}$ * sin(37.0 * π/20.0)] |
| 010100 | [R1 * $\sqrt{\epsilon_x}$ * cos(15.0 * π/8.0), R1 * $\sqrt{\epsilon_x}$ * sin(15.0 * π/8.0)] |
| 010101 | [R4 * $\sqrt{\epsilon_x}$ * cos(39.0 * π/20.0), R4 * $\sqrt{\epsilon_x}$ * sin(39.0 * π/20.0)] |
| 010110 | [R2 * $\sqrt{\epsilon_x}$ * cos(31.0 * π/16.0), R2 * $\sqrt{\epsilon_x}$ * sin(31.0 * π/16.0)] |
| 010111 | [R3 * $\sqrt{\epsilon_x}$ * cos(39.0 * π/20.0), R3 * $\sqrt{\epsilon_x}$ * sin(39.0 * π/20.0)] |
| 011000 | [R1 * $\sqrt{\epsilon_x}$ * cos(11.0 * π/8.0), R1 * $\sqrt{\epsilon_x}$ * sin(11.0 * π/8.0)] |
| 011001 | [R4 * $\sqrt{\epsilon_x}$ * cos(23.0 * π/20.0), R4 * $\sqrt{\epsilon_x}$ * sin(23.0 * π/20.0)] |
| 011010 | [R2 * $\sqrt{\epsilon_x}$ * cos(19.0 * π/16.0), R2 * $\sqrt{\epsilon_x}$ * sin(19.0 * π/16.0)] |
| 011011 | [R3 * $\sqrt{\epsilon_x}$ * cos(23.0 * π/20.0), R3 * $\sqrt{\epsilon_x}$ * sin(23.0 * π/20.0)] |
| 011100 | [R1 * $\sqrt{\epsilon_x}$ * cos(9.0 * π/8.0), R1 * $\sqrt{\epsilon_x}$ * sin(9.0 * π/8.0)] |
| 011101 | [R4 * $\sqrt{\epsilon_x}$ * cos(21.0 * π/20.0), R4 * $\sqrt{\epsilon_x}$ * sin(21.0 * π/20.0)] |
| 011110 | [R2 * $\sqrt{\epsilon_x}$ * cos(17.0 * π/16.0), R2 * $\sqrt{\epsilon_x}$ * sin(17.0 * π/16.0)] |
| 011111 | [R3 * $\sqrt{\epsilon_x}$ * cos(21.0 * π/20.0), R3 * $\sqrt{\epsilon_x}$ * sin(21.0 * π/20.0)] |
| 100000 | [R2 * $\sqrt{\epsilon_x}$ * cos(7.0 * π/16.0), R2 * $\sqrt{\epsilon_x}$ * sin(7.0 * π/16.0)] |
| 100001 | [R4 * $\sqrt{\epsilon_x}$ * cos(5.0 * π/20.0), R4 * $\sqrt{\epsilon_x}$ * sin(5.0 * π/20.0)] |
| 100010 | [R2 * $\sqrt{\epsilon_x}$ * cos(5.0 * π/16.0), R2 * $\sqrt{\epsilon_x}$ * sin(5.0 * π/16.0)] |
| 100011 | [R3 * $\sqrt{\epsilon_x}$ * cos(5.0 * π/20.0), R3 * $\sqrt{\epsilon_x}$ * sin(5.0 * π/20.0)] |
| 100100 | [R4 * $\sqrt{\epsilon_x}$ * cos(9.0 * π/20.0), R4 * $\sqrt{\epsilon_x}$ * sin(9.0 * π/20.0)] |
| 100101 | [R4 * $\sqrt{\epsilon_x}$ * cos(7.0 * π/20.0), R4 * $\sqrt{\epsilon_x}$ * sin(7.0 * π/20.0)] |
| 100110 | [R3 * $\sqrt{\epsilon_x}$ * cos(9.0 * π/20.0), R3 * $\sqrt{\epsilon_x}$ * sin(9.0 * π/20.0)] |
| 100111 | [R3 * $\sqrt{\epsilon_x}$ * cos(7.0 * π/20.0), R3 * $\sqrt{\epsilon_x}$ * sin(7.0 * π/20.0)] |
| 101000 | [R2 * $\sqrt{\epsilon_x}$ * cos(9.0 * π/16.0), R2 * $\sqrt{\epsilon_x}$ * sin(9.0 * π/16.0)] |
| 101001 | [R4 * $\sqrt{\epsilon_x}$ * cos(15.0 * π/20.0), R4 * $\sqrt{\epsilon_x}$ * sin(15.0 * π/20.0)] |
| 101010 | [R2 * $\sqrt{\epsilon_x}$ * cos(11.0 * π/16.0), R2 * $\sqrt{\epsilon_x}$ * sin(11.0 * π/16.0)] |
| 101011 | [R3 * $\sqrt{\epsilon_x}$ * cos(15.0 * π/20.0), R3 * $\sqrt{\epsilon_x}$ * sin(15.0 * π/20.0)] |
| 101100 | [R4 * $\sqrt{\epsilon_x}$ * cos(11.0 * π/20.0), R4 * $\sqrt{\epsilon_x}$ * sin(11.0 * π/20.0)] |
| 101101 | [R4 * $\sqrt{\epsilon_x}$ * cos(13.0 * π/20.0), R4 * $\sqrt{\epsilon_x}$ * sin(13.0 * π/20.0)] |
| 101110 | [R3 * $\sqrt{\epsilon_x}$ * cos(11.0 * π/20.0), R3 * $\sqrt{\epsilon_x}$ * sin(11.0 * π/20.0)] |
| 101111 | [R3 * $\sqrt{\epsilon_x}$ * cos(13.0 * π/20.0), R3 * $\sqrt{\epsilon_x}$ * sin(13.0 * π/20.0)] |
| 110000 | [R1 * $\sqrt{\epsilon_x}$ * cos(3.0 * π/8.0), R1 * $\sqrt{\epsilon_x}$ * sin(3.0 * π/8.0)] |
| 110001 | [R4 * $\sqrt{\epsilon_x}$ * cos(3.0 * π/20.0), R4 * $\sqrt{\epsilon_x}$ * sin(3.0 * π/20.0)] |
| 110010 | [R2 * $\sqrt{\epsilon_x}$ * cos(3.0 * π/16.0), R2 * $\sqrt{\epsilon_x}$ * sin(3.0 * π/16.0)] |
| 110011 | [R3 * $\sqrt{\epsilon_x}$ * cos(3.0 * π/20.0), R3 * $\sqrt{\epsilon_x}$ * sin(3.0 * π/20.0)] |

-continued

| Bit Label | [x, y] Coordinates |
|---|---|
| 110100 | [R1 * $\sqrt{\epsilon_x}$ * cos(π/8.0), R1 * $\sqrt{\epsilon_x}$ * sin(π/8.0)] |
| 110101 | [R4 * $\sqrt{\epsilon_x}$ * cos(π/20.0), R4 * $\sqrt{\epsilon_x}$ * sin(π/20.0)] |
| 110110 | [R2 * $\sqrt{\epsilon_x}$ * cos(π/16.0), R2 * $\sqrt{\epsilon_x}$ * sin(π/16.0)] |
| 110111 | [R3 * $\sqrt{\epsilon_x}$ * cos(π/20.0), R3 * $\sqrt{\epsilon_x}$ * sin(π/20.0)] |
| 111000 | [R1 * $\sqrt{\epsilon_x}$ * cos(5.0 * π/8.0), R1 * $\sqrt{\epsilon_x}$ * sin(5.0 * π/8.0)] |
| 111001 | [R4 * $\sqrt{\epsilon_x}$ * cos(17.0 * π/20.0), R4 * $\sqrt{\epsilon_x}$ * sin(17.0 * π/20.0)] |
| 111010 | [R2 * $\sqrt{\epsilon_x}$ * cos(13.0 * π/16.0), R2 * $\sqrt{\epsilon_x}$ * sin(13.0 * π/16.0)] |
| 111011 | [R3 * $\sqrt{\epsilon_x}$ * cos(17.0 * π/20.0), R3 * $\sqrt{\epsilon_x}$ * sin(17.0 * π/20.0)] |
| 111100 | [R1 * $\sqrt{\epsilon_x}$ * cos(7.0 * π/8.0), R1 * $\sqrt{\epsilon_x}$ * sin(7.0 * π/8.0)] |
| 111101 | [R4 * $\sqrt{\epsilon_x}$ * cos(19.0 * π/20.0), R4 * $\sqrt{\epsilon_x}$ * sin(19.0 * π/20.0)] |
| 111110 | [R2 * $\sqrt{\epsilon_x}$ * cos(15.0 * π/16.0), R2 * $\sqrt{\epsilon_x}$ * sin(15.0 * π/16.0)] |
| 111111 | [R3 * $\sqrt{\epsilon_x}$ * cos(19.0 * π/20.0), R3 * $\sqrt{\epsilon_x}$ * sin(19.0 * π/20.0)] | where $\epsilon_x$ represents average energy per symbol, $8*R1^2+16*R2^2+20*R3^2+20*R4^2=64$, and R1 represents the radius of the inner ring, R2 represents the radius of the first middle ring, R3 represents the radius of the second middle ring and R4 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

35. An apparatus, comprising:

a demodulation device configured to demodulate a signal, wherein the signal was modulated based at least in part on an 64-ary, 8+16+20+20APSK signal constellation, having an inner ring with 8 bit positions, a first middle ring with 16 bit positions, a second middle ring with 20 bit positions and an outer ring with 20 bit positions.

36. The apparatus according to claim 35, wherein the bit positions of the inner, first middle, second middle and outer rings are in accordance with the following bit labeling and [x, y] bit coordinate positions:

| Bit Label | [x, y] Coordinates |
|---|---|
| 000000 | [R2 * $\sqrt{\epsilon_x}$ * cos(25.0 * π/16.0), R2 * $\sqrt{\epsilon_x}$ * sin(25.0 * π/16.0)] |
| 000001 | [R4 * $\sqrt{\epsilon_x}$ * cos(35.0 * π/20.0), R4 * $\sqrt{\epsilon_x}$ * sin(35.0 * π/20.0)] |
| 000010 | [R2 * $\sqrt{\epsilon_x}$ * cos(27.0 * π/16.0), R2 * $\sqrt{\epsilon_x}$ * sin(27.0 * π/16.0)] |
| 000011 | [R3 * $\sqrt{\epsilon_x}$ * cos(35.0 * π/20.0), R3 * $\sqrt{\epsilon_x}$ * sin(35.0 * π/20.0)] |
| 000100 | [R4 * $\sqrt{\epsilon_x}$ * cos(31.0 * π/20.0), R4 * $\sqrt{\epsilon_x}$ * sin(31.0 * π/20.0)] |
| 000101 | [R4 * $\sqrt{\epsilon_x}$ * cos(33.0 * π/20.0), R4 * $\sqrt{\epsilon_x}$ * sin(33.0 * π/20.0)] |
| 000110 | [R3 * $\sqrt{\epsilon_x}$ * cos(31.0 * π/20.0), R3 * $\sqrt{\epsilon_x}$ * sin(31.0 * π/20.0)] |
| 000111 | [R3 * $\sqrt{\epsilon_x}$ * cos(33.0 * π/20.0), R3 * $\sqrt{\epsilon_x}$ * sin(33.0 * π/20.0)] |
| 001000 | [R2 * $\sqrt{\epsilon_x}$ * cos(23.0 * π/16.0), R2 * $\sqrt{\epsilon_x}$ * sin(23.0 * π/16.0)] |
| 001001 | [R4 * $\sqrt{\epsilon_x}$ * cos(25.0 * π/20.0), R4 * $\sqrt{\epsilon_x}$ * sin(25.0 * π/20.0)] |
| 001010 | [R2 * $\sqrt{\epsilon_x}$ * cos(21.0 * π/16.0), R2 * $\sqrt{\epsilon_x}$ * sin(21.0 * π/16.0)] |
| 001011 | [R3 * $\sqrt{\epsilon_x}$ * cos(25.0 * π/20.0), R3 * $\sqrt{\epsilon_x}$ * sin(25.0 * π/20.0)] |
| 001100 | [R4 * $\sqrt{\epsilon_x}$ * cos(29.0 * π/20.0), R4 * $\sqrt{\epsilon_x}$ * sin(29.0 * π/20.0)] |
| 001101 | [R4 * $\sqrt{\epsilon_x}$ * cos(27.0 * π/20.0), R4 * $\sqrt{\epsilon_x}$ * sin(27.0 * π/20.0)] |
| 001110 | [R3 * $\sqrt{\epsilon_x}$ * cos(29.0 * π/20.0), R3 * $\sqrt{\epsilon_x}$ * sin(29.0 * π/20.0)] |
| 001111 | [R3 * $\sqrt{\epsilon_x}$ * cos(27.0 * π/20.0), R3 * $\sqrt{\epsilon_x}$ * sin(27.0 * π/20.0)] |
| 010000 | [R1 * $\sqrt{\epsilon_x}$ * cos(13.0 * π/8.0), R1 * $\sqrt{\epsilon_x}$ * sin(13.0 * π/8.0)] |
| 010001 | [R4 * $\sqrt{\epsilon_x}$ * cos(37.0 * π/20.0), R4 * $\sqrt{\epsilon_x}$ * sin(37.0 * π/20.0)] |
| 010010 | [R2 * $\sqrt{\epsilon_x}$ * cos(29.0 * π/16.0), R2 * $\sqrt{\epsilon_x}$ * sin(29.0 * π/16.0)] |
| 010011 | [R3 * $\sqrt{\epsilon_x}$ * cos(37.0 * π/20.0), R3 * $\sqrt{\epsilon_x}$ * sin(37.0 * π/20.0)] |
| 010100 | [R1 * $\sqrt{\epsilon_x}$ * cos(15.0 * π/8.0), R1 * $\sqrt{\epsilon_x}$ * sin(15.0 * π/8.0)] |
| 010101 | [R4 * $\sqrt{\epsilon_x}$ * cos(39.0 * π/20.0), R4 * $\sqrt{\epsilon_x}$ * sin(39.0 * π/20.0)] |
| 010110 | [R2 * $\sqrt{\epsilon_x}$ * cos(31.0 * π/16.0), R2 * $\sqrt{\epsilon_x}$ * sin(31.0 * π/16.0)] |
| 010111 | [R3 * $\sqrt{\epsilon_x}$ * cos(39.0 * π/20.0), R3 * $\sqrt{\epsilon_x}$ * sin(39.0 * π/20.0)] |
| 011000 | [R1 * $\sqrt{\epsilon_x}$ * cos(11.0 * π/8.0), R1 * $\sqrt{\epsilon_x}$ * sin(11.0 * π/8.0)] |
| 011001 | [R4 * $\sqrt{\epsilon_x}$ * cos(23.0 * π/20.0), R4 * $\sqrt{\epsilon_x}$ * sin(23.0 * π/20.0)] |
| 011010 | [R2 * $\sqrt{\epsilon_x}$ * cos(19.0 * π/16.0), R2 * $\sqrt{\epsilon_x}$ * sin(19.0 * π/16.0)] |
| 011011 | [R3 * $\sqrt{\epsilon_x}$ * cos(23.0 * π/20.0), R3 * $\sqrt{\epsilon_x}$ * sin(23.0 * π/20.0)] |
| 011100 | [R1 * $\sqrt{\epsilon_x}$ * cos(9.0 * π/8.0), R1 * $\sqrt{\epsilon_x}$ * sin(9.0 * π/8.0)] |
| 011101 | [R4 * $\sqrt{\epsilon_x}$ * cos(21.0 * π/20.0), R4 * $\sqrt{\epsilon_x}$ * sin(21.0 * π/20.0)] |
| 011110 | [R2 * $\sqrt{\epsilon_x}$ * cos(17.0 * π/16.0), R2 * $\sqrt{\epsilon_x}$ * sin(17.0 * π/16.0)] |
| 011111 | [R3 * $\sqrt{\epsilon_x}$ * cos(21.0 * π/20.0), R3 * $\sqrt{\epsilon_x}$ * sin(21.0 * π/20.0)] |
| 100000 | [R2 * $\sqrt{\epsilon_x}$ * cos(7.0 * π/16.0), R2 * $\sqrt{\epsilon_x}$ * sin(7.0 * π/16.0)] |
| 100001 | [R4 * $\sqrt{\epsilon_x}$ * cos(5.0 * π/20.0), R4 * $\sqrt{\epsilon_x}$ * sin(5.0 * π/20.0)] |
| 100010 | [R2 * $\sqrt{\epsilon_x}$ * cos(5.0 * π/16.0), R2 * $\sqrt{\epsilon_x}$ * sin(5.0 * π/16.0)] |
| 100011 | [R3 * $\sqrt{\epsilon_x}$ * cos(5.0 * π/20.0), R3 * $\sqrt{\epsilon_x}$ * sin(5.0 * π/20.0)] |
| 100100 | [R4 * $\sqrt{\epsilon_x}$ * cos(9.0 * π/20.0), R4 * $\sqrt{\epsilon_x}$ * sin(9.0 * π/20.0)] |
| 100101 | [R4 * $\sqrt{\epsilon_x}$ * cos(7.0 * π/20.0), R4 * $\sqrt{\epsilon_x}$ * sin(7.0 * π/20.0)] |
| 100110 | [R3 * $\sqrt{\epsilon_x}$ * cos(9.0 * π/20.0), R3 * $\sqrt{\epsilon_x}$ * sin(9.0 * π/20.0)] |
| 100111 | [R3 * $\sqrt{\epsilon_x}$ * cos(7.0 * π/20.0), R3 * $\sqrt{\epsilon_x}$ * sin(7.0 * π/20.0)] |
| 101000 | [R2 * $\sqrt{\epsilon_x}$ * cos(9.0 * π/16.0), R2 * $\sqrt{\epsilon_x}$ * sin(9.0 * π/16.0)] |
| 101001 | [R4 * $\sqrt{\epsilon_x}$ * cos(15.0 * π/20.0), R4 * $\sqrt{\epsilon_x}$ * sin(15.0 * π/20.0)] |
| 101010 | [R2 * $\sqrt{\epsilon_x}$ * cos(11.0 * π/16.0), R2 * $\sqrt{\epsilon_x}$ * sin(11.0 * π/16.0)] |
| 101011 | [R3 * $\sqrt{\epsilon_x}$ * cos(15.0 * π/20.0), R3 * $\sqrt{\epsilon_x}$ * sin(15.0 * π/20.0)] |
| 101100 | [R4 * $\sqrt{\epsilon_x}$ * cos(11.0 * π/20.0), R4 * $\sqrt{\epsilon_x}$ * sin(11.0 * π/20.0)] |
| 101101 | [R4 * $\sqrt{\epsilon_x}$ * cos(13.0 * π/20.0), R4 * $\sqrt{\epsilon_x}$ * sin(13.0 * π/20.0)] |
| 101110 | [R3 * $\sqrt{\epsilon_x}$ * cos(11.0 * π/20.0), R3 * $\sqrt{\epsilon_x}$ * sin(11.0 * π/20.0)] |
| 101111 | [R3 * $\sqrt{\epsilon_x}$ * cos(13.0 * π/20.0), R3 * $\sqrt{\epsilon_x}$ * sin(13.0 * π/20.0)] |
| 110000 | [R1 * $\sqrt{\epsilon_x}$ * cos(3.0 * π/8.0), R1 * $\sqrt{\epsilon_x}$ * sin(3.0 * π/8.0)] |
| 110001 | [R4 * $\sqrt{\epsilon_x}$ * cos(3.0 * π/20.0), R4 * $\sqrt{\epsilon_x}$ * sin(3.0 * π/20.0)] |
| 110010 | [R2 * $\sqrt{\epsilon_x}$ * cos(3.0 * π/16.0), R2 * $\sqrt{\epsilon_x}$ * sin(3.0 * π/16.0)] |
| 110011 | [R3 * $\sqrt{\epsilon_x}$ * cos(3.0 * π/20.0), R3 * $\sqrt{\epsilon_x}$ * sin(3.0 * π/20.0)] |
| 110100 | [R1 * $\sqrt{\epsilon_x}$ * cos(π/8.0), R1 * $\sqrt{\epsilon_x}$ * sin(π/8.0)] |
| 110101 | [R4 * $\sqrt{\epsilon_x}$ * cos(π/20.0), R4 * $\sqrt{\epsilon_x}$ * sin(π/20.0)] |
| 110110 | [R2 * $\sqrt{\epsilon_x}$ * cos(π/16.0), R2 * $\sqrt{\epsilon_x}$ * sin(π/16.0)] |
| 110111 | [R3 * $\sqrt{\epsilon_x}$ * cos(π/20.0), R3 * $\sqrt{\epsilon_x}$ * sin(π/20.0)] |
| 111000 | [R1 * $\sqrt{\epsilon_x}$ * cos(5.0 * π/8.0), R1 * $\sqrt{\epsilon_x}$ * sin(5.0 * π/8.0)] |
| 111001 | [R4 * $\sqrt{\epsilon_x}$ * cos(17.0 * π/20.0), R4 * $\sqrt{\epsilon_x}$ * sin(17.0 * π/20.0)] |
| 111010 | [R2 * $\sqrt{\epsilon_x}$ * cos(13.0 * π/16.0), R2 * $\sqrt{\epsilon_x}$ * sin(13.0 * π/16.0)] |
| 111011 | [R3 * $\sqrt{\epsilon_x}$ * cos(17.0 * π/20.0), R3 * $\sqrt{\epsilon_x}$ * sin(17.0 * π/20.0)] |
| 111100 | [R1 * $\sqrt{\epsilon_x}$ * cos(7.0 * π/8.0), R1 * $\sqrt{\epsilon_x}$ * sin(7.0 * π/8.0)] |
| 111101 | [R4 * $\sqrt{\epsilon_x}$ * cos(19.0 * π/20.0), R4 * $\sqrt{\epsilon_x}$ * sin(19.0 * π/20.0)] |
| 111110 | [R2 * $\sqrt{\epsilon_x}$ * cos(15.0 * π/16.0), R2 * $\sqrt{\epsilon_x}$ * sin(15.0 * π/16.0)] |
| 111111 | [R3 * $\sqrt{\epsilon_x}$ * cos(19.0 * π/20.0), R3 * $\sqrt{\epsilon_x}$ * sin(19.0 * π/20.0)] | where $\epsilon_x$ represents average energy per symbol, $8*R1^2+16*R2^2+20*R3^2+20*R4^2=64$, and R1 represents the radius of the inner ring, R2 represents the radius of the first middle ring, R3 represents the radius of the second middle ring and R4 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

37. A method, comprising:

modulating a signal, through a modulation device, based at least in part on an 64-ary, 12+16+16+20APSK signal constellation, having an inner ring with 12 bit positions, a first middle ring with 16 bit positions, a second middle ring with 16 bit positions and an outer ring with 20 bit positions.

38. An apparatus, comprising:

a modulation device configured to modulate a signal based at least in part on an 64-ary, 12+16+16+20APSK signal constellation, having an inner ring with 12 bit positions, a first middle ring with 16 bit positions, a second middle ring with 16 bit positions and an outer ring with 20 bit positions.

39. A method, comprising:

demodulating a signal, through a demodulation device, wherein the signal was modulated based at least in part on an 64-ary, 12+16+16+20APSK signal constellation, having an inner ring with 12 bit positions, a first middle ring with 16 bit positions, a second middle ring with 16 bit positions and an outer ring with 20 bit positions.

40. An apparatus, comprising:
a demodulation device configured to demodulate a signal, wherein the signal was modulated based at least in part on an 64-ary, 12+16+16+20APSK signal constellation, having an inner ring with 12 bit positions, a first middle ring with 16 bit positions, a second middle ring with 16 bit positions and an outer ring with 20 bit positions.

41. A method, comprising:
modulating a signal, through a modulation device, based at least in part on a signal constellation having bit labeling and [x, y] bit coordinate positions in accordance with a one of the following tables:

TABLE 1

| Bit Label | [x, y] Coordinates |
|---|---|
| 000 | [0.0, 0.0] |
| 001 | [$\sqrt{8.0 * \epsilon_x/7.0}$, 0.0] |
| 010 | [$\sqrt{8.0 * \epsilon_x/7.0} * \cos(4.0 * \pi/7.0)$, $\sqrt{8.0 * \epsilon_x/7.0} * \sin(4.0 * \pi/7.0)$] |
| 011 | [$\sqrt{8.0 * \epsilon_x/7.0} * \cos(2.0 * \pi/7.0)$, $\sqrt{8.0 * \epsilon_x/7.0} * \sin(2.0 * \pi/7.0)$] |
| 100 | [$\sqrt{8.0 * \epsilon_x/7.0} * \cos(12.0 * \pi/7.0)$, $\sqrt{8.0 * \epsilon_x/7.0} * \sin(12.0 * \pi/7.0)$] |
| 101 | [$\sqrt{8.0 * \epsilon_x/7.0} * \cos(10.0 * \pi/7.0)$, $\sqrt{8.0 * \epsilon_x/7.0} * \sin(10.0 * \pi/7.0)$] |
| 110 | [$\sqrt{8.0 * \epsilon_x/7.0} * \cos(6.0 * \pi/7.0)$, $\sqrt{8.0 * \epsilon_x/7.0} * \sin(6.0 * \pi/7.0)$] |
| 111 | [$\sqrt{8.0 * \epsilon_x/7.0} * \cos(8.0 * \pi/7.0)$, $\sqrt{8.0 * \epsilon_x/7.0} * \sin(8.0 * \pi/7.0)$] | where $\epsilon_x$ represents average energy per symbol;

TABLE 2

| Bit Label | [x, y] Coordinates |
|---|---|
| 0000 | [R1 * $\sqrt{\epsilon_x}$, 0.0] |
| 0001 | [R1 * $\sqrt{\epsilon_x}$ * cos (5.0 * π/3.0), R1 * $\sqrt{\epsilon_x}$ * sin (5.0 * π/3.0)] |
| 0010 | [R1 * $\sqrt{\epsilon_x}$ * cos (π/3.0), R1 * $\sqrt{\epsilon_x}$ * sin (π/3.0)] |
| 0011 | [R2 * $\sqrt{\epsilon_x}$ * cos (13.0 * π/30.0), R2 * $\sqrt{\epsilon_x}$ * sin (13.0 * π/30.0)] |
| 0100 | [R2 * $\sqrt{\epsilon_x}$ * cos (55.0 * π/30.0), R2 * $\sqrt{\epsilon_x}$ * sin (55.0 * π/30.0)] |
| 0101 | [R2 * $\sqrt{\epsilon_x}$ * cos (49.0 * π/30.0), R2 * $\sqrt{\epsilon_x}$ * sin (49.0 * π/30.0)] |
| 0110 | [R2 * $\sqrt{\epsilon_x}$ * cos (π/30.0), R2 * $\sqrt{\epsilon_x}$ * sin (π/30.0)] |
| 0111 | [R2 * $\sqrt{\epsilon_x}$ * cos (7.0 * π/30.0), R2 * $\sqrt{\epsilon_x}$ * sin (7.0 * π/30.0)] |
| 1000 | [−R1 * $\sqrt{\epsilon_x}$, 0.0] |
| 1001 | [R1 * $\sqrt{\epsilon_x}$ * cos (4.0 * π/3.0), R1 * $\sqrt{\epsilon_x}$ * sin (4.0 * π/3.0)] |
| 1010 | [R1 * $\sqrt{\epsilon_x}$ * cos (2.0 * π/3.0), R1 * $\sqrt{\epsilon_x}$ * sin (2.0 * π/3.0)] |
| 1011 | [R2 * $\sqrt{\epsilon_x}$ * cos (19.0 * π/30.0), R2 * $\sqrt{\epsilon_x}$ * sin (19.0 * π/30.0)] |
| 1100 | [R2 * $\sqrt{\epsilon_x}$ * cos (37.0 * π/30.0), R2 * $\sqrt{\epsilon_x}$ * sin (37.0 * π/30.0)] |
| 1101 | [R2 * $\sqrt{\epsilon_x}$ * cos (43.0 * π/30.0), R2 * $\sqrt{\epsilon_x}$ * sin (43.0 * π/30.0)] |
| 1110 | [R2 * $\sqrt{\epsilon_x}$ * cos (31.0 * π/30.0), R2 * $\sqrt{\epsilon_x}$ * sin (31.0 * π/30.0)] |
| 1111 | [R2 * $\sqrt{\epsilon_x}$ * cos (25.0 * π/30.0), R2 * $\sqrt{\epsilon_x}$ * sin (25.0 * π/30.0)] | where $\epsilon_x$ represents average energy per symbol, $6*R1^2 + 10*R2^2 = 16$, and R1 represents the radius of an inner ring of the constellation and R2 represents the radius of an outer ring of the constellation;

TABLE 3

| Bit Label | [x, y] Coordinates |
|---|---|
| 00000 | [R1 * $\sqrt{\epsilon_x}$ * cos(π/16.0), R1 * $\sqrt{\epsilon_x}$ * sin(π/16.0)] |
| 00001 | [R1 * $\sqrt{\epsilon_x}$ * cos(3.0 * π/16.0), R1 * $\sqrt{\epsilon_x}$ * sin(3.0 * π/16.0)] |
| 00010 | [R1 * $\sqrt{\epsilon_x}$ * sin(π/16.0), R1 * $\sqrt{\epsilon_x}$ * cos(π/16.0)] |
| 00011 | [R1 * $\sqrt{\epsilon_x}$ * sin(3.0 * π/16.0), R1 * $\sqrt{\epsilon_x}$ * cos(3.0 * π/16.0)] |
| 00100 | [R1 * $\sqrt{\epsilon_x}$ * cos(π/16.0), −R1 * $\sqrt{\epsilon_x}$ * sin(π/16.0)] |
| 00101 | [R1 * $\sqrt{\epsilon_x}$ * cos(3.0 * π/16.0), −R1 * $\sqrt{\epsilon_x}$ * sin(3.0 * π/16.0)] |
| 00110 | [R1 * $\sqrt{\epsilon_x}$ * sin(π/16.0), −R1 * $\sqrt{\epsilon_x}$ * cos(π/16.0)] |
| 00111 | [R1 * $\sqrt{\epsilon_x}$ * sin(3.0 * π/16.0), −R1 * $\sqrt{\epsilon_x}$ * cos(3.0 * π/16.0)] |
| 01000 | [−R1 * $\sqrt{\epsilon_x}$ * cos(π/16.0), R1 * $\sqrt{\epsilon_x}$ * sin(π/16.0)] |

TABLE 3-continued

| Bit Label | [x, y] Coordinates |
|---|---|
| 01001 | [−R1 * $\sqrt{\epsilon_x}$ * cos(3.0 * π/16.0), R1 * $\sqrt{\epsilon_x}$ * sin(3.0 * π/16.0)] |
| 01010 | [−R1 * $\sqrt{\epsilon_x}$ * sin(π/16.0), R1 * $\sqrt{\epsilon_x}$ * cos(π/16.0)] |
| 01011 | [−R1 * $\sqrt{\epsilon_x}$ * sin(3.0 * π/16.0), R1 * $\sqrt{\epsilon_x}$ * cos(3.0 * π/16.0)] |
| 01100 | [−R1 * $\sqrt{\epsilon_x}$ * cos(π/16.0), −R1 * $\sqrt{\epsilon_x}$ * sin(π/16.0)] |
| 01101 | [−R1 * $\sqrt{\epsilon_x}$ * cos(3.0 * π/16.0), −R1 * $\sqrt{\epsilon_x}$ * sin(3.0 * π/16.0)] |
| 01110 | [−R1 * $\sqrt{\epsilon_x}$ * sin(π/16.0), −R1 * $\sqrt{\epsilon_x}$ * cos(π/16.0)] |
| 01111 | [−R1 * $\sqrt{\epsilon_x}$ * sin(3.0 * π/16.0), −R1 * $\sqrt{\epsilon_x}$ * cos(3.0 * π/16.0)] |
| 10000 | [R2 * $\sqrt{\epsilon_x}$ * cos(π/16.0), R2 * $\sqrt{\epsilon_x}$ * sin(π/16.0)] |
| 10001 | [R2 * $\sqrt{\epsilon_x}$ * cos(3.0 * π/16.0), R2 * $\sqrt{\epsilon_x}$ * sin(3.0 * π/16.0)] |
| 10010 | [R2 * $\sqrt{\epsilon_x}$ * sin(π/16.0), R2 * $\sqrt{\epsilon_x}$ * cos(π/16.0)] |
| 10011 | [R2 * $\sqrt{\epsilon_x}$ * sin(3.0 * π/16.0), R2 * $\sqrt{\epsilon_x}$ * cos(3.0 * π/16.0)] |
| 10100 | [R2 * $\sqrt{\epsilon_x}$ * cos(π/16.0), −R2 * $\sqrt{\epsilon_x}$ * sin(π/16.0)] |
| 10101 | [R2 * $\sqrt{\epsilon_x}$ * cos(3.0 * π/16.0), −R2 * $\sqrt{\epsilon_x}$ * sin(3.0 * π/16.0)] |
| 10110 | [R2 * $\sqrt{\epsilon_x}$ * sin(π/16.0), −R2 * $\sqrt{\epsilon_x}$ * cos(π/16.0)] |
| 10111 | [R2 * $\sqrt{\epsilon_x}$ * sin(3.0 * π/16.0), −R2 * $\sqrt{\epsilon_x}$ * cos(3.0 * π/16.0)] |
| 11000 | [−R2 * $\sqrt{\epsilon_x}$ * cos(π/16.0), R2 * $\sqrt{\epsilon_x}$ * sin(π/16.0)] |
| 11001 | [−R2 * $\sqrt{\epsilon_x}$ * cos(3.0 * π/16.0), R2 * $\sqrt{\epsilon_x}$ * sin(3.0 * π/16.0)] |
| 11010 | [−R2 * $\sqrt{\epsilon_x}$ * sin(π/16.0), R2 * $\sqrt{\epsilon_x}$ * cos(π/16.0)] |
| 11011 | [−R2 * $\sqrt{\epsilon_x}$ * sin(3.0 * π/16.0), R2 * $\sqrt{\epsilon_x}$ * cos(3.0 * π/16.0)] |
| 11100 | [−R2 * $\sqrt{\epsilon_x}$ * cos(π/16.0), −R2 * $\sqrt{\epsilon_x}$ * sin(π/16.0)] |
| 11101 | [−R2 * $\sqrt{\epsilon_x}$ * cos(3.0 * π/16.0), −R2 * $\sqrt{\epsilon_x}$ * sin(3.0 * π/16.0)] |
| 11110 | [−R2 * $\sqrt{\epsilon_x}$ * sin(π/16.0), −R2 * $\sqrt{\epsilon_x}$ * cos(π/16.0)] |
| 11111 | [−R2 * $\sqrt{\epsilon_x}$ * sin(3.0 * π/16.0), −R2 * $\sqrt{\epsilon_x}$ * cos(3.0 * π/16.0)] | where $\epsilon_x$ represents average energy per symbol, $R1^2 + R2^2 = 2$, and R1 represents the radius of an inner ring of the constellation and R2 represents the radius of an outer ring of the constellation;

TABLE 4

| Bit Label | [x, y] Coordinates |
|---|---|
| 00000 | [−R3 * $\sqrt{\epsilon_x}$ * cos(5.0 * π/16.0), R3 * $\sqrt{\epsilon_x}$ * cos(3.0 * π/16.0)] |
| 00001 | [−R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(3.0 * π/16.0), R3 * $\sqrt{\epsilon_x}$ * cos(5.0 * π/16.0)] |
| 01001 | [−R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * cos(5.0 * π/16.0), −R3 * $\sqrt{\epsilon_x}$ * cos(3.0 * π/16.0)] |
| 10001 | [−R3 * $\sqrt{\epsilon_x}$ * cos(7.0 * π/16.0), −R3 * $\sqrt{\epsilon_x}$ * cos(π/16.0)] |
| 10010 | [R3 * $\sqrt{\epsilon_x}$ * cos(5.0 * π/16.0), −R3 * $\sqrt{\epsilon_x}$ * cos(3.0 * π/16.0)] |
| 10011 | [R3 * $\sqrt{\epsilon_x}$ * cos(7.0 * π/16.0), −R3 * $\sqrt{\epsilon_x}$ * cos(π/16.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * cos(3.0 * π/16.0), −R3 * $\sqrt{\epsilon_x}$ * cos(5.0 * π/16.0)] |
| 11001 | [−R3 * $\sqrt{\epsilon_x}$ * cos(π/16.0), −R3 * $\sqrt{\epsilon_x}$ * cos(7.0 * π/16.0)] |
| 11010 | [R3 * $\sqrt{\epsilon_x}$ * cos(3.0 * π/16.0), R3 * $\sqrt{\epsilon_x}$ * cos(5.0 * π/16.0)] |
| 11011 | [R3 * $\sqrt{\epsilon_x}$ * cos(π/16.0), −R3 * $\sqrt{\epsilon_x}$ * cos(7.0 * π/16.0)] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2 + 12*R2^2 + 16*R3^2 = 32$, and R1 represents the radius of an inner ring of the constellation, R2 represents the radius of a middle ring of the constellation and R3 represents the radius of an outer ring of the constellation;

TABLE 5

| Bit Label | [x, y] Coordinates |
|---|---|
| 00000 | [−R3 * $\sqrt{\epsilon_x}$ * sin(π/4.0), R3 * $\sqrt{\epsilon_x}$ * sin(π/4.0)] |
| 00001 | [−R3 * $\sqrt{\epsilon_x}$ * sin(π/8.0), R3 * $\sqrt{\epsilon_x}$ * cos(π/8.0)] |
| 00010 | [R3 * $\sqrt{\epsilon_x}$ * sin(π/8.0), R3 * $\sqrt{\epsilon_x}$ * cos(π/8.0)] |
| 00011 | [0, R3 * $\sqrt{\epsilon_x}$] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(π/8.0), R3 * $\sqrt{\epsilon_x}$ * sin(π/8.0)] |
| 01001 | [−R3 * $\sqrt{\epsilon_x}$, 0] |
| 01010 | [R3 * $\sqrt{\epsilon_x}$ * sin(π/4.0), R3 * $\sqrt{\epsilon_x}$ * sin(π/4.0)] |
| 01011 | [R3 * $\sqrt{\epsilon_x}$ * cos(π/8.0), R3 $\sqrt{\epsilon_x}$ * sin(π/8.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * sin(π/8.0), −R3 * $\sqrt{\epsilon_x}$ * cos(π/8.0)] |
| 10001 | [0, −R3 * $\sqrt{\epsilon_x}$] |
| 10010 | [R3 * $\sqrt{\epsilon_x}$ * sin(π/4.0), −R3 * $\sqrt{\epsilon_x}$ * sin(π/4.0)] |
| 10011 | [R3 * $\sqrt{\epsilon_x}$ * sin(π/8.0), −R3 * $\sqrt{\epsilon_x}$ * cos(π/8.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * sin(π/4.0), −R3 * $\sqrt{\epsilon_x}$ * sin(π/4.0)] |
| 11001 | [−R3 * $\sqrt{\epsilon_x}$ * cos(π/8.0), −R3 * $\sqrt{\epsilon_x}$ * sin(π/8.0)] |
| 11010 | [R3 * $\sqrt{\epsilon_x}$ * cos(π/8.0), −R3 * $\sqrt{\epsilon_x}$ * sin(π/8.0)] |
| 11011 | [R3 * $\sqrt{\epsilon_x}$, 0] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2 + 12*R2^2 + 16*R3^2 = 32$, and R1 represents the radius of an inner ring of the constellation, R2 represents the radius of a middle ring of the constellation and R3 represents the radius of an outer ring of the constellation; and

TABLE 6

| Bit Label | [x, y] Coordinates |
|---|---|
| 000000 | [R2 * $\sqrt{\epsilon_x}$ * cos(25.0 * π/16.0), R2 * $\sqrt{\epsilon_x}$ * sin(25.0 * π/16.0)] |
| 000001 | [R4 * $\sqrt{\epsilon_x}$ * cos(35.0 * π/20.0), R4 * $\sqrt{\epsilon_x}$ * sin(35.0 * π/20.0)] |
| 000010 | [R2 * $\sqrt{\epsilon_x}$ * cos(27.0 * π/16.0), R2 * $\sqrt{\epsilon_x}$ * sin(27.0 * π/16.0)] |
| 000011 | [R3 * $\sqrt{\epsilon_x}$ * cos(35.0 * π/20.0), R3 * $\sqrt{\epsilon_x}$ * sin(35.0 * π/20.0)] |
| 000100 | [R4 * $\sqrt{\epsilon_x}$ * cos(31.0 * π/20.0), R4 * $\sqrt{\epsilon_x}$ * sin(31.0 * π/20.0)] |
| 000101 | [R4 * $\sqrt{\epsilon_x}$ * cos(33.0 * π/20.0), R4 * $\sqrt{\epsilon_x}$ * sin(33.0 * π/20.0)] |
| 000110 | [R3 * $\sqrt{\epsilon_x}$ * cos(31.0 * π/20.0), R3 * $\sqrt{\epsilon_x}$ * sin(31.0 * π/20.0)] |
| 000111 | [R3 * $\sqrt{\epsilon_x}$ * cos(33.0 * π/20.0), R3 * $\sqrt{\epsilon_x}$ * sin(33.0 * π/20.0)] |
| 001000 | [R2 * $\sqrt{\epsilon_x}$ * cos(23.0 * π/16.0), R2 * $\sqrt{\epsilon_x}$ * sin(23.0 * π/16.0)] |
| 001001 | [R4 * $\sqrt{\epsilon_x}$ * cos(25.0 * π/20.0), R4 * $\sqrt{\epsilon_x}$ * sin(25.0 * π/20.0)] |
| 001010 | [R2 * $\sqrt{\epsilon_x}$ * cos(21.0 * π/16.0), R2 * $\sqrt{\epsilon_x}$ * sin(21.0 * π/16.0)] |
| 001011 | [R3 * $\sqrt{\epsilon_x}$ * cos(25.0 * π/20.0), R3 * $\sqrt{\epsilon_x}$ * sin(25.0 * π/20.0)] |
| 001100 | [R4 * $\sqrt{\epsilon_x}$ * cos(29.0 * π/20.0), R4 * $\sqrt{\epsilon_x}$ * sin(29.0 * π/20.0)] |
| 001101 | [R4 * $\sqrt{\epsilon_x}$ * cos(27.0 * π/20.0), R4 * $\sqrt{\epsilon_x}$ * sin(27.0 * π/20.0)] |
| 001110 | [R3 * $\sqrt{\epsilon_x}$ * cos(29.0 * π/20.0), R3 * $\sqrt{\epsilon_x}$ * sin(29.0 * π/20.0)] |
| 001111 | [R3 * $\sqrt{\epsilon_x}$ * cos(27.0 * π/20.0), R3 * $\sqrt{\epsilon_x}$ * sin(27.0 * π/20.0)] |
| 010000 | [R1 * $\sqrt{\epsilon_x}$ * cos(13.0 * π/8.0), R1 * $\sqrt{\epsilon_x}$ * sin(13.0 * π/8.0)] |
| 010001 | [R4 * $\sqrt{\epsilon_x}$ * cos(37.0 * π/20.0), R4 * $\sqrt{\epsilon_x}$ * sin(37.0 * π/20.0)] |
| 010010 | [R2 * $\sqrt{\epsilon_x}$ * cos(29.0 * π/16.0), R2 * $\sqrt{\epsilon_x}$ * sin(29.0 * π/16.0)] |
| 010011 | [R3 * $\sqrt{\epsilon_x}$ * cos(37.0 * π/20.0), R3 * $\sqrt{\epsilon_x}$ * sin(37.0 * π/20.0)] |
| 010100 | [R1 * $\sqrt{\epsilon_x}$ * cos(15.0 * π/8.0), R1 * $\sqrt{\epsilon_x}$ * sin(15.0 * π/8.0)] |
| 010101 | [R4 * $\sqrt{\epsilon_x}$ * cos(39.0 * π/20.0), R4 * $\sqrt{\epsilon_x}$ * sin(39.0 * π/20.0)] |
| 010110 | [R2 * $\sqrt{\epsilon_x}$ * cos(31.0 * π/16.0), R2 * $\sqrt{\epsilon_x}$ * sin(31.0 * π/16.0)] |
| 010111 | [R3 * $\sqrt{\epsilon_x}$ * cos(39.0 * π/20.0), R3 * $\sqrt{\epsilon_x}$ * sin(39.0 * π/20.0)] |
| 011000 | [R1 * $\sqrt{\epsilon_x}$ * cos(11.0 * π/8.0), R1 * $\sqrt{\epsilon_x}$ * sin(11.0 * π/8.0)] |
| 011001 | [R4 * $\sqrt{\epsilon_x}$ * cos(23.0 * π/20.0), R4 * $\sqrt{\epsilon_x}$ * sin(23.0 * π/20.0)] |
| 011010 | [R2 * $\sqrt{\epsilon_x}$ * cos(19.0 * π/16.0), R2 * $\sqrt{\epsilon_x}$ * sin(19.0 * π/16.0)] |
| 011011 | [R3 * $\sqrt{\epsilon_x}$ * cos(23.0 * π/20.0), R3 * $\sqrt{\epsilon_x}$ * sin(23.0 * π/20.0)] |
| 011100 | [R1 * $\sqrt{\epsilon_x}$ * cos(9.0 * π/8.0), R1 * $\sqrt{\epsilon_x}$ * sin(9.0 * π/8.0)] |
| 011101 | [R4 * $\sqrt{\epsilon_x}$ * cos(21.0 * π/20.0), R4 * $\sqrt{\epsilon_x}$ * sin(21.0 * π/20.0)] |
| 011110 | [R2 * $\sqrt{\epsilon_x}$ * cos(17.0 * π/16.0), R2 * $\sqrt{\epsilon_x}$ * sin(17.0 * π/16.0)] |
| 011111 | [R3 * $\sqrt{\epsilon_x}$ * cos(21.0 * π/20.0), R3 * $\sqrt{\epsilon_x}$ * sin(21.0 * π/20.0)] |
| 100000 | [R2 * $\sqrt{\epsilon_x}$ * cos(7.0 * π/16.0), R2 * $\sqrt{\epsilon_x}$ * sin(7.0 * π/16.0)] |
| 100001 | [R4 * $\sqrt{\epsilon_x}$ * cos(5.0 * π/20.0), R4 * $\sqrt{\epsilon_x}$ * sin(5.0 * π/20.0)] |
| 100010 | [R2 * $\sqrt{\epsilon_x}$ * cos(5.0 * π/16.0), R2 * $\sqrt{\epsilon_x}$ * sin(5.0 * π/16.0)] |
| 100011 | [R3 * $\sqrt{\epsilon_x}$ * cos(5.0 * π/20.0), R3 * $\sqrt{\epsilon_x}$ * sin(5.0 * π/20.0)] |
| 100100 | [R4 * $\sqrt{\epsilon_x}$ * cos(9.0 * π/20.0), R4 * $\sqrt{\epsilon_x}$ * sin(9.0 * π/20.0)] |
| 100101 | [R4 * $\sqrt{\epsilon_x}$ * cos(7.0 * π/20.0), R4 * $\sqrt{\epsilon_x}$ * sin(7.0 * π/20.0)] |
| 100110 | [R3 * $\sqrt{\epsilon_x}$ * cos(9.0 * π/20.0), R3 * $\sqrt{\epsilon_x}$ * sin(9.0 * π/20.0)] |
| 100111 | [R3 * $\sqrt{\epsilon_x}$ * cos(7.0 * π/20.0), R3 * $\sqrt{\epsilon_x}$ * sin(7.0 * π/20.0)] |
| 101000 | [R2 * $\sqrt{\epsilon_x}$ * cos(9.0 * π/16.0), R2 * $\sqrt{\epsilon_x}$ * sin(9.0 * π/16.0)] |
| 101001 | [R4 * $\sqrt{\epsilon_x}$ * cos(15.0 * π/20.0), R4 * $\sqrt{\epsilon_x}$ * sin(15.0 * π/20.0)] |
| 101010 | [R2 * $\sqrt{\epsilon_x}$ * cos(11.0 * π/16.0), R2 * $\sqrt{\epsilon_x}$ * sin(11.0 * π/16.0)] |
| 101011 | [R3 * $\sqrt{\epsilon_x}$ * cos(15.0 * π/20.0), R3 * $\sqrt{\epsilon_x}$ * sin(15.0 * π/20.0)] |
| 101100 | [R4 * $\sqrt{\epsilon_x}$ * cos(11.0 * π/20.0), R4 * $\sqrt{\epsilon_x}$ * sin(11.0 * π/20.0)] |
| 101101 | [R4 * $\sqrt{\epsilon_x}$ * cos(13.0 * π/20.0), R4 * $\sqrt{\epsilon_x}$ * sin(13.0 * π/20.0)] |
| 101110 | [R3 * $\sqrt{\epsilon_x}$ * cos(11.0 * π/20.0), R3 * $\sqrt{\epsilon_x}$ * sin(11.0 * π/20.0)] |
| 101111 | [R3 * $\sqrt{\epsilon_x}$ * cos(13.0 * π/20.0), R3 * $\sqrt{\epsilon_x}$ * sin(13.0 * π/20.0)] |
| 110000 | [R1 * $\sqrt{\epsilon_x}$ * cos(3.0 * π/8.0), R1 * $\sqrt{\epsilon_x}$ * sin(3.0 * π/8.0)] |
| 110001 | [R4 * $\sqrt{\epsilon_x}$ * cos(3.0 * π/20.0), R4 * $\sqrt{\epsilon_x}$ * sin(3.0 * π/20.0)] |
| 110010 | [R2 * $\sqrt{\epsilon_x}$ * cos(3.0 * π/16.0), R2 * $\sqrt{\epsilon_x}$ * sin(3.0 * π/16.0)] |
| 110011 | [R3 * $\sqrt{\epsilon_x}$ * cos(3.0 * π/20.0), R3 * $\sqrt{\epsilon_x}$ * sin(3.0 * π/20.0)] |
| 110100 | [R1 * $\sqrt{\epsilon_x}$ * cos(π/8.0), R1 * $\sqrt{\epsilon_x}$ * sin(π/8.0)] |
| 110101 | [R4 * $\sqrt{\epsilon_x}$ * cos(π/20.0), R4 * $\sqrt{\epsilon_x}$ * sin(π/20.0)] |
| 110110 | [R2 * $\sqrt{\epsilon_x}$ * cos(π/16.0), R2 * $\sqrt{\epsilon_x}$ * sin(π/16.0)] |
| 110111 | [R3 * $\sqrt{\epsilon_x}$ * cos(π/20.0), R3 * $\sqrt{\epsilon_x}$ * sin(π/20.0)] |
| 111000 | [R1 * $\sqrt{\epsilon_x}$ * cos(5.0 * π/8.0), R1 * $\sqrt{\epsilon_x}$ * sin(5.0 * π/8.0)] |
| 111001 | [R4 * $\sqrt{\epsilon_x}$ * cos(17.0 * π/20.0), R4 * $\sqrt{\epsilon_x}$ * sin(17.0 * π/20.0)] |
| 111010 | [R2 * $\sqrt{\epsilon_x}$ * cos(13.0 * π/16.0), R2 * $\sqrt{\epsilon_x}$ * sin(13.0 * π/16.0)] |
| 111011 | [R3 * $\sqrt{\epsilon_x}$ * cos(17.0 * π/20.0), R3 * $\sqrt{\epsilon_x}$ * sin(17.0 * π/20.0)] |
| 111100 | [R1 * $\sqrt{\epsilon_x}$ * cos(7.0 * π/8.0), R1 * $\sqrt{\epsilon_x}$ * sin(7.0 * π/8.0)] |
| 111101 | [R4 * $\sqrt{\epsilon_x}$ * cos(19.0 * π/20.0), R4 * $\sqrt{\epsilon_x}$ * sin(19.0 * π/20.0)] |
| 111110 | [R2 * $\sqrt{\epsilon_x}$ * cos(15.0 * π/16.0), R2 * $\sqrt{\epsilon_x}$ * sin(15.0 * π/16.0)] |
| 111111 | [R3 * $\sqrt{\epsilon_x}$ * cos(19.0 * π/20.0), R3 * $\sqrt{\epsilon_x}$ * sin(19.0 * π/20.0)] | where $\epsilon_x$ represents average energy per symbol, $8*R1^2 + 16*R2^2 + 20*R3^2 + 20*R4^2 = 64$, and R1 represents the radius of an inner ring of the constellation, R2 represents the radius of a first middle ring of the constellation, R3 represents the radius of a second middle ring of the constellation and R4 represents the radius of an outer ring of the constellation.

42. The method according to claim 41, wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

43. An apparatus, comprising:
a modulation device configured to modulate a signal based at least in part on a signal constellation having bit labeling and [x, y] bit coordinate positions in accordance with a one of the following tables:

TABLE 1

| Bit Label | [x, y] Coordinates |
|---|---|
| 000 | [0.0, 0.0] |
| 001 | [$\sqrt{8.0*\epsilon_x/7.0}$, 0.0] |
| 010 | [$\sqrt{8.0*\epsilon_x/7.0}$ * cos(4.0 * π/7.0), $\sqrt{8.0*\epsilon_x/7.0}$ * sin(4.0 * π/7.0)] |
| 011 | [$\sqrt{8.0*\epsilon_x/7.0}$ * cos(2.0 * π/7.0), $\sqrt{8.0*\epsilon_x/7.0}$ * sin(2.0 * π/7.0)] |
| 100 | [$\sqrt{8.0*\epsilon_x/7.0}$ * cos(12.0 * π/7.0), $\sqrt{8.0*\epsilon_x/7.0}$ * sin(12.0 * π/7.0)] |
| 101 | [$\sqrt{8.0*\epsilon_x/7.0}$ * cos(10.0 * π/7.0), $\sqrt{8.0*\epsilon_x/7.0}$ * sin(10.0 * π/7.0)] |
| 110 | [$\sqrt{8.0*\epsilon_x/7.0}$ * cos(6.0 * π/7.0), $\sqrt{8.0*\epsilon_x/7.0}$ * sin(6.0 * π/7.0)] |
| 111 | [$\sqrt{8.0*\epsilon_x/7.0}$ * cos(8.0 * π/7.0), $\sqrt{8.0*\epsilon_x/7.0}$ * sin(8.0 * π/7.0)] | where $\epsilon_x$ represents average energy per symbol;

TABLE 2

| Bit Label | [x, y] Coordinates |
|---|---|
| 0000 | [R1 * $\sqrt{\epsilon_x}$, 0.0] |
| 0001 | [R1 * $\sqrt{\epsilon_x}$ * cos (5.0 * π/3.0), R1 * $\sqrt{\epsilon_x}$ * sin (5.0 * π/3.0)] |
| 0010 | [R1 * $\sqrt{\epsilon_x}$ * cos (π/3.0), R1 * $\sqrt{\epsilon_x}$ * sin (π/3.0)] |
| 0011 | [R2 * $\sqrt{\epsilon_x}$ * cos (13.0 * π/30.0), R2 * $\sqrt{\epsilon_x}$ * sin (13.0 * π/30.0)] |
| 0100 | [R2 * $\sqrt{\epsilon_x}$ * cos (55.0 * π/30.0), R2 * $\sqrt{\epsilon_x}$ * sin (55.0 * π/30.0)] |
| 0101 | [R2 * $\sqrt{\epsilon_x}$ * cos (49.0 * π/30.0), R2 * $\sqrt{\epsilon_x}$ * sin (49.0 * π/30.0)] |
| 0110 | [R2 * $\sqrt{\epsilon_x}$ * cos (π/30.0), R2 * $\sqrt{\epsilon_x}$ * sin (π/30.0)] |
| 0111 | [R2 * $\sqrt{\epsilon_x}$ * cos (7.0 * π/30.0), R2 * $\sqrt{\epsilon_x}$ * sin (7.0 * π/30.0)] |
| 1000 | [−R1 * $\sqrt{\epsilon_x}$, 0.0] |
| 1001 | [R1 * $\sqrt{\epsilon_x}$ * cos (4.0 * π/3.0), R1 * $\sqrt{\epsilon_x}$ * sin (4.0 * π/3.0)] |
| 1010 | [R1 * $\sqrt{\epsilon_x}$ * cos (2.0 * π/3.0), R1 * $\sqrt{\epsilon_x}$ * sin (2.0 * π/3.0)] |
| 1011 | [R2 * $\sqrt{\epsilon_x}$ * cos (19.0 * π/30.0), R2 * $\sqrt{\epsilon_x}$ * sin (19.0 * π/30.0)] |
| 1100 | [R2 * $\sqrt{\epsilon_x}$ * cos (37.0 * π/30.0), R2 * $\sqrt{\epsilon_x}$ * sin (37.0 * π/30.0)] |
| 1101 | [R2 * $\sqrt{\epsilon_x}$ * cos (43.0 * π/30.0), R2 * $\sqrt{\epsilon_x}$ * sin (43.0 * π/30.0)] |
| 1110 | [R2 * $\sqrt{\epsilon_x}$ * cos (31.0 * π/30.0), R2 * $\sqrt{\epsilon_x}$ * sin (31.0 * π/30.0)] |
| 1111 | [R2 * $\sqrt{\epsilon_x}$ * cos (25.0 * π/30.0), R2 * $\sqrt{\epsilon_x}$ * sin (25.0 * π/30.0)] | where $\epsilon_x$ represents average energy per symbol, $6*R1^2+10*R2^2=16$, and R1 represents the radius of an inner ring of the constellation and R2 represents the radius of an outer ring of the constellation;

TABLE 3

| Bit Label | [x, y] Coordinates |
|---|---|
| 00000 | [R1 * $\sqrt{\epsilon_x}$ * cos(π/16.0), R1 * $\sqrt{\epsilon_x}$ * sin(π/16.0)] |
| 00001 | [R1 * $\sqrt{\epsilon_x}$ * cos(3.0 * π/16.0), R1 * $\sqrt{\epsilon_x}$ * sin(3.0 * π/16.0)] |
| 00010 | [R1 * $\sqrt{\epsilon_x}$ * sin(π/16.0), R1 * $\sqrt{\epsilon_x}$ * cos(π/16.0)] |
| 00011 | [R1 * $\sqrt{\epsilon_x}$ * sin(3.0 * π/16.0), R1 * $\sqrt{\epsilon_x}$ * cos(3.0 * π/16.0)] |
| 00100 | [R1 * $\sqrt{\epsilon_x}$ * cos(π/16.0), −R1 * $\sqrt{\epsilon_x}$ * sin(π/16.0)] |
| 00101 | [R1 * $\sqrt{\epsilon_x}$ * cos(3.0 * π/16.0), −R1 * $\sqrt{\epsilon_x}$ * sin(3.0 * π/16.0)] |
| 00110 | [R1 * $\sqrt{\epsilon_x}$ * sin(π/16.0), −R1 * $\sqrt{\epsilon_x}$ * cos(π/16.0)] |
| 00111 | [R1 * $\sqrt{\epsilon_x}$ * sin(3.0 * π/16.0), −R1 * $\sqrt{\epsilon_x}$ * cos(3.0 * π/16.0)] |
| 01000 | [−R1 * $\sqrt{\epsilon_x}$ * cos(π/16.0), R1 * $\sqrt{\epsilon_x}$ * sin(π/16.0)] |
| 01001 | [−R1 * $\sqrt{\epsilon_x}$ * cos(3.0 * π/16.0), R1 * $\sqrt{\epsilon_x}$ * sin(3.0 * π/16.0)] |
| 01010 | [−R1 * $\sqrt{\epsilon_x}$ * sin(π/16.0), R1 * $\sqrt{\epsilon_x}$ * cos(π/16.0)] |
| 01011 | [−R1 * $\sqrt{\epsilon_x}$ * sin(3.0 * π/16.0), R1 * $\sqrt{\epsilon_x}$ * cos(3.0 * π/16.0)] |
| 01100 | [−R1 * $\sqrt{\epsilon_x}$ * cos(π/16.0), −R1 * $\sqrt{\epsilon_x}$ * sin(π/16.0)] |
| 01101 | [−R1 * $\sqrt{\epsilon_x}$ * cos(3.0 * π/16.0), −R1 * $\sqrt{\epsilon_x}$ * sin(3.0 * π/16.0)] |
| 01110 | [−R1 * $\sqrt{\epsilon_x}$ * sin(π/16.0), −R1 * $\sqrt{\epsilon_x}$ * cos(π/16.0)] |
| 01111 | [−R1 * $\sqrt{\epsilon_x}$ * sin(3.0 * π/16.0), −R1 * $\sqrt{\epsilon_x}$ * cos(3.0 * π/16.0)] |
| 10000 | [R2 * $\sqrt{\epsilon_x}$ * cos(π/16.0), R2 * $\sqrt{\epsilon_x}$ * sin(π/16.0)] |
| 10001 | [R2 * $\sqrt{\epsilon_x}$ * cos(3.0 * π/16.0), R2 * $\sqrt{\epsilon_x}$ * sin(3.0 * π/16.0)] |
| 10010 | [R2 * $\sqrt{\epsilon_x}$ * sin(π/16.0), R2 * $\sqrt{\epsilon_x}$ * cos(π/16.0)] |
| 10011 | [R2 * $\sqrt{\epsilon_x}$ * sin(3.0 * π/16.0), R2 * $\sqrt{\epsilon_x}$ * cos(3.0 * π/16.0)] |
| 10100 | [R2 * $\sqrt{\epsilon_x}$ * cos(π/16.0), −R2 * $\sqrt{\epsilon_x}$ * sin(π/16.0)] |
| 10101 | [R2 * $\sqrt{\epsilon_x}$ * cos(3.0 * π/16.0), −R2 * $\sqrt{\epsilon_x}$ * sin(3.0 * π/16.0)] |
| 10110 | [R2 * $\sqrt{\epsilon_x}$ * sin(π/16.0), −R2 * $\sqrt{\epsilon_x}$ * cos(π/16.0)] |
| 10111 | [R2 * $\sqrt{\epsilon_x}$ * sin(3.0 * π/16.0), −R2 * $\sqrt{\epsilon_x}$ * cos(3.0 * π/16.0)] |
| 11000 | [−R2 * $\sqrt{\epsilon_x}$ * cos(π/16.0), R2 * $\sqrt{\epsilon_x}$ * sin(π/16.0)] |
| 11001 | [−R2 * $\sqrt{\epsilon_x}$ * cos(3.0 * π/16.0), R2 * $\sqrt{\epsilon_x}$ * sin(3.0 * π/16.0)] |
| 11010 | [−R2 * $\sqrt{\epsilon_x}$ * sin(π/16.0), R2 * $\sqrt{\epsilon_x}$ * cos(π/16.0)] |
| 11011 | [−R2 * $\sqrt{\epsilon_x}$ * sin(3.0 * π/16.0), R2 * $\sqrt{\epsilon_x}$ * cos(3.0 * π/16.0)] |
| 11100 | [−R2 * $\sqrt{\epsilon_x}$ * cos(π/16.0), −R2 * $\sqrt{\epsilon_x}$ * sin(π/16.0)] |
| 11101 | [−R2 * $\sqrt{\epsilon_x}$ * cos(3.0 * π/16.0), −R2 * $\sqrt{\epsilon_x}$ * sin(3.0 * π/16.0)] |
| 11110 | [−R2 * $\sqrt{\epsilon_x}$ * sin(π/16.0), −R2 * $\sqrt{\epsilon_x}$ * cos(π/16.0)] |
| 11111 | [−R2 * $\sqrt{\epsilon_x}$ * sin(3.0 * π/16.0), −R2 * $\sqrt{\epsilon_x}$ * cos(3.0 * π/16.0)] | where $\epsilon_x$ represents average energy per symbol, $R1^2+R2^2=2$, and R1 represents the radius of an inner ring of the constellation and R2 represents the radius of an outer ring of the constellation;

TABLE 4

| Bit Label | [x, y] Coordinates |
|---|---|
| 00000 | [−R3 * $\sqrt{\epsilon_x}$ * cos(5.0 * π/16.0), R3 * $\sqrt{\epsilon_x}$ * cos(3.0 * π/16.0)] |
| 00001 | [−R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(3.0 * π/16.0), R3 * $\sqrt{\epsilon_x}$ * cos(5.0 * π/16.0)] |
| 01001 | [−R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * cos(5.0 * π/16.0), −R3 * $\sqrt{\epsilon_x}$ * cos(3.0 * π/16.0)] |
| 10001 | [−R3 * $\sqrt{\epsilon_x}$ * cos(7.0 * π/16.0), −R3 * $\sqrt{\epsilon_x}$ * cos(π/16.0)] |
| 10010 | [R3 * $\sqrt{\epsilon_x}$ * cos(5.0 * π/16.0), −R3 * $\sqrt{\epsilon_x}$ * cos(3.0 * π/16.0)] |
| 10011 | [R3 * $\sqrt{\epsilon_x}$ * cos(7.0 * π/16.0), −R3 * $\sqrt{\epsilon_x}$ * cos(π/16.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * cos(3.0 * π/16.0), −R3 * $\sqrt{\epsilon_x}$ * cos(5.0 * π/16.0)] |
| 11001 | [−R3 * $\sqrt{\epsilon_x}$ * cos(π/16.0), −R3 * $\sqrt{\epsilon_x}$ * cos(7.0 * π/16.0)] |
| 11010 | [R3 * $\sqrt{\epsilon_x}$ * cos(3.0 * π/16.0), R3 * $\sqrt{\epsilon_x}$ * cos(5.0 * π/16.0)] |
| 11011 | [R3 * $\sqrt{\epsilon_x}$ * cos(π/16.0), −R3 * $\sqrt{\epsilon_x}$ * cos(7.0 * π/16.0)] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2+12*R2^2+16*R3^2=32$, and R1 represents the radius of an inner ring of the constellation, R2 represents the radius of a middle ring of the constellation and R3 represents the radius of an outer ring of the constellation;

TABLE 5

| Bit Label | [x, y] Coordinates |
|---|---|
| 00000 | [−R3 * $\sqrt{\epsilon_x}$ * sin(π/4.0), R3 * $\sqrt{\epsilon_x}$ * sin(π/4.0)] |
| 00001 | [−R3 * $\sqrt{\epsilon_x}$ * sin(π/8.0), R3 * $\sqrt{\epsilon_x}$ * cos(π/8.0)] |
| 00010 | [R3 * $\sqrt{\epsilon_x}$ * sin(π/8.0), R3 * $\sqrt{\epsilon_x}$ * cos(π/8.0)] |
| 00011 | [0, R3 * $\sqrt{\epsilon_x}$] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(π/8.0), R3 * $\sqrt{\epsilon_x}$ * sin(π/8.0)] |
| 01001 | [−R3 * $\sqrt{\epsilon_x}$, 0] |
| 01010 | [R3 * $\sqrt{\epsilon_x}$ * sin(π/4.0), R3 * $\sqrt{\epsilon_x}$ * sin(π/4.0)] |
| 01011 | [R3 * $\sqrt{\epsilon_x}$ * cos(π/8.0), R3 $\sqrt{\epsilon_x}$ * sin(π/8.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * sin(π/8.0), −R3 * $\sqrt{\epsilon_x}$ * cos(π/8.0)] |
| 10001 | [0, −R3 * $\sqrt{\epsilon_x}$] |
| 10010 | [R3 * $\sqrt{\epsilon_x}$ * sin(π/4.0), −R3 * $\sqrt{\epsilon_x}$ * sin(π/4.0)] |
| 10011 | [R3 * $\sqrt{\epsilon_x}$ * sin(π/8.0), −R3 * $\sqrt{\epsilon_x}$ * cos(π/8.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * sin(π/4.0), −R3 * $\sqrt{\epsilon_x}$ * sin(π/4.0)] |
| 11001 | [−R3 * $\sqrt{\epsilon_x}$ * cos(π/8.0), −R3 * $\sqrt{\epsilon_x}$ * sin(π/8.0)] |
| 11010 | [R3 * $\sqrt{\epsilon_x}$ * cos(π/8.0), −R3 * $\sqrt{\epsilon_x}$ * sin(π/8.0)] |
| 11011 | [R3 * $\sqrt{\epsilon_x}$, 0] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2+12*R2^2+16*R3^2=32$, and R1 represents the radius of an inner ring of the constellation, R2 represents the radius of a middle ring of the constellation and R3 represents the radius of an outer ring of the constellation; and

TABLE 6

| Bit Label | [x, y] Coordinates |
|---|---|
| 000000 | [R2 * √$\epsilon_x$ * cos(25.0 * π/16.0), R2 * √$\epsilon_x$ * sin(25.0 * π/16.0)] |
| 000001 | [R4 * √$\epsilon_x$ * cos(35.0 * π/20.0), R4 * √$\epsilon_x$ * sin(35.0 * π/20.0)] |
| 000010 | [R2 * √$\epsilon_x$ * cos(27.0 * π/16.0), R2 * √$\epsilon_x$ * sin(27.0 * π/16.0)] |
| 000011 | [R3 * √$\epsilon_x$ * cos(35.0 * π/20.0), R3 * √$\epsilon_x$ * sin(35.0 * π/20.0)] |
| 000100 | [R4 * √$\epsilon_x$ * cos(31.0 * π/20.0), R4 * √$\epsilon_x$ * sin(31.0 * π/20.0)] |
| 000101 | [R4 * √$\epsilon_x$ * cos(33.0 * π/20.0), R4 * √$\epsilon_x$ * sin(33.0 * π/20.0)] |
| 000110 | [R3 * √$\epsilon_x$ * cos(31.0 * π/20.0), R3 * √$\epsilon_x$ * sin(31.0 * π/20.0)] |
| 000111 | [R3 * √$\epsilon_x$ * cos(33.0 * π/20.0), R3 * √$\epsilon_x$ * sin(33.0 * π/20.0)] |
| 001000 | [R2 * √$\epsilon_x$ * cos(23.0 * π/16.0), R2 * √$\epsilon_x$ * sin(23.0 * π/16.0)] |
| 001001 | [R4 * √$\epsilon_x$ * cos(25.0 * π/20.0), R4 * √$\epsilon_x$ * sin(25.0 * π/20.0)] |
| 001010 | [R2 * √$\epsilon_x$ * cos(21.0 * π/16.0), R2 * √$\epsilon_x$ * sin(21.0 * π/16.0)] |
| 001011 | [R3 * √$\epsilon_x$ * cos(25.0 * π/20.0), R3 * √$\epsilon_x$ * sin(25.0 * π/20.0)] |
| 001100 | [R4 * √$\epsilon_x$ * cos(29.0 * π/20.0), R4 * √$\epsilon_x$ * sin(29.0 * π/20.0)] |
| 001101 | [R4 * √$\epsilon_x$ * cos(27.0 * π/20.0), R4 * √$\epsilon_x$ * sin(27.0 * π/20.0)] |
| 001110 | [R3 * √$\epsilon_x$ * cos(29.0 * π/20.0), R3 * √$\epsilon_x$ * sin(29.0 * π/20.0)] |
| 001111 | [R3 * √$\epsilon_x$ * cos(27.0 * π/20.0), R3 * √$\epsilon_x$ * sin(27.0 * π/20.0)] |
| 010000 | [R1 * √$\epsilon_x$ * cos(13.0 * π/8.0), R1 * √$\epsilon_x$ * sin(13.0 * π/8.0)] |
| 010001 | [R4 * √$\epsilon_x$ * cos(37.0 * π/20.0), R4 * √$\epsilon_x$ * sin(37.0 * π/20.0)] |
| 010010 | [R2 * √$\epsilon_x$ * cos(29.0 * π/16.0), R2 * √$\epsilon_x$ * sin(29.0 * π/16.0)] |
| 010011 | [R3 * √$\epsilon_x$ * cos(37.0 * π/20.0), R3 * √$\epsilon_x$ * sin(37.0 * π/20.0)] |
| 010100 | [R1 * √$\epsilon_x$ * cos(15.0 * π/8.0), R1 * √$\epsilon_x$ * sin(15.0 * π/8.0)] |
| 010101 | [R4 * √$\epsilon_x$ * cos(39.0 * π/20.0), R4 * √$\epsilon_x$ * sin(39.0 * π/20.0)] |
| 010110 | [R2 * √$\epsilon_x$ * cos(31.0 * π/16.0), R2 * √$\epsilon_x$ * sin(31.0 * π/16.0)] |
| 010111 | [R3 * √$\epsilon_x$ * cos(39.0 * π/20.0), R3 * √$\epsilon_x$ * sin(39.0 * π/20.0)] |
| 011000 | [R1 * √$\epsilon_x$ * cos(11.0 * π/8.0), R1 * √$\epsilon_x$ * sin(11.0 * π/8.0)] |
| 011001 | [R4 * √$\epsilon_x$ * cos(23.0 * π/20.0), R4 * √$\epsilon_x$ * sin(23.0 * π/20.0)] |
| 011010 | [R2 * √$\epsilon_x$ * cos(19.0 * π/16.0), R2 * √$\epsilon_x$ * sin(19.0 * π/16.0)] |
| 011011 | [R3 * √$\epsilon_x$ * cos(23.0 * π/20.0), R3 * √$\epsilon_x$ * sin(23.0 * π/20.0)] |
| 011100 | [R1 * √$\epsilon_x$ * cos(9.0 * π/8.0), R1 * √$\epsilon_x$ * sin(9.0 * π/8.0)] |
| 011101 | [R4 * √$\epsilon_x$ * cos(21.0 * π/20.0), R4 * √$\epsilon_x$ * sin(21.0 * π/20.0)] |
| 011110 | [R2 * √$\epsilon_x$ * cos(17.0 * π/16.0), R2 * √$\epsilon_x$ * sin(17.0 * π/16.0)] |
| 011111 | [R3 * √$\epsilon_x$ * cos(21.0 * π/20.0), R3 * √$\epsilon_x$ * sin(21.0 * π/20.0)] |
| 100000 | [R2 * √$\epsilon_x$ * cos(7.0 * π/16.0), R2 * √$\epsilon_x$ * sin(7.0 * π/16.0)] |
| 100001 | [R4 * √$\epsilon_x$ * cos(5.0 * π/20.0), R4 * √$\epsilon_x$ * sin(5.0 * π/20.0)] |
| 100010 | [R2 * √$\epsilon_x$ * cos(5.0 * π/16.0), R2 * √$\epsilon_x$ * sin(5.0 * π/16.0)] |
| 100011 | [R3 * √$\epsilon_x$ * cos(5.0 * π/20.0), R3 * √$\epsilon_x$ * sin(5.0 * π/20.0)] |
| 100100 | [R4 * √$\epsilon_x$ * cos(9.0 * π/20.0), R4 * √$\epsilon_x$ * sin(9.0 * π/20.0)] |

TABLE 6-continued

| Bit Label | [x, y] Coordinates |
|---|---|
| 100101 | [R4 * √$\epsilon_x$ * cos(7.0 * π/20.0), R4 * √$\epsilon_x$ * sin(7.0 * π/20.0)] |
| 100110 | [R3 * √$\epsilon_x$ * cos(9.0 * π/20.0), R3 * √$\epsilon_x$ * sin(9.0 * π/20.0)] |
| 100111 | [R3 * √$\epsilon_x$ * cos(7.0 * π/20.0), R3 * √$\epsilon_x$ * sin(7.0 * π/20.0)] |
| 101000 | [R2 * √$\epsilon_x$ * cos(9.0 * π/16.0), R2 * √$\epsilon_x$ * sin(9.0 * π/16.0)] |
| 101001 | [R4 * √$\epsilon_x$ * cos(15.0 * π/20.0), R4 * √$\epsilon_x$ * sin(15.0 * π/20.0)] |
| 101010 | [R2 * √$\epsilon_x$ * cos(11.0 * π/16.0), R2 * √$\epsilon_x$ * sin(11.0 * π/16.0)] |
| 101011 | [R3 * √$\epsilon_x$ * cos(15.0 * π/20.0), R3 * √$\epsilon_x$ * sin(15.0 * π/20.0)] |
| 101100 | [R4 * √$\epsilon_x$ * cos(11.0 * π/20.0), R4 * √$\epsilon_x$ * sin(11.0 * π/20.0)] |
| 101101 | [R4 * √$\epsilon_x$ * cos(13.0 * π/20.0), R4 * √$\epsilon_x$ * sin(13.0 * π/20.0)] |
| 101110 | [R3 * √$\epsilon_x$ * cos(11.0 * π/20.0), R3 * √$\epsilon_x$ * sin(11.0 * π/20.0)] |
| 101111 | [R3 * √$\epsilon_x$ * cos(13.0 * π/20.0), R3 * √$\epsilon_x$ * sin(13.0 * π/20.0)] |
| 110000 | [R1 * √$\epsilon_x$ * cos(3.0 * π/8.0), R1 * √$\epsilon_x$ * sin(3.0 * π/8.0)] |
| 110001 | [R4 * √$\epsilon_x$ * cos(3.0 * π/20.0), R4 * √$\epsilon_x$ * sin(3.0 * π/20.0)] |
| 110010 | [R2 * √$\epsilon_x$ * cos(3.0 * π/16.0), R2 * √$\epsilon_x$ * sin(3.0 * π/16.0)] |
| 110011 | [R3 * √$\epsilon_x$ * cos(3.0 * π/20.0), R3 * √$\epsilon_x$ * sin(3.0 * π/20.0)] |
| 110100 | [R1 * √$\epsilon_x$ * cos(π/8.0), R1 * √$\epsilon_x$ * sin(π/8.0)] |
| 110101 | [R4 * √$\epsilon_x$ * cos(π/20.0), R4 * √$\epsilon_x$ * sin(π/20.0)] |
| 110110 | [R2 * √$\epsilon_x$ * cos(π/16.0), R2 * √$\epsilon_x$ * sin(π/16.0)] |
| 110111 | [R3 * √$\epsilon_x$ * cos(π/20.0), R3 * √$\epsilon_x$ * sin(π/20.0)] |
| 111000 | [R1 * √$\epsilon_x$ * cos(5.0 * π/8.0), R1 * √$\epsilon_x$ * sin(5.0 * π/8.0)] |
| 111001 | [R4 * √$\epsilon_x$ * cos(17.0 * π/20.0), R4 * √$\epsilon_x$ * sin(17.0 * π/20.0)] |
| 111010 | [R2 * √$\epsilon_x$ * cos(13.0 * π/16.0), R2 * √$\epsilon_x$ * sin(13.0 * π/16.0)] |
| 111011 | [R3 * √$\epsilon_x$ * cos(17.0 * π/20.0), R3 * √$\epsilon_x$ * sin(17.0 * π/20.0)] |
| 111100 | [R1 * √$\epsilon_x$ * cos(7.0 * π/8.0), R1 * √$\epsilon_x$ * sin(7.0 * π/8.0)] |
| 111101 | [R4 * √$\epsilon_x$ * cos(19.0 * π/20.0), R4 * √$\epsilon_x$ * sin(19.0 * π/20.0)] |
| 111110 | [R2 * √$\epsilon_x$ * cos(15.0 * π/16.0), R2 * √$\epsilon_x$ * sin(15.0 * π/16.0)] |
| 111111 | [R3 * √$\epsilon_x$ * cos(19.0 * π/20.0), R3 * √$\epsilon_x$ * sin(19.0 * π/20.0)] | where $\epsilon_x$ represents average energy per symbol, $8*R1^2+16*R2^2+20*R3^2+20*R4^2=64$, and R1 represents the radius of an inner ring of the constellation, R2 represents the radius of a first middle ring of the constellation, R3 represents the radius of a second middle ring of the constellation and R4 represents the radius of an outer ring of the constellation.

44. The apparatus according to claim 43, wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

* * * * *